US010600012B2

(12) United States Patent
Peterson

(10) Patent No.: US 10,600,012 B2
(45) Date of Patent: Mar. 24, 2020

(54) HUMAN-MACHINE VISUALIZATION INTERFACES AND PROCESSES FOR PROVIDING REAL TIME OR NEAR REAL TIME ACTIONABLE INFORMATION RELATIVE TO ONE OR MORE ELEMENTS OF ONE OR MORE NETWORKS, NETWORKS, AND SYSTEMS OF NETWORKS

(71) Applicant: United States of America as represented by the Secretary of the Navy, Crane, IN (US)

(72) Inventor: Elisha B Peterson, Baltimore, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 334 days.

(21) Appl. No.: 15/144,290

(22) Filed: May 2, 2016

(65) Prior Publication Data
US 2016/0321574 A1 Nov. 3, 2016

Related U.S. Application Data

(60) Provisional application No. 62/156,135, filed on May 1, 2015.

(51) Int. Cl.
*G06Q 10/06* (2012.01)
*G06Q 50/26* (2012.01)

(52) U.S. Cl.
CPC ....... *G06Q 10/063* (2013.01); *G06Q 10/0635* (2013.01); *G06Q 50/265* (2013.01)

(58) Field of Classification Search
CPC . G06Q 10/063; G06Q 10/0635; G06Q 50/265
See application file for complete search history.

(56) References Cited

U.S. PATENT DOCUMENTS

| | | | |
|---|---|---|---|
| 9,773,288 B2* | 9/2017 | Ananthanpillai | .... G06Q 50/265 |
| 2006/0283938 A1* | 12/2006 | Kumar | ................... G06K 17/00 235/382 |
| 2008/0307364 A1* | 12/2008 | Chaudhri | .............. G06F 3/0483 715/836 |

(Continued)

OTHER PUBLICATIONS

Guo, D., Human-machine collaboration for geographic knowledge discovery with high-dimensional clustering, 2003, Available from ProQuest Dissertations and Theses Professional. (304229993). Retrieved from http://dialog.proquest.com/professional/docview/304229993?accountid=161862 (Year: 2003).*

*Primary Examiner* — Ivan R Goldberg
*Assistant Examiner* — Nicholas D Bolen
(74) *Attorney, Agent, or Firm* — Naval Surface Warfare Center, Crane Division; Christopher A. Monsey

(57) ABSTRACT

The invention includes various embodiments of apparatus and methods for human-machine visualization interfaces and processes for providing actionable information on elements of networks, networks, and systems of networks ability to support one or more organizational elements, missions associated with the one or more organizational elements, and capabilities of the organizational elements.

2 Claims, 53 Drawing Sheets

(56) References Cited

U.S. PATENT DOCUMENTS

| | | | |
|---|---|---|---|
| 2009/0066712 A1* | 3/2009 | Gilger | G06Q 10/00 345/581 |
| 2010/0042745 A1* | 2/2010 | Maeda | G06Q 10/06 709/242 |
| 2012/0158644 A1* | 6/2012 | Mital | G06Q 10/06 707/602 |
| 2014/0195455 A1* | 7/2014 | Lluberes | G06Q 10/0833 705/333 |
| 2015/0120359 A1* | 4/2015 | Dongieux | G06Q 10/0633 705/7.15 |
| 2018/0075563 A1* | 3/2018 | Ananthanpillai | G06Q 50/265 |
| 2018/0081935 A1* | 3/2018 | Papale | G06F 16/245 |

* cited by examiner

Leaderships' Information Needs

PREMISE 1: The timeline from *Situational/Awareness* to *Understanding* to *Decision-Making* needs to be as concise as possible, while ensuring all alternatives are addressed and compared

PREMISE 2: Visualized information speeds awareness and understanding, therefore improving the timeline for decision-making

PREMISE 3: Visualized information becomes available to leadership when "data" is processed through "Information Services"

PREMISE 4: Converging "Information Services" with communications/collaboration capabilities overcomes historical capability gaps

Fig. 4A

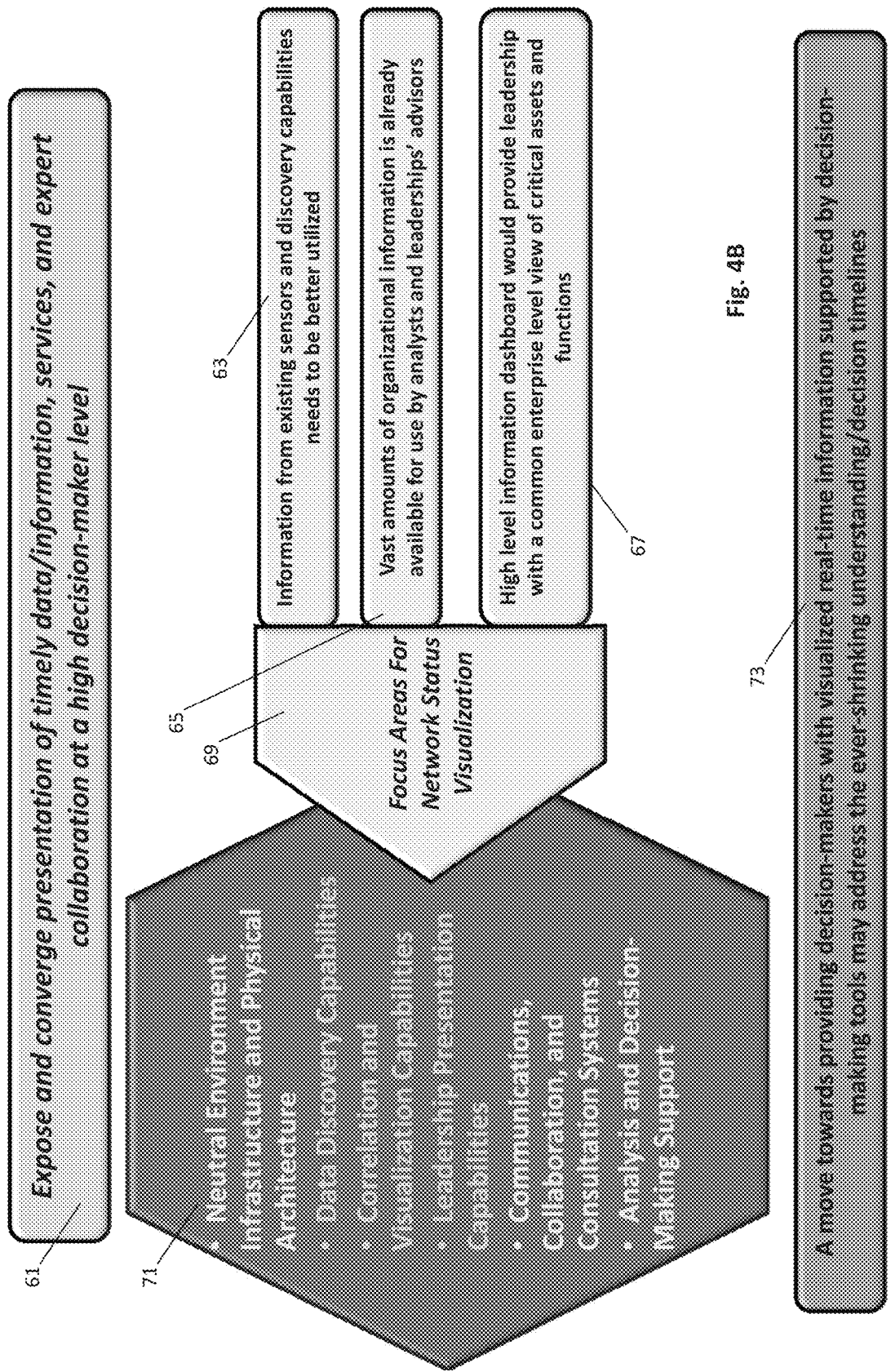

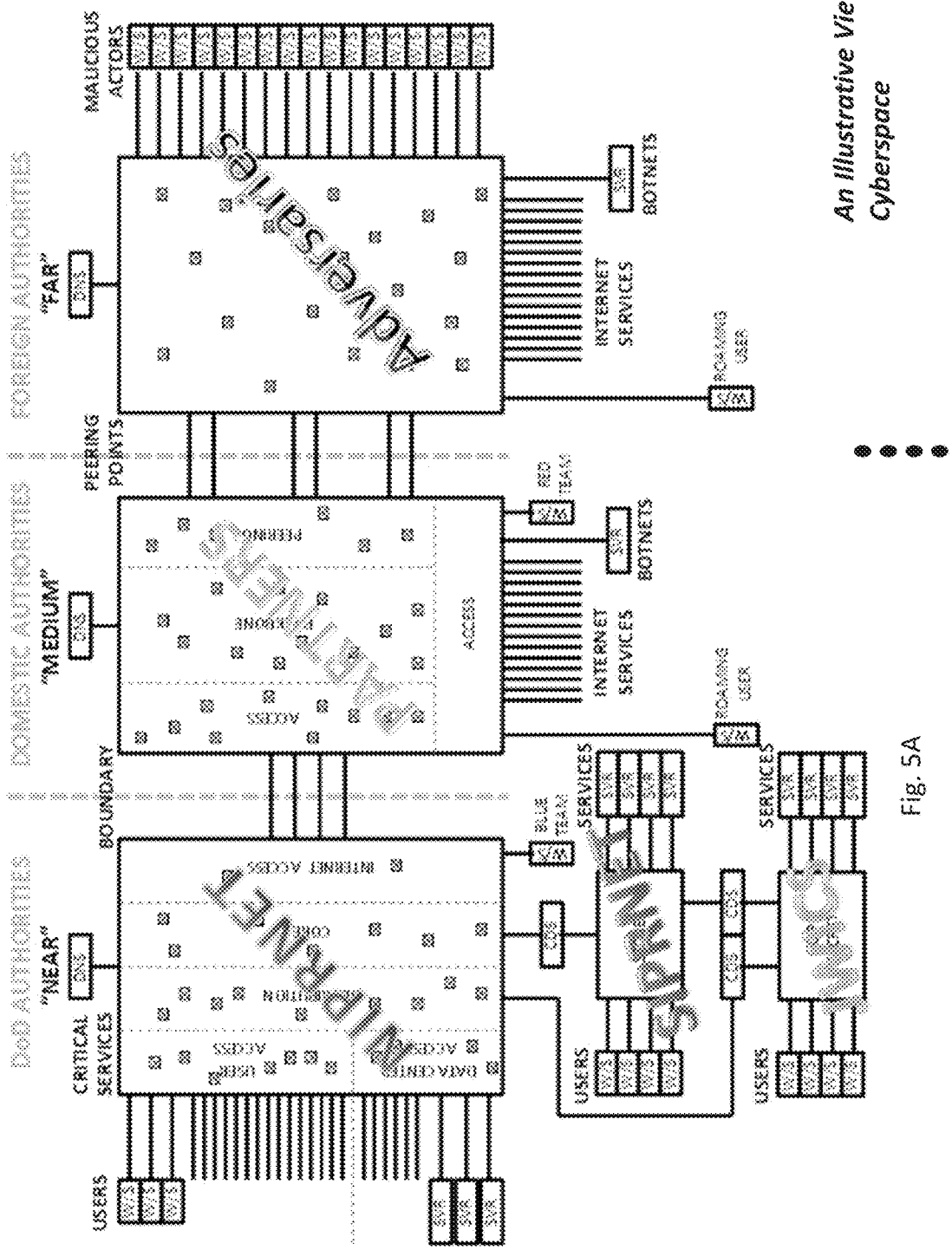

Determining Scope
Mapping Data to CIRs

- Establishing a framework for capturing data-sets, then mapping the data-sets against a set of CIRs. Examples include:
  - Any full regional communication outage within e.g., a geographic region or logical network
  - Leadership or CIO auto-trigger actions for events when demands exceeds 90% of capability
  - Leadership or CIO auto-trigger actions for events when 95% bandwidth utilization is exceeded for any single organization Internet access point

- Some specific examples pertaining to Emergency Action (EA) Conferencing:
  - Premature ending of a secure call (dropped call) – either point-to-point or on a conference call
  - Reduced backbone capacity of >25% (or a relevant level that indicates significant voice quality impacts)
  - Major security incident affecting any of the secure voice networks
  - Catastrophic effects on any of the infrastructure facilities (buildings, communications)

Fig. 5C

Data Correlation
Performing Correlation and Abstraction

Provisioning Accuracy and Detail
- Identify the right assets and whether they are properly provisioned
- Security restrictions impeding data collection
- SME involvement for identification of injection points, prioritization and data models
- Establishment of provisioning processes for proper alerting

Pre-Built Algorithms for Assessments
- Understand the system's anomalies, incidents, and problems and how to tell what is relevant
- Identify mid-layer management capabilities to sift through relevant data
- Use pre-defined metrics to support event / alert notifications by setting thresholds and weighting factors against data

Ease of Adding / Updating Algorithms
- Algorithms and business rules must be dynamic / modifiable
- Security controls are imperative, but shouldn't inhibit simple health status updates for timely submission
- Changes in relationships and infrastructure should not affect visualization accuracy, processes must be identified (Config Mgmt)

Correlation Types & Approaches
- Reactive correlation is likely the first step in establishing visualization
- Predictive correlation can occur once the framework is established
- Business rules can be tweaked / fine-tuned using temporal and historical info
- Over time algorithms can be tweaked for prediction of possible future events

Fig. 5E

Situational Awareness (SA)

- Customized and dynamic view of network health and status
- User-defined scope based on missions of interest
- User-defined presentation styles and drill-down capabilities reflecting the current state of the network

SA can include:

Representation of Enterprise IT and network status through a UDOP or dashboard display tied to broader capabilities and mission essential functions.

Fig. 5F

Rendering of Information into Visualization

Elements of an SA Visualization

- Web-based environment
- Support integration of massive, distributed data
- Several application linked together
  - Provide higher level understanding
  - Drilldown into specific issues
- Layered visualization
  - Easy association between affected asset and mission impacts
  - Multiple metrics displayed simultaneously
  - Dependencies are identifiable
  - Enable roll-over for quick summary

Leverage JARM Model for Visualization of Organization Networks, Tying Infrastructure and System Outages to Mission Impact Indicators

Fig. 5G

Defining Metrics

Metrics That Drive Actions and Decision Making

1. Infrastructure
   - Power Fluctuations — Security Breaches
   - Environmental Effects — Physical Damage 2. Connectivity
   - Link Status — Bit Error Rates
   - Bandwidth Changes — Latency, Jitter, SNR 3. Networks
   - Packet Loss — Intrusions
   - Encryption Failures — Dropped Calls 4. Platforms
   - End Device Status — Server Health
   - Storage 5. Enabling Software
   - Enterprise Services — Reliability/Availability
   - Data Bases — Identity Management 6. Service & Frameworks
   - Enterprise Frameworks — Data Model Schemas 7. Applications and Content
   - Net Ops — Business
   - Defense Intelligence — Warfighting 8. Functional Capabilities and People
   - People — Organizational Units 9. Processes & Capabilities
   - C2 — Ops Space Awareness
   - Net-Centric — Capability Areas 10. Missions & Objectives
    - PMEFs — Maintain Worldwide Situational Awareness

Fig. 6A

Major Entities per Layer (Layers 1-5)

| | Physical | Network | Platform | System | Enterprise services |
|---|---|---|---|---|---|
| Transport | • Wire transport<br>• Fiber transport<br>• RF | • Circuit networks<br>• Packet networks<br>• Termination point | • End devices<br>• Servers<br>• Storage services<br>• Operating systems<br>• Domain name servers | | • Domain enterprise svc<br>• Cross entrprs: common'd. svc<br>• Net centric services |
| Content | • N/A | • N/A | • Internal disk<br>• Portable media<br>• Memory | | • DB and repositories |
| Security | • Protected wire distr sys | • Network encryptors | • Full-disk encryption<br>• Trusted OS<br>• Chip-level security | | • Identity mgmt. |
| Management | • Link health/status<br>• Bandwidth mgmt | • Net. key mgmt.<br>• Net. config. mgmt.<br>• Net. control plane | • System mgmt.<br>• CPU utilization<br>• Hardware/OS config | | • Service mgmt. (ITIL) |
| Performance | • Signal attenuation<br>• Sig. strength/radiated pwr<br>• Signal/noise ratio<br>• Distortion<br>• Link latency<br>• Jitter<br>• Bandwidth<br>• Bit error rate | • Latency / round trip delay<br>• Switch / router cap.<br>• End to end bwidth<br>• Dropped pckt/frms<br>• Errored pckt/frms<br>• Call setup/sess. est. time<br>• Dropped calls<br>• Intrusion, alerts/events | • "Golden" metrics<br>• HBSS metrics | | • Reliability / avail.<br>• Service level<br>• End to end svc perform. |

Fig. 6B

Major Entities per Layer (Layers 6-10)

| L6 – Frameworks | L7 – Applications | L8 – Enterprise Activities | L9 – Threads | L10 – Objectives |
|---|---|---|---|---|
| Apps/Service/Concepts<br>• Right-to-operate-in-specific-designated-domains | • Network Ops<br>• Cybersecurity intel<br>• Business operations<br>• Product /Sales /Marketing / User Operations | • People<br>• Organizational units | Cross business unit capability areas<br>• Command and control across business unit data systems<br>• Net-centric systems<br>• Marketing, product competitors or cyberspace awareness | • Command and control<br>• Info management<br>• Network Operations |
| Information | • App data | • NA | | |
| Security | | • NA | | |
| Law – IB | | • NA | | |
| Management | | • NA | | |
| Space – IB | | | | |
| Maintenance | | | | |
| Space – IB | | | | |

Fig. 6C

Data Correlation

Considerations and Key Characteristics

Data correlation – Correlation of the massive amounts of data collected across multiple mission domains and network infrastructures.

- Cross-system data – normalize data across organizations/systems and different data formats and associate with thresholds/metrics for current status levels of the network

- Importance of mission data – focus on critical systems as tied to mission needs and indicators of attack/issues

- Dependencies – understanding the threads of an entity, its successor and predecessor dependencies, is key to visualization

- Audience – understand that the user cannot be expected to be an expert in certain domains

- Provide human context – a visualization must provide a context in which to interpret the data

Fig. 7

Network Awareness Application: Mission Page

Network Awareness Application: Mission Page

Purpose: track status and risk for a single mission

- See alerts related to the mission, key assets

- Sunburst viz provides visual perspective on dependencies for the mission, and potential issues

- Click a particular alert/asset to see summary info for that asset (bottom right panel), or navigate to the asset page.

207

| Step 801: Determine information needs, e.g., critical information needs, for one or more echelons of decision or leadership elements |
|---|

| Step 803: Determine inhibitors or problems to meet critical information needs including point solutions or local optimizations, limited data sharing rules or culture, technology limitations, and other culture problems |
|---|

| Step 805: Evaluate data visualization relative to decision making that represent the most relevant or critical information to a particular user or set of users |
|---|

| Step 807: Determine scope of visualization e.g., mapping data to critical information requirements (e.g., once a framework is established for capturing data-sets, those data must be mapped against a set of CIRs (e.g., full regional communication outage within a region of interest, cyber or information system related auto-trigger actions for events when demands exceeds, e.g., 90% of capability, information system auto-trigger actions for events when, e.g., 95%, bandwidth utilization is exceeded for any single Internet access point, premature ending of a secure call (dropped call) – either point-to-point or on a conference call, reduced backbone capacity of, e.g., >25% (or a relevant level that indicates significant voice quality impacts), major security incident affecting any of the secure voice networks, catastrophic effects on any of the infrastructure facilities (buildings, communications), etc |
|---|

| Step 809: Defining Metrics - Metrics That Drive Actions and Decision Making – e.g., Within each layer of the JARM reference model, metrics must be collected that support the capture and identification of CIRs... which ultimately drives actions and critical decision making |
|---|

| Step 811: Determining Data correlation – Correlation of the massive amounts of data collected across multiple mission domains and network infrastructures (e.g., Cross-system data – normalize data across organizations/systems and different data formats and associate with thresholds/metrics for current status levels of the network; Importance of mission data – focus on critical systems as tied to mission needs and indicators of risk or vulnerability/issues; dependencies – understanding the threads of an entity, its successor and predecessor dependencies, can be key to visualization; Audience – understand that the user cannot be expected to be an expert in certain domains; Provide human context – a visualization must provide a context in which to interpret the data |
|---|

| Step 813: Rendering of Information into Visualization: Elements of an SA Visualization - Web-based environment (e.g., Support integration of massive, distributed data; Several application linked together; Provide higher level understanding; Drilldown into specific issues; Layered visualization; Easy association between affected asset and mission impacts; Multiple metrics displayed simultaneously; Dependencies are identifiable; Enable roll-over for quick summary; Leverage JARM Model for Visualization of DoD Networks, Tying Infrastructure and System Outages to Mission Impact Indicators) |
|---|

Fig. 18

Step 901: Determine assets to be visualized, associated configurations of the assets as a baseline Step 903: Once an accurate set of assets and associated configurations are base lined, a metrics step is established to measure the health and status as well as security posture of each of the assets or in some cases a set of assets. Actual measurements and metrics that are required for each asset is dependent upon and driven by the critical information requirements (CIR). A CIR may be defined as what needs to be measured on a particular asset or set of assets in order to determine if a threshold was crossed that would cause a health and/or status alert to occur. In some cases, this may just be a "system up" or "system down" indication. In other cases, asset performance is critical and measurements of bandwidth, CPU or disk utilization, etc. are needed.

Step 905: Determine rules for rule base or software to identify and aggregate data/save data from a low to high level which impacts various hierarchical tiers of visualizations from a subsystems to systems relationship based on determined dependencies. In this example, three different types of rules are provided which roll up data from low level to high level ((1 Default – average to roll things up; 2) Awareness status computation – grey boxes – grey means – lack of information box; plus red, green and yellow. How are missing information addressed. Rolling up awareness on how much a system knowledge about individual CIRs, assets, or relationships. 3) weighted value – changes weights for dependencies.)

Step 907: Execution initiated

Step 909: Load and execute daggerapp.java (see code appendix)

Step 911: Initialize, startup, and ready

Step 913: Initialize function – starts up the data feeds to collectors – data sources – goes out to the sources vs sources coming to the tool.

Step 915: Startup function – constructs and shows graphical user interfaces (GUI)

Step 917: Execute ready function – more GUI setup

Step 919: Execute Daggerview.java (see code attachment) comprising steps 921 to 931)

Step 921: Initialize GUI – generates the various GUIs comprising Layer view, Sun Burst View, Item Detail Views, Favorite Entities View, etc Step 923: Generate layer view – two categories – infrastructure / services (layers 1-7) and organization/entity (e.g., layer 8) e.g., national command entities plus entity (e.g., org) capabilities plus supporting capabilities (layers 9 and 10)

Step 925: Generate sun burst view – mission / capabilities

Fig. 19A

Step 927: General item (e.g., entity or object) details view – click on item – display what goes with the tool set/item – e.g., see power point presentation NVizArch-Design – e.g., emergency action conference call panel with asset info Step 929: Generate favorite entities view – short list of things that matter (mission assets view in power point presentation – like the favorites view)

Step 931: Generate alerts view – not implemented – on side – side panel (shown as mission alerts)

Step 933: Load a model – in this example, a user can load explicitly or system can be configured to load a particular model based on various configuration settings – e.g., load model command in this embodiment is in DaggerApp – "Lmodelimpl.java" can be provided as a name of a class – method returns this class and makes it available for the GUIs and computation functions. A model here can be a set of layers, a set of objects/entities in each layer; objects/entities have dependencies that depend on other objects, a set of properties, a set of metrics, a set of status data as well as a name/identifiers etc. In a web application, model is pre-configured or loaded prior to the GUI kicking off. Launch page is where model selection occurs (not shown). For example, a leadership or command/control model is shown in at least some figures herein. Where a Java application is used, then the model can be loaded from a command page or a launch page. Views correlate to models layers and objects. GUIs can include layers which correlate to the model layers and the layer views showing objects/entities within the layers correlate to the model objects/entities. (note the code uses "entities"). An object / entity in the model – is a box that shows up in a view – name, identifier, list of properties, list of metrics, and list of dependencies. The exemplary list of dependencies are a list of other entities which have some relationship to the entity in question such as a supplier or receiver relationship. In this example, display shows impact of degradation or loss with respect to other entities.

Step 935: Execute computation (computed metrics) and also Daggerview then feed loaded model with data. Where a boundary of a model determines what goes into a given model versus what is outside the model. Once model and GUIs are loaded, then data feeds operate and gather data from sources, then data is a list of indicators – the system will map the indicators to the items. E.g., network connectivity is up or down – current CPU percentage etc. Data feed maps to properties or metrics in object / entities in the model. One of parameters in the view that can be switched is what computation that the user is using. What determines the color in effect. Metrics that come from data feeds and metrics that are computed based on initial or data feed metrics. Data feed supplies data for properties and metrics. This acts as a trigger for computation. There is no notion of history in this exemplary embodiment so it overwrites e.g. network connectivity. Metric for network connectivity is up or down (zero or one). When data feed comes in, then computation module will update the network connectivity for system X metric data – as e.g., zero – which in turn triggers a change in metrics for other systems/entities/objects that are listed in updated object/entity's dependency list. Every time a data feed is received, then the system re-computes all entity / object data metrics which in turn updates other metric elements in other entity /objects which in turn changes or does not change the GUI element colors.

Fig. 19B

Step 937: Execute filtering capabilities – filter layers or objects/entities. User actions are defined in either Daggerapp or Daggerview in this embodiment. All user actions have an annotation next to the method which e.g., is "@" symbol followed by the word action. "@ action ....." This modifies an appearance or elements / presentation / organization of a GUI. Permits a user to look at elements of particular interest. Could have all be stuck in daggerview.

Step 939: What if capability – Modeling and simulation capability – Additional user defined action. E.g., alter computed metrics which in turn updates the model. For example, positioning a mouse cursor over a layer or a layer entity will alter computed metrics associated with that layer or entity which then triggers a re-computation of metrics associated with entities listed in a dependency list associated with the use selected layer or entity. E.g., a GUI can have an entity selection function which displays a list of all entities – a user can select an entity – then a slider bar or input field is provided which permits the user to adjust metrics associated with the selected entity e.g., overseas connectivity for DISA – where the slider changes a metric from zero to 100% connectivity – which in turn alters the color of various elements of the Layer GUI e.g., User summary showing all layers and high level elements of each layer on one side and Mission page (sun burst view).

Fig. 19C

Software Architecture Overview: Exemplary Basic Packages List

| Class | Description |
|---|---|
| AwarenessStatusComputation | A metric that computes the level of awareness of an entity based on the awareness of its dependencies and its feeds, using a heuristic calculation involving the percentage of known metrics and dependents; an implementation of LComputedMetric. |
| DefaultStatusComputation | A metric that computes a general item status based on the status of its dependents and its feeds, using a heuristic calculation involving the average dependent status multiplied by the average feed status; an implementation of LComputedMetric. |
| LEntityImpl | The standard implementation of LEntity. |
| LFeedManager | Manages a set of status feeds whose updates are used to update the visualization, along with the ability to enable/disable feeds. |
| LMetricFeedSupport | Provides some of the basic functionality required for an LMetricFeed, including basic status |
| LModelImpl | The standard implementation of LModel. |

Fig. 21A

Software Architecture Overview: Exemplary Basic Packages List

| Package | Description |
|---|---|
| LModelPersistenceDelegate | Provides an ability to read and write LModels to XML files. |
| LModelPersistenceDelegate.LayerSortItem | Delegate for serializing a layer within an ordered list. |
| LModelPersistenceDelegate.LayerSortOrder | Delegate for serializing an ordered set of layers. |
| LModelPersistenceDelegate.LEntityPersistenceDelegate | Delegate for serializing an entity. |
| LModelPersistenceDelegate.LMetricPersistenceDelegate | Delegate for serializing a metric with a fixed value. |
| LModelReader | Provides an ability to create an LModel from a file describing entities, layers, and properties in a CSV-like format. |
| LModelUtils | Provides a set of methods for working with LModels and the rest of the Dagger API classes. |
| LModelUtils.FixedMetric | A metric whose value is fixed. |
| WeightedStatusComputation | A metric that computes a general item status based on the status of its dependents and its feeds, where some dependents may be labeled as "non-mandatory", using a heuristic calculation involving the average dependent status multiplied by the average feed status, with non-mandatory parents weighted significantly less, an implementation of LComputedMetric. |

Fig. 21B

Software Architecture Overview: API Overview

| Package | Description |
|---|---|
| edu.jhuapl.dagger | Provides standard implementations of Dagger API classes. |
| edu.jhuapl.dagger.api | Defines the core API for Dagger, including the description of a Dagger model and the mechanisms for mapping data to the model. |
| edu.jhuapl.dagger.app | Provides the entry-point into the Dagger application (DaggerApp), the functionality for managing data feeds, and some of the user interface elements for the application. |
| edu.jhuapl.dagger.feeds | Provides examples of data feeds that can be used to import metrics into Dagger. |
| edu.jhuapl.dagger.views | Provides the user interface components for visualizing Dagger models, entities, and entity details. |

Fig. 22A

Software Architecture Overview: API Overview

| Interface/Enum | Description |
|---|---|
| IComputedMetric | A version of a metric that is computed based on the value of other metrics it depends on. |
| IDescribable | An interface guaranteeing that items have consistent names and description fields. |
| IEntity | An arbitrary entity that has structure (layer and group fields, and dependency relationships with other entities), metrics (status or otherwise), and a set of arbitrary properties. |
| IMetric | A metric with a name, description, value, and methods to determine whether its value was recently updated. |
| IMetricFeed | Groups together a collection of metrics that can be collectively updated. |
| IModel | Maintains a collection of entities and the (acyclic) dependencies among them, using a directed acyclic graph (DAG) of IEntity objects. |
| Enum | Description |
| IVerifiedFeedStatus | Indicates whether a feed is active, inactive, or broken. |

Fig. 22B

Software Architecture Overview: App Overview

| Class | Description |
|---|---|
| DaggerAboutBox | UI dialog displaying basic information about Dagger. |
| DaggerApp | Creates and launches the Dagger application, including the user interface and processes to manage data feeds. |
| DaggerApp.StateBean | Delegate for serializing user settings for Dagger, including the last open file and a set of favorite items. |
| DaggerView | Configures and displays Dagger's primary view. |
| IDirectoryModel | Non-essential test utility that generates an IModel from a directory structure. |

Fig. 23

Software Architecture Overview: Feeds Overview

| Class | Description |
|---|---|
| FileFeed | Example of a metric feed that provides metrics reporting on the existence of files matching a pre-specified filter for a pre-specified entity. |
| FileFeed.FileLookup | Describes a lookup test, updating status based on existence of one or more files. |
| ITSDFeed | Example of a metric feed that provides metrics based on the content of a pre-specified URL. |
| NIAECSensorFeed | Example of a metric feed that provides metrics based on content retrieved from an external web service API. |

Fig. 24

Software Architecture Overview: Views Overview (e.g., edu.jhuapl.dagger.views)

| CLASS | DESCRIPTION |
|---|---|
| EditEntityPanel | UI component for editing the name, layer, group, and dependencies of an item. |
| EntityList | UI component for displaying a list of entities with their current status. |
| EntityList.EntityCellRenderer | Renders an entity's name and status, for use in a list. |
| EntityPanel | UI component for displaying details about an entity, including its name, group, dependencies, properties, metrics, and current status, and for providing the user with actions relevant to the entity. |
| EntityStyleDelegate | Responsible for rendering an item as a labeled box with color based on the currently selected metric. |
| EntityStyleDelegate.EntityShapeStyle | Subclass ShapeStyle for customized entity styles. |
| EntityTipDelegate | Responsible for rendering the tooltip of an item that appears when the user hovers the mouse on an item and wishes to see more detail. |
| FeedPanel | UI component for displaying the status of currently active feeds. |
| FeedPanel.FeedIcon | Displays an icon representing feed status. |
| LModelCombo | UI component for selecting one of the entities in a LModel. |
| LModelLayerView | UI component for displaying a LModel as a set of entities grouped by layer, using EntityStyleDelegate to render individual entities with colors based on their current status, using EntityTipDelegate to provide tooltip details, and providing the ability to filter the view to a subset of layers and/or to all items depending on the currently selected item. |
| LModelSunburstView | UI component for displaying a hierarchy of dependencies for the selected items in a "sunburst" view, where the central item is the selected item and dependencies of the item are shown in outer rings to illustrate "critical dependency paths". |
| LModelWhatIfPanel | UI component and logic for simulating a degraded or enhanced status for a single entity, triggering an updated visualization whenever the user selects a modified status. |

Fig. 25

Exemplary Call Hierarchies for Key Methods: Application Lifecycle

Initialization
- DaggerApp.main() – called when process starts
  - #initialize() – initialize the application
    - LFeedManager.registerFeedServices() – setup data feeds for UI
  - #startup() – set up the views
    - Initialize DaggerView – set up UI
    - restore UI settings from local storage using StateBean
    - show() – make the UI visible
  - #ready() – additional set up after the UI is visible
    - add menu items for each data feed, using internal class EnableFeedAction and feeds that have been registered as "plugins" and accessed via LFeedManager.getFeedNames()
    - add menu items for each sample model
  - user starts using the application

Shutdown
- User chooses to exit
  - DaggerApp.shutdown()
    - LFeedManager.disableUpdates() – stop any data feeds
    - save UI settings to local storage using StateBean
    - application and process terminate

FIG. 33

Exemplary Data Feed Updates (E.g. see Fig. 32(473))

Turning on a Data Feed
- User activates a metric by selecting the menu option
  - DaggerApp.EnableFeedAction#actionPerformed()
    - #loadFeed() – sets up the LMetricFeed object that will retrieve the data
    - LFeedManager.enableUpdates() – starts a separate thread to periodically ask the LMetricFeed to retrieve updates and register handler for when updates are received [see next item]

FIG. 34

Periodically Retrieve Data Feed Updates (E.g., see Fig. 32(473))
Feeds are checked on a periodic basis, and will detect changes to an external system or data source when they are refreshed.

- TimerThread#run() – triggered by timer set up when data feed was activated
  - LMetricFeedSupport#run()
    - #updateMetricValues() – retrieve metric data and update the feeds status
      - #updateMetric() – feed saves metric update to temporary storage
      - #updateProperty() – feed says property update to temporary storage
    - update the feed's status to indicate whether or not update was successful
    - update the "last update time" for the field
    - notify listeners if metrics and/or properties changed
      - For each metric update in temporary storage, call LEntity#updateMetric() – update the entity's table of metrics
      - For each property update in temporary storage, call LEntity#setProperty() – update the entity's table of properties

(CONTINUATION FROM FIG. 35A)

- LModel#updateStatusValues() – recompute all metrics in the model (Fig. 32(477))
    - For each item in the model, call LEntity#invalidate() – mark metrics as needing computation
        - For each metric in the item, call LMetric#invalidate() to mark it as needing computation
    - For each item in the model, call LEntity#updateStatusValue() – recompute all metrics for the item
        - For each LComputedMetric in the item, call LComputedMetric#recompute() – compute according to specific heuristic (AwarenessStatusComputation, DefaultStatusComputation, or WeightedStatusComputation)
            - For each LMetric required for the calculation, call #getValue() to retrieve its value, recomputing if the metric has not yet been computed
            - Mark metric as "valid" to indicate its value is current
- DaggerView#updateMetrics() – update views with updated data (Fig. 32(479))
    - LEntityPanel#updateMetrics() – update the entity details view to show the new status, and update the tables of metrics and properties for the entity
    - LEntityJPanel#refresh() – refresh list of favorites to show new data
    - LModelLayerView#repaint() – refresh primary layer view to show new data and new colors
- DaggerApp#logFeedMessage() – log information about feed for debugging

FIG. 35B

What-If Interaction (E.g., see Fig. 32(475))

- User selects the "what-if analysis..." option in the UI
    - DaggerApp#whatIf()
        - Initialize LModelWhatIfPanel for the current model
            - Set up the UI, including a combo box for selecting items and a slider for selecting status
            - #setModel() – set up combo box with list of items in the model
            - Set up behavior for when a new item is selected
            - Set up behavior for when status is changed
        - DaggerApp#show() – Show the dialog
- When the user selects an entity from the combo box, or changes the status
    - LModelWhatIfPanel#updateEntity()
        - If there's a new entity
            - LEntity#setStatusMetric() – restore the old entity's non-hypothetical status metric from temporary storage
                - LMetric#invalidate() – mark the updated metric as needing computation
                - LEntity#updateStatusValues() – recompute all metrics for the item, as above
            - LEntity#getStatusMetric() – save the new entity's non-hypothetical status metric into temporary storage
        - LEntity#setStatusMetric() – replace the entity's actual metric value with a temporary hypothetical value
        - LModel#updateStatusValues() – recompute all metrics in the model, as above (Fig. 32 (477))
        - DaggerView#updateMetrics() – update views with updated data, as above (Fig. 32 (479))
- When the user closes the dialog
    - LModelWhatIfPanel#setEntity() – reset the what-if entity
        - LEntity#setStatusMetric() – restore the old entity's non-hypothetical status metric from temporary storage, as above
        - LModel#updateStatusValues() – recompute all metrics in the model, as above (Fig. 32 (477))
        - DaggerView#updateMetrics() – update views with updated data, as above (Fig. 32(479))

FIG. 36

HUMAN-MACHINE VISUALIZATION INTERFACES AND PROCESSES FOR PROVIDING REAL TIME OR NEAR REAL TIME ACTIONABLE INFORMATION RELATIVE TO ONE OR MORE ELEMENTS OF ONE OR MORE NETWORKS, NETWORKS, AND SYSTEMS OF NETWORKS

CROSS-REFERENCE TO RELATED APPLICATIONS

The present application claims priority to U.S. Provisional Patent Application Ser. No. 62/156,135, filed May 1, 2015, entitled "HUMAN-MACHINE VISUALIZATION INTERFACES AND PROCESSES FOR PROVIDING REAL TIME OR NEAR REAL TIME ACTIONABLE INFORMATION RELATIVE TO ONE OR MORE ELEMENTS OF ONE OR MORE NETWORKS, NETWORKS, AND SYSTEMS OF NETWORKS ABILITY TO SUPPORT ONE OR MORE ORGANIZATIONAL ELEMENTS, MISSIONS ASSOCIATED WITH THE ORGANIZATIONAL ELEMENTS AND CAPABILITIES OF THE ORGANIZATIONAL ELEMENTS," the disclosure of which is expressly incorporated by reference herein.

STATEMENT REGARDING FEDERALLY SPONSORED RESEARCH OR DEVELOPMENT

The invention described herein may be manufactured, used and licensed by or for the United States Government for any governmental purpose without payment of any royalties thereon. This invention (Navy Case 200,231) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The field of the invention relates to human machine interfaces in a complex computing network. In particular, embodiments of the invention include human-machine visualization interfaces and processes for providing real time or near real time actionable information relative to one or more elements of one or more networks, and systems of networks ability to support one or more organizational elements, missions associated with the organizational elements and capabilities of the organizational elements A need exists for a set of comprehensive real-time or near real-time tools/capabilities and processes for the various organizational elements, e.g., leadership, to be able to access the status of the organization's networks and their ability to support various missions. Many isolated efforts exist to bring network health and status information back to parent organizations. A need exists to use existing systems to a maximum extent rather than creating new systems which are costly and generally fail. These isolated pockets of information must be capitalized on to provide a clear and comprehensive situational awareness (SA) of the network. In addition to finding the existing network monitoring efforts, the framework for collecting, normalizing and storing the metric data should be used to the fullest extent possible. Incorporation of existing frameworks will provide greater compatibility with existing efforts and speed up the implementation of needed tools and processes including visualization interfaces.

The United States Army Field Manual defines "Situational Awareness" as "Knowledge and understanding of the current situation which promotes timely, relevant and accurate assessment of friendly, enemy and other operations within the battle space in order to facilitate decision making." With respect to information systems and networks, SA can encompass networks, network elements, organizational element (including key personnel) missions/capabilities that those networks support. SA can and likely should also encompass creation of an awareness of relationships between networks, network elements, and how those networks contribute or effectuate organizational element mission/capability and the probability of success or failure. SA can also include providing actionable information and assessments of current operations occurring within an organizational element's network, including its security or information assurance capability, and a capability to assess potential breakdowns, weak areas or vulnerabilities that can be exploited to the maximum effect in degrading a system which in turn impacts a capability or mission. SA can also include monitoring for unusual events within a network or that may impact a network externally prior to impact.

A variety of SA models have been proposed generally but they generally break down when attempted to be used in high complexity environments. For example, the Observe, Orient, Decide, and Act (OODA) loop process has been used but this system does not account for high complexity systems that overload human cognitive abilities such as large scale information systems. Another example includes risk management models such as the Department of Homeland Security (DHS) National Infrastructure Protection Plan (NIPP) which sets forth a risk management framework that provide the unified approach needed for a cybersecurity and key infrastructure risk management framework such as shown in FIG. 1. Other models can be used as well.

This disclosure includes a variety of network SA and organizational element decision support systems, methods for producing these systems, and processes associated with generating this SA and decision support system are provided. The disclosure also provides details on the invention that includes methods for creating an apparatus related to human-machine visualization interfaces and processes for providing actionable information on element of networks, networks, and systems of networks ability to support one or more organizational elements, missions associated with the one or more organizational elements, and capabilities of the organizational elements.

One of many challenges in information system design and operation are improving capabilities to operate and defend networks and information systems at network speed, to ensure critical activities can continue during disruption or degradation events. For example, this disclosure includes an approach to visualizing the health and status of organizational networks that provides that mission-focused SA from a perspective appropriate to various echelons of the organization including senior leadership. The disclosure includes exemplary methodology for building a SA tool. An exemplary method presented uses a pyramid icon to show various exemplary steps employed and employs a configuration management strategy to ensure a suitable SA picture or visualization is presented. As one exemplary approach, a layering model is provided that shows layers and elements of the layers that includes a hierarchical view of network/systems of network infrastructure, organizational elements (e.g., functions and specific organizations/personnel), capabilities of such elements, supporting organizational elements, and capability areas associated with the elements. This layering model decompose the components of a network and system of networks plus facilitates in creating a viewable traceability and awareness of real time or near real time inter-dependencies of information flow and impact on missions and capabilities. This exemplary model comprises ten layers and provides a visual understanding of what items can be monitored and consolidated for presentation on a SA visualization. This system includes visualization systems that can be based on metrics which are updated from data sources such as, Chief Information Officer (CIO) Critical Information Requirements (CIR).

BRIEF DESCRIPTION OF THE DRAWINGS

FIGS. 4A and 4B show an overview of an exemplary decision maker's information needs and an overview of a leadership information services needs for such services;

FIG. 5A shows an exemplary overview of elements of one approach to determine Critical Information Requirements (CIR) and scope of a visualization development effort;

FIG. 5C shows additional exemplary aspects of determining scope associated with mapping data to CIRs associated with developing visualization tools;

FIG. 5E shows exemplary factors for determining correlation and abstractions used in developing visualization tools;

FIG. 5F shows an exemplary overview of SA elements which can be used in developing visualization tools;

FIG. 5G shows an exemplary set of SA elements which can be used for developing visualization tools;

FIGS. 6A, 6B and 6C show some exemplary metrics that can be used for driving actions and decision making relative to layers of a common reference model (e.g., Joint Architecture Reference Model (JARM)) that support capture and identification of CIRs);

FIG. 7 shows exemplary data correlation considerations and key characteristics which can be used in development of visualization tools;

FIG. 18 shows a method associated with determining and selecting information which is then used to render information into visualizations in accordance with various embodiments of the invention;

FIGS. 19A, 19B and 19C show a segment of another exemplary method of determining and selecting information which is then rendered into visualizations in accordance with various embodiments of the invention;

FIGS. 21A and 21B shows an overview of an exemplary software architecture or file overview including basic package list in a Java language format;

FIGS. 22A and 22B show an exemplary software architecture or file set overview including an API file set overview;

FIG. 23 shows an exemplary software architecture or file set overview including an APP file set overview;

FIG. 24 shows an exemplary software architecture or file set overview including a feeds file set overview;

FIG. 25 shows an exemplary software or file set overview including a view file set overview;

FIG. 33 shows an exemplary call hierarchy for exemplary key methods or subroutines including an exemplary initialization and shutdown sequence.

FIG. 34 shows another exemplary call hierarchy for exemplary key methods or subroutines including an exemplary method or function call sequence for activating an exemplary data feed updates;

FIGS. 35A and 35B show another exemplary call hierarchy for exemplary key methods or subroutines including an exemplary sequence for executing periodically retrieved data feed updates; and FIG. 36 shows another exemplary call hierarchy for exemplary key methods or subroutines including an exemplary method for activating a "What-If" interaction machine operation.

DETAILED DESCRIPTION OF THE DRAWINGS

Figure 1:
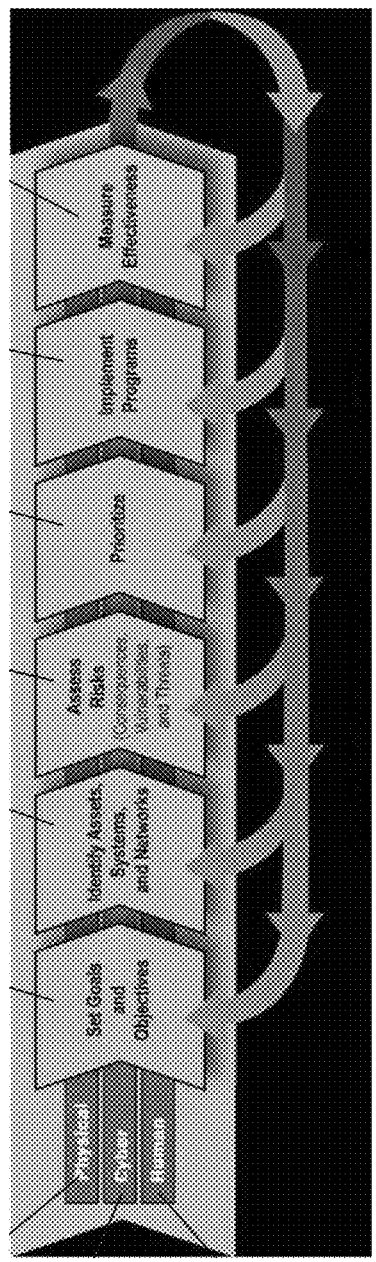
FIG. 1 shows one example of a cybersecurity and key infrastructure risk management framework.

In the following detailed description, reference is made to the accompanying drawings, which form a part hereof, and in which is shown by way of illustration specific exemplary embodiments of the invention. These embodiments are described in sufficient detail to enable those of ordinary skill in the art to make and use the invention, and it is to be understood that structural, logical, or other changes may be made to the specific embodiments disclosed without departing from the spirit and scope of the present invention.

Generally, embodiments of the invention can provide an application for aggregating very large amounts of data regarding entities with multiple hierarchical dependencies. Exemplary entities can have an associated status metric, that is computed based on its own status (via incoming or fixed status feeds), together with the status of entities that it depends on. Typical use-cases might be: visualizing the status of a large, interconnected, infrastructure network; depicting the dependencies among various code libraries.

Data Feeds. In some embodiments, two elements are needed to populate the visualizations: a core model (dependencies among entities represented as a directed acyclic graph), and data feeds. Data feeds can be registered programmatically or through the command line. When a feed is activated, an icon (a small circle) can be shown by the feed name, and in a status panel. The exemplary icon indicates whether the feed is returning data successfully (green), or unable to connect (red). When the user switches layer models, all data feeds are de-activated.

Visualizations. In some embodiments, two visualization options can be provided: a layer visualization and a sunburst visualization. These visualizations may be displayed separately, or shown side-by-side. Each entity has its own shape, whose color indicates the entity status (gray indicates no status information). Another element of an embodiment can include a tooltips drop down that shows a computation used to generate the status value.

Layer View. In some embodiments, a layer view is provided where a user can move a mouse cursor over an entity to see all entities within the dependency tree of the selected entity. This embodiment can include both entities that depend on the selected one, and entities the selected one depends on. Hold down shift or alt to limit the highlighting to one side of this tree.

Filtering a Layer View. In some embodiments, two options can be provided for filtering a layer visualization. A user can show or select only a subset of all available layers (under view menu), or if an entity is selected, a user can limit the view to entities within the selected dependency tree.

Sunburst View. In some embodiments, a sunburst view displays one side of an entity's dependency tree. Selecting an entity in the favorites view or in the layer view centers the visualization on that entity. Since the dependency hierarchy is not necessarily a tree, some entities may be shown more than once in the sunburst view. If you move the mouse over an entity on the right, you will see everywhere the entity shows up in the sunburst view.

Favorites Entities. Some embodiments of the invention allows a user to track a number of "favorite" entities. The status of these entities is shown permanently in the favorites list at the right side of the screen, and is automatically stored locally so the same list will be shown the next time the user runs the application (on the same machine). To mark an entity as a favorite, select the entity and press "Ctrl+F", or toggle the star shown on the entity panel.

What-If Analysis. In some embodiments, to simulate the impact of an entity failure, a user can perform a "What-If Analysis . . . ". A user can select an entity, and then manually adjust its status. A user can see an impact propagate throughout the dependency chain.

Figure 2:
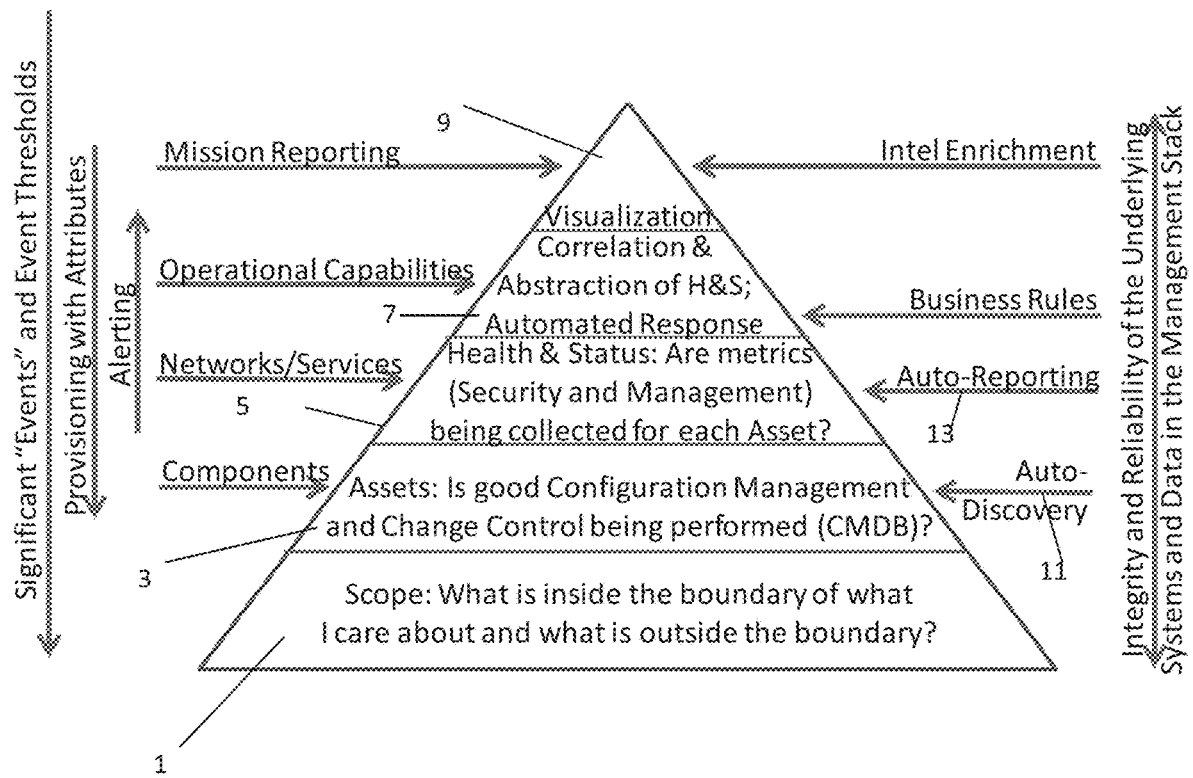
FIG. 2 shows an exemplary context for development of a visualization scheme.

Senior leaders require information that drives action with minimal additional cognitive processing or filtering of data in order to perform their function. An accurate, timely, and complete response to or in anticipation of incidents affecting their enterprise requires a SA visualization capability that is built upon several tiers of information and analytics as well as processes for setting and maintaining accurate compilations and correlations of that information. FIG. 2 shows a tiered view of one methodology for providing an accurate and timely visualization associated with effective decision making. The tiers of the FIG. 2 pyramid depict exemplary steps, from the bottom up that an organization can employ in order to build a SA view to one level of an organization, e.g., senior leadership to aid in their decision making.

The FIG. 2 methodology steps generally can include determining scope of a SA tool focus 1, selecting assets to populate a system associated with the SA tool focus 3, determining metrics (e.g., security and management) associated with the selected assets such as health and status 5, correlation and abstraction of metrics suitable for generating actionable information for selected organizational element (e.g., leadership; CIO, etc.) and automated response 7, and generating visualizations based on preceding model steps 9. Enabling or supporting elements of these steps associated with ensuring integrity and reliability of underlying systems and data in metric stack include: provisioning of discovery of assets to support asset selection step 3 including auto discovery 11; automatic reporting of data 13 associated with the metrics associated with the determining metric step 5; determining and coding business rules associated with the correlation and abstraction of metrics step 7; and creating SA on disruptive or degradation event sources (DDES) which can include intelligence on such DDES. Enabling or supporting elements associated with determining metrics which are used to drive aspects of the invention including operation of visualization interfaces such as significant events and event thresholds, provisioning visualization attributes, and alerting: components which are associated with assets; networks/services associated with attributes of interest associated with information systems or networks of interest e.g., health and status (metrics of security and management) associated with each asset; operational capabilities associated with correlation & abstraction of attributes of interest (e.g., health and status) and automatic responses; mission reporting associated with visualization capability.

There are several critical aspects needed for maintaining a "solid" pyramid (FIG. 2) through time. First, the identification of significant events and event thresholds that are derived from the Critical Information Requirements (CIRs) need to be established and updated over time since they drive the bottom up process for visualization. They will most likely change over time when CIRs change. Next, provisioning of new operational capabilities and corresponding assets should be done in the context of the mission(s) that they are supporting. During the acquisition and/or provisioning process, this mission information needs to be captured as an attribute of the capability/asset in order to more accurately tie the health, status, performance, and security posture of that capability/asset to a particular mission or set of missions. Third, in order to accommodate timely decision making, an underlying mechanism for real-time alerting is recommended. This alerting mechanism would not be used by routine network/systems management tools but instead would be reserved for higher priority alerting traffic that has low-latency constraints—comparable to an Automatic Message Handling System (AMHS) system used for critical information to report messages. Finally, and possibly the most important aspect of this entire structure, is the need for maintaining integrity and reliability of the underlying systems and data that are being used to derive an accurate and timely picture of situational awareness for the decision maker. If this underlying capability or the data that it is utilizing is corrupted, unavailable, or poorly maintained, then the wrong picture of situational awareness will be presented to the decision maker and will most likely result in a poor or potentially fatal decision. It is critical that the Chief Information Officer (CIO) decision making visualization is built upon these tiers of the pyramid of information, analytics and processes in order to ensure the highest level of accuracy and timeliness.

Starting at the base of the FIG. 2 pyramid, a first step 1 is to determine a well-defined scope, or boundary of interest, for the situational awareness posture that needs to be monitored and reported to a selected element of an organization, e.g., senior decision makers. In this illustrative example, situational awareness reporting is targeted at senior leadership in one large organizational element as well as across an organization that the large element is located within (e.g., Federal government) including specific elements within the leadership elements of the organization (e.g., Executive Office of the President). In one example, a focus is on decisions made by an organizational CIO with a scope of networks under the CIO's authority and critical missions that rely on those networks. As an example of a design methodology focusing on an organizational element's perspective, a design methodology's scope requires tailoring SA to the needs of the CIO and identifying that element's CIRs. Events that drive changes in a selected organizational elements SA (e.g., CIO) requiring attention of the CIO help define the scope of a needed visualization capability.

A significant challenge in developing an effective visualization capability includes ensuring events in the network of interest must be represented not as technical measures but in terms of mission impact for any missions of interest to a CIO. Setting and maintaining a well-defined scope is a foundational step for enabling real time or near real time decision making. This scope can be expanded to other parts of the enterprise and added to the visualization capabilities for use by other managers in an organizational element or across an entire organization.

A second step 3 in the FIG. 2 model includes determining which assets comprise the visualization scope and tracking the selected assets (e.g., via configuration/change management). A rubric can be defined at this point in the process to capture, organize, and relate all of these assets in a logical and understandable structure. In this example, a Ten Layer Model (TLM) can be used that is further explained below. A SA of each of the selected assets associated with an identified scope, or at least most critical assets, provide elements of an overall SA that can be used to populate a visualization tool or process in accordance with embodiments of the invention.

Once a desired set of assets and associated configurations are selected and baselined, a third step of formulating metrics can be performed 5. In one example, metrics to measure health and status as well as security posture of each of the selected assets or in some cases a set of assets. Actual measurements and metrics that are required for each asset is dependent upon and driven by the CIRs in one exemplary embodiment. For the purposes of this example, a CIR may be defined as an area of interest selected for measurement on a particular asset or set of assets in order to determine if a threshold was crossed that would cause a health and/or status alert to occur. In some cases, this may just be a "system up" or "system down" indication. In other cases, asset performance is critical and measurements of bandwidth, Central Processing Unit (CPU) or disk utilization, etc. are needed. Ideally, each asset already has some form of automated reporting capability that will allow an overarching monitoring system to collect and compile these reports and measurements and create a metric for further correlation and abstraction.

Asset identification is typically done via a data call to create the baseline set of assets and their interconnection. Ideally, asset identification is done via automatic discovery capabilities that are built into infrastructure management tools. In some cases, an asset management system or configuration management data base (CMDB) may contain some or all of the information needed to identify assets. Once these assets are captured in a management tool such as a CMDB, change control should be maintained in the tool to reflect changes to the infrastructure. Maintaining an up to date and accurate CMBD is important in order to ensure that the resultant visualization is continually up to date and accurate. If an organization is not keeping track of asset status and, for example, an asset is either added or removed, or a key asset's configuration is altered, the changes could have profound effects and the visualization may be rendered untimely, inaccurate, and useless. The more disciplined an organization is in Asset, Configuration, and Change Management, the more accurate and up-to-date information is available to portray the situational awareness of the scope of interest.

Examples can be illustrated in a scenario that can show complexity of operational mission threads that exercise several networks, the infrastructure, and computer software. This scenario provides a useful context for implementation of the concepts needed to bring an accurate visualization for monitoring and situational awareness. In one scenario, a mission can be an Emergency Action (EA) conference that needs to be established. A large organization operator uses a calendar service to find and establish the conference with: A Chief Executive Officer (CEO) who is on a trip in Florida after an event. He is on a secure cell phone. Another senior executive who is in his office connects with the conference using a secure VOIP phone. Another senior executive for a particular division who is at her local residence on a secure VOIP telephone. A product division, e.g., engine production division of General Electric operator uses the calendar service to find and then conference (bridged at the product division's location): The Division CEO who is airborne on a secure satellite radio; The Division chief operating officer (COO) who is in his office at the Division HQ using a Verizon secure system. Production and sales managers at the Division (Tier 2 users) who are scattered across the US and overseas but all at fixed facilities using a Sprint secure system. The various operators then bridge the conference calls.

Mapping to the Pyramid: The first step is to understand what the CIRs are that will determine the scope of the situational awareness tool. The highest level organization can create a set of CIRs that are published in the company's National Leadership Command Center (NLCC) communications and information services requirements. Examples of those CIRs can be: Any full regional communications outage within a geographic region; Any organization's auto-trigger actions for events when demands exceed 90% of capability; Any organization's auto-trigger actions for events when 95% bandwidth utilization is exceeded for any single Internet system or Internet Access Point.

Some CIRs that the CIO may be interested in to understand the situation of the capabilities providing the EA conference call might be: Premature ending of a secure call (Dropped call)—either point-to-point or on a conference call; reduced backbone capacity of >25% (or whatever level the tests have shown to cause significant voice quality impacts); major security incident affecting any of the secure voice networks; and catastrophic effects on any of the infrastructure facilities (buildings, communications).

Each of the CIRs identified would have to be decomposed down into a set of metrics that can be directly measured from assets that make up the infrastructure, network, and software needed for the conference. These components will be made up of numerous and disparate software and network hardware items that span across many different organizational boundaries of responsibility (e.g., General Electric (GE)® headquarters and their aviation division, health-care units, finance units, consumer products divisions, and their sub-units). Specifically for this scenario some of the infrastructure or networks can be: All ground and airborne facilities that house communications facilities used by those included on the EA conference call; Residence, Office, HQ Command Center, airborne platform, etc. Communications transport used to complete an EA conference call—including hard-wire and Radio Frequency (RF) transport; Building wiring infrastructures, backbones, division or organization/vendor supplier IT backbone, etc.; and Networks required for linking EA entities to the conference bridges.

Understanding what information is currently available from organizations that are responsible for monitoring portions of the network system is key to implementing a situational awareness tool for use by the CIO. Information that can be gleaned from existing organizations will speed up the implementation, reduce the cost of development and use proven metric collection methods for the required data inputs. 5 provides a method for accurately accounting for and mapping of the components associated with the network requirements to complete the mission.

A second step of implementation for situational awareness requires a full understanding of the "realm architectures". A Governance structure that monitors changes at the architecture level is necessary to first, understand that items within the enterprise are accurately being monitored for their health and status and second, to ensure that new, "non-monitored" pathways or systems do not get added to the architecture. For this scenario, "architecture" management of the overall secure voice enterprise would be a function of a technical coordination group.

As stated earlier, metrics are the measurements that will provide the base measurements to drive the CIRs. It will be the responsibility of the Subject Matter Experts (SMEs) to decompose the CIRs to specific metrics and then establish which asset or set of assets will provide the information. Additionally, the use of established network management systems to the maximum extent possible will speed up the implementation of the situational awareness tool. Where metrics are not available in existing systems, a request or method of use (MOU) will be necessary for the organization responsible for the network or infrastructure to instrument their system and provide the data for a complete situational awareness of the mission. Specific components that will provide input to the CIRs in this scenario can be: Crisis Management System (CMS) Assets; Executive Office of the CEO (EOC) Phones, CMS/EOC Network Servers, EOC Gateways, EOC high assurance internet protocol encryptor (HAIPEs), etc.; Commercial carrier facilities used for transport of CMS secure networks; Services Telephone (ST) sets; IT systems switches including the EOC HQ switches; Equipment associated with Off Premise Extensions; Gateways to other networks; All of this data from any of the identified sources will require a framework (data model) for ingesting and normalizing the metrics data. One framework can be a Global NetOps Information Sharing Environment (GNOISE) which will provide an ingest capability for metrics from disparate systems, normalization of them, and then query interfaces for higher level apps to be able to retrieve the metrics in a standard way. This framework should be used to gather the information and provide the metrics needed for the correlation apps associated with complex CIRs as required. Additionally, the GNOISE framework should use a common repository or more commonly termed "a cloud", that instantiates the data model and to which the collectors can "connect" and begin populating. A cloud technology that can be instantiated can be focused on a particular region of the globe, but can be extended to be a global capability where metrics are fed into it from any/all parts of the globe. This is important since global networks and its extensions are distributed globally.

The next or fourth step of the FIG. 2 pyramid 7 can include a case where the large volume of health and status data being correlated by unique algorithms into a coherent understanding of enterprise status. Subject matter expert (SME) knowledge is required to develop algorithms that correlate the health and status data from the assets associated with the EA conference. Most likely, the SMEs would come from all of the organizations that currently provide pieces of the EA conferencing systems to include HQ staff, Division HQs or sub-units, communication elements, etc. An overall discussion of correlation is provided herein as well.

The top level of the pyramid is the visualization tool 9. A detailed example of the network and infrastructure monitoring is discussed herein as well.

One of the most difficult challenges in the process of providing situational awareness to senior leadership is the correlation of the massive amounts of data collected as part of the metric gathering and then the abstraction of the results into meaningful statements or indicators or mission status. Accurate correlation of events to their mission impacts will depend upon the accuracy and detail of information captured about an asset during the provisioning process; the algorithms and business rules that are initially created to instantiate the relationships and make escalation decisions; and the ease of adding and updating these algorithms during the life cycle of the enterprise.

Provisioning accuracy and detail. Provisioning of assets to perform a mission or function within the enterprise is a critical place to capture correlation information (relationships between components up and down the 10 layer model). In many infrastructures, there is little or none of this information captured. This is due to several factors such as the need for immediate implementation of a capability or service with the promise to document it later, and then moving on to the next crisis before completing the paperwork. Also there may be some security restrictions that prevent the capture or sharing of the relationship information. Finally, if there is no impetus or priority setting from the leadership of the organization, then the documentation just becomes "other duties as assigned" and never gets done. In any case, without the capturing (documenting) of the relationship information, correlation just becomes a guess.

To remedy various deficiencies and keep them addressed going forward, some approaches might be considered. First, existing infrastructure needs to go through a "re-provisioning" process to enhance any data that already exists on each of the assets or a set of assets that are in service today. Even though this sounds like a monumental task, it can be decomposed rather efficiently. If all members of an organization uses a same rubric, such as the 10 layer model, and knows where the components or set of assets that they are responsible for fits within the enterprise, then each organization within the enterprise can perform this re-provisioning and the compilation of this information will be "automatically" linked within the model. This takes the time of SMEs that inherently know what supports what within their areas of responsibility, but these are also the people in high demand for other, usually operational, tasks. Hence the need for priority setting by the organization's leadership to make sure this happens and is done so accurately. Using the model, the SMEs can capture the relationships of their assets to the missions and functions of the upper layers as well as to the services and/or applications that they provide. Prioritization can be assigned to the assets by the SMEs who know what the most important assets are for the correct operation of their responsibility area.

Second, going forward, all new capability provisioning with its corresponding asset deployment needs to be documented with the relationship information and "importance" setting. One way to force the capture of this information during the acquisition process is to make it a requirement for milestone completion. If new assets are deployed within an existing capability, then this relationship information should be captured during the configuration management process, typically enforced by some Change Control Board (CCB). Ideally, this information, either from the acquisition process, change management process, or re-provisioning process, is captured within a data repository that will be used during the correlation of real-time event processing to map up the layers to the affected mission.

Pre-built Algorithms (Business rules) for assessments. During normal operations of the enterprise and its associated infrastructure, a myriad of events, anomalies, incidents, and problems will occur on a daily basis. One key to good situational awareness is knowing which of these can be ignored, which need to be further processed for correlation, and which need to be escalated immediately due to their criticality. One way to do this, again, is to use a hierarchical model like the 10 layer model to correlate events that are being escalated from a lower layer with events that are happening within the layer, and then make the decision whether or not to escalate to the next higher layer based on some threshold for reporting. In some cases, such efforts can be done using algorithms or business rules that take advantage of both a management system, where the events and anomalies are generated, and the relationship information that was captured in the process explained above.

At the lowest layers of the management system, agents on assets continually report health and status of the assets via event messages. A mid-level management capability is typically programmed by a SME to sift through the messages and throw out duplicates and those that don't cross a specified threshold and pass on to the correlation algorithms those that should be analyzed further. The events that are passed on are associated (within the event message) with a particular asset or set of assets and this pointer is used to get relevant relationship data from the provisioning data repository. Using Boolean logic at a minimum or more sophisticated logic provided by a SME, the algorithms are written to determine the impact on a capability within a particular layer or on one a layer above it. If the results of the correlation warrant it, the impact is escalated to the next layer up where it is abstracted to the level of that layer and supplied to the algorithms at that layer for further analysis, and so on.

In some embodiments one aspect of correlation can be determining the criticality weights of assets that make up a capability or function. Some assets are designed to be redundant or contribute only peripherally to the capability. These assets are then deemed less important or less critical to the successful operation of the capability. On the other hand, there are some assets that are absolutely critical to the successful operation, and if they fail or are degraded, the capability fails or degrades. These are also known as single points of failure with the system. Ideally, the criticality of an asset can be captured in the provisioning process described above and made available to the algorithms that are determining impact of events. But as you move up the layers, criticality of capabilities, services, mission functions, and missions may need to be set by other, enterprise-savvy SMEs (including senior leaders) and the corresponding escalation thresholds that will be used by the correlation algorithms at the higher layers that eventually alert the CIO through the visualization tool.

Threshold setting is another key element of developing good algorithms and business rules for situational awareness. As an example, at what measure of traffic loading on a link do you report a problem to the network layer of the enterprise? 100% capacity? 90% capacity? Maybe 50% capacity if this trunk may be needed to carry backup traffic from another link. For simple systems, this threshold setting may done by SMEs who have the experience of knowing that at a certain threshold things fall apart and so they want to know when the system or asset is getting close to that level. For more complex systems or networks, models can be used to measure the resiliency of the capability to withstand one or more failures. In this case, a "network" can be the relationship model (created in the provisioning process) that links hardware, software, networks, storage devices, etc. together to compose a capability. Analysis of the resiliency of the capability to failures of specific assets within the capability can be performed to determine at what point in the accumulation of failures; "Does the capability degrade past a threshold that then needs to be escalated to a higher layer?" These techniques of analysis can be expanded to determine resiliency of capabilities within the 10 layer model of an enterprise.

Finally, these correlation algorithms and business rules can be extended to be more proactive than reactive. Initially, the correlation is providing a non-real-time reporting of important events that happened in the past on some capability within the enterprise. This may be useful to the CIO but may not be timely enough to avoid the phone calls from the CIO's supervision. If a real-time alerting capability is also provided by the correlation, then the CIO can be alerted to an event in progress that she can then make decisions on in response to it. This works until such time that the CIO is being alerted constantly with typically the same outcome decision. At that point, rules need to be put in place that, instead of just alerting the CIO, they also proactively "fix" or "re-configure" the enterprise to avoid major degradation or catastrophe and alert the managers and CIO of their actions.

Ease of adding/updating algorithms. Enterprise infrastructures are rarely static, so all of the algorithms, business rules, and thresholds that are set initially to assist in portraying of situational awareness need to be easily modifiable, as well as new ones being easily added. Note, if relationships change, this needs to be captured in the provisioning process, not the correlation process. For example, operations analysts can develop a framework for provisioning creation of rules by analysts. Operations analysts (SMEs on the ops floor) can add a business rule to a management systems to either alert them to a bad situation on their systems or proactively make changes within a certain area of responsibility based on events happening on their systems. Operations analysts can create the rules themselves without having to be computer software experts or need to engage the software experts to get the capability built (which may take some time).

Other types of correlation. Along with static correlation of events on assets with capabilities and corresponding functions and missions, there is temporal correlation of current events with unknown origins to previously occurring events. Asset and capability performance over time should be captured in order to provide a historical perspective on what happened during certain events so that if a similar event happens, you will likely know what can be expected. The performance information can also be used as input to the correlation algorithms and business rules for better tuning of the responses—either alerting or proactive modifications. Finally, prediction of possible future events or problems along with the planning and execution to cope with or avoid them completely is the ultimate desired capability of situational awareness.

Visualization. Visualization in some embodiments depends upon a type of data being presented and the intended audience of the visualization. In this case, there should be some distinct differences in the way information is visualized for various roles. A higher management role (i.e., CIO) and a technician, for example, would not be interested in getting the same level of detail or even the same Levels of information based on the 10 layer model. A technician may need great detail into the lower Levels (Layers 1-6), while a CIO would be more interested in the Levels that actual directly relate the mission at hand (Layers 7-10).

Visualization types can change depending on the role of the intended user of the visualization. Thus various types of visualizations should be used for different roles or user types.

Criteria for Visualization of CIRs. Certain characteristics of the CIR are especially important to consider when selecting visualization. These can include the following:

Cross-organizational data. A single visualization might need to draw upon data provided by a large number of organizations. An effective visualization should serve as an aid to correlating data across organizations. The data will be very large and very distributed, and contained within an organizational hierarchy.

Lack of human context. While some data (e.g. geographic data, dollar amounts) are naturally well-understood by the majority of the population, the metrics used to populate the visualization are often obscure; to be properly understood, a visualization must provide a context in which to interpret the data. For example, metrics on network flow rates should be accompanied by information about what is normal, historical trends, etc.

Importance of missing data. Because of the distributed nature of data collection and the extent of the effort to gather metrics, missing data is inevitable. The visualization must distinguish between the absence of data and current status levels of the network.

Dependencies. A key assumption is that the status of an entity in one layer depends upon the status of entities in that layer as well as that of entities in the layer below. The implication is that data will have a hierarchical relationship corresponding to layers, although this hierarchy may not have a tree structure. Each object within the hierarchy has a set of predecessors as well as a set of successors; an effective visualization will support presentation of both kinds of sets.

Audience. While the metrics gathered could support a wide range of detail levels, the objective of providing an executive-level view provides additional constraints. Context is especially important, since the user cannot be expected to be an expert in the domain. The information presented should be limited to the most important, vital information, which will often involve reducing large data sets into simple finite values. Given the source data, the audience will eventually include asset-owners, etc., who are more aware of the context and would like access to greater detail.

In some embodiments, these characteristics can drive the following key criteria for the visualization tool: Support visualization of massive, distributed data; Support integration of data from a large number of sources; Support visualization of data hierarchies, from both organizational relationships and layer dependencies; Display particular values in context, preferably both comparison against averages and trending information; Convey lack of data where appropriate; Begin with a high-level aggregate view of the data, but provide the capability to drill down into specific details;

Exemplary Visualization Environment. In some embodiments, an exemplary system can include a web-based environment with several visualizations linked together to support both a high-level understanding of the data and drilldowns into specific issues. These differing visualizations can allow for a variety of user types to take advantage of this overall capability by tailoring the visualizations and the level of detail.

Network Dependency Model. In some embodiments, a computational model that can be used to populate network visualizations. An exemplary model can include of several hierarchical layers, together with several components and dependencies among the components. The exemplary hierarchy can include several layers with a well-defined ordering. Each component has the following attributes (i) a unique identifier, (ii) a layer identifier, (iii) metadata describing the role of the component, (iv) dependencies on 0 or more other components, drawn from lower layers, (v) metric feeds describing the status of the component, and (vi) a method for computing the current component status given its dependencies and the values of its current metrics.

Exemplary dependencies are not necessarily required to be between adjacent levels; for example, a desktop computer may depend upon a power unit. As mentioned before, the number of dependencies may be very large, and will generally not form a tree.

Layer Visualization Overview. Data visualized has multiple kinds of relationships, key of which are (hierarchical) organizational position, and layer dependencies. While tree maps and sunbursts both provide hierarchical visualization, they are less effective at conveying dependencies. Instead, an embodiment can use a layered visualization for particular network entities such as described herein (e.g., left hand side of FIG. 16) We would propose this visualization model for a senior leader as opposed to a technician for its ease of use and simplified "first glance" capabilities.

In some embodiments, visualization aligns all components within a particular layer in the same horizontal box, and supports display of one or more metrics for each component (1 with color, 1 with size). The color would likely be associated with a status metric (or if gray, lack of status information). The relative size might be associated with priority or importance. More detailed information about each component within a layer can be provided in a tooltip.

The exemplary visualization may display dependencies; since the number of nodes and dependencies might be very large, this would most likely be a feature that is only turned on when the user scrolls the mouse over a particular component, or selects a particular component. Dependencies might be shown explicitly by lines, or they might be expressed by changing the appearance of the dependent nodes (e.g., see left hand side of FIG. 17).

Filtering capability can allow the visualization to display only those elements that correspond to a particular organization or mission. If extended to, e.g., Layer 10, the visualization may allow for simple filtering by clicking on the relevant mission. This action might reduce the view of components on lower layers to just those supporting the mission. One can imagine selecting more components from other layers to filter to even greater depth. Another option for filtering is displaying only the layers of interest to the user, e.g. Layers 7-10 for the CIO.

Strengths of the layer visualization include: Scalable. The visualization could support hundreds of components in a single layer; more might be supported with greater interactivity (such as a zoom feature). Expressing Hierarchy and Dependencies: The visualization naturally expresses the layering relationship. Massive dependencies may also be expressed. High Level: The visualization area is not overloaded with detailed information, but provides support for accessing that data if necessary. The user may, at a glance, perceive the general status of a particular organization or mission, and will immediately perceive the location of any problems. Navigation: Clicking an individual component might provide more information (e.g. contact, detailed status) in a tooltip, or it might navigate to another page with more detailed information.

Figure 3:
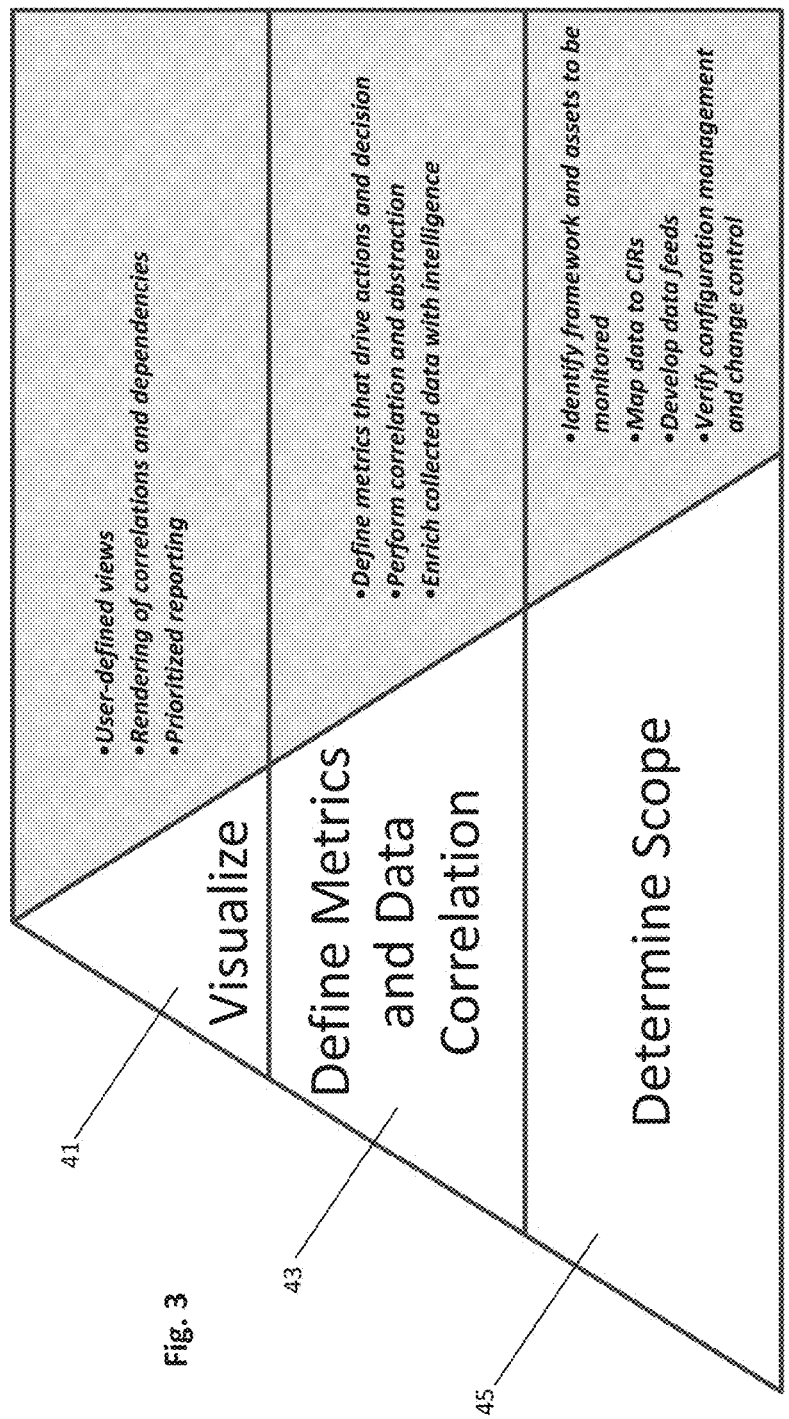
FIG. 3 shows an overview of one exemplary set of factors that can be used for creating visualization tool framework for identifying, capturing, and representing most desirable information for a particular user.

FIG. 3 shows an overview of one exemplary set of factors that can be used for creating visualization tool framework for identifying, capturing, and representing most desirable information for a particular user. In order to create visualization tools that accurately capture and represent the most applicable information to the user, and ultimately support good decision making, a multitude of factors must be considered such as, for example, shown in FIG. 3. FIG. 3 shows a simplified pyramid depiction with three layers: 1) determine scope 45; 2) define metrics and data correlation 43; and 3) create visualizations based on the first two steps 41. Determination of scope can include: Identify framework and assets to be monitored; Map data to CIRs; Develop data feeds; and Verify configuration management and change control. Defining metrics and data collection can include: Define metrics that drive actions and decision; Perform correlation and abstraction; and Enrich collected data with intelligence. Developing visualization tools can include: User-defined views; Rendering of correlations and dependencies; Prioritized reporting.

FIG. 4A shows an overview of an exemplary decision maker's information needs. A first exemplary premise can include: 46 The timeline from Situational Awareness to Understanding to Decision-Making needs to be as concise as possible, while ensuring all alternatives are addressed and compare. A second exemplary premise can include: 47 Visualized information speeds awareness and understanding, therefore improving the timeline for decision-making. A third exemplary premise can include: 49 Visualized information becomes available to leadership when "data" is processed through "Information Services". A fourth exemplary premise can include: 51 Converging "Information Services" with communications/collaboration capabilities overcomes historical capability gaps.

FIG. 4B shows an overview of an exemplary leadership information services and some examples of what is needed for such services. One objective includes exposing and converging presentation of timely data/information, services, and expert collaboration at a high decision-maker level 61. A background or initial set of capabilities needed to meet leadership information needs can include: 71 Neutral Environment Infrastructure and Physical Architecture; Data Discovery Capabilities; Correlation and Visualization Capabilities; Leadership Presentation Capabilities; Communications, Collaboration, and Consultation Systems; and Analysis and Decision-Making Support. 69 Out of these background sets of capabilities, one focus area for various network status embodiments of this invention include data discovery capabilities, correlation/visualization capabilities, and leadership presentation capabilities. 63 Information from existing sensors and discovery capabilities needs to be identified and better utilized. 65 Vast amount of information is already available in a typical large organization for use by analysts and leadership. 67 High level information dashboard can provide leadership with a common enterprise level view of critical assets and functions. 73 A move towards providing decision-makers with visualized real-time information supported by decision-making tools may address the ever-shrinking understanding/decision timelines.

FIG. 5A shows an exemplary overview of elements of one approach to determine CIR and scope of a visualization development effort. FIG. 5A shows a simplified illustrative view of cyberspace to include a near (a first entity of interest), medium (one or more related second entities of interest which interact with the first), and far (one or more third entities of interest which the first two entities interact with but do not have an immediate impact on the first or second entities as well as entities which have an adverse relationship to the first and second entities) each having different network or information technology infrastructures and capabilities. An initial step can include having a working group (WG) identify high-level, CIO focused CIRs and, concurrently leveraging the identified CIRs, the WG can determine scope of the effort (i.e. boundaries of the logical or virtual view, required health and status information, etc.). Users, IT systems, and services associated with users and systems are shown. The WG can then begin shaping the Framework/Reference Model in view of cyberspace "terrain" or logical elements/collections of elements.

Figure 5B:
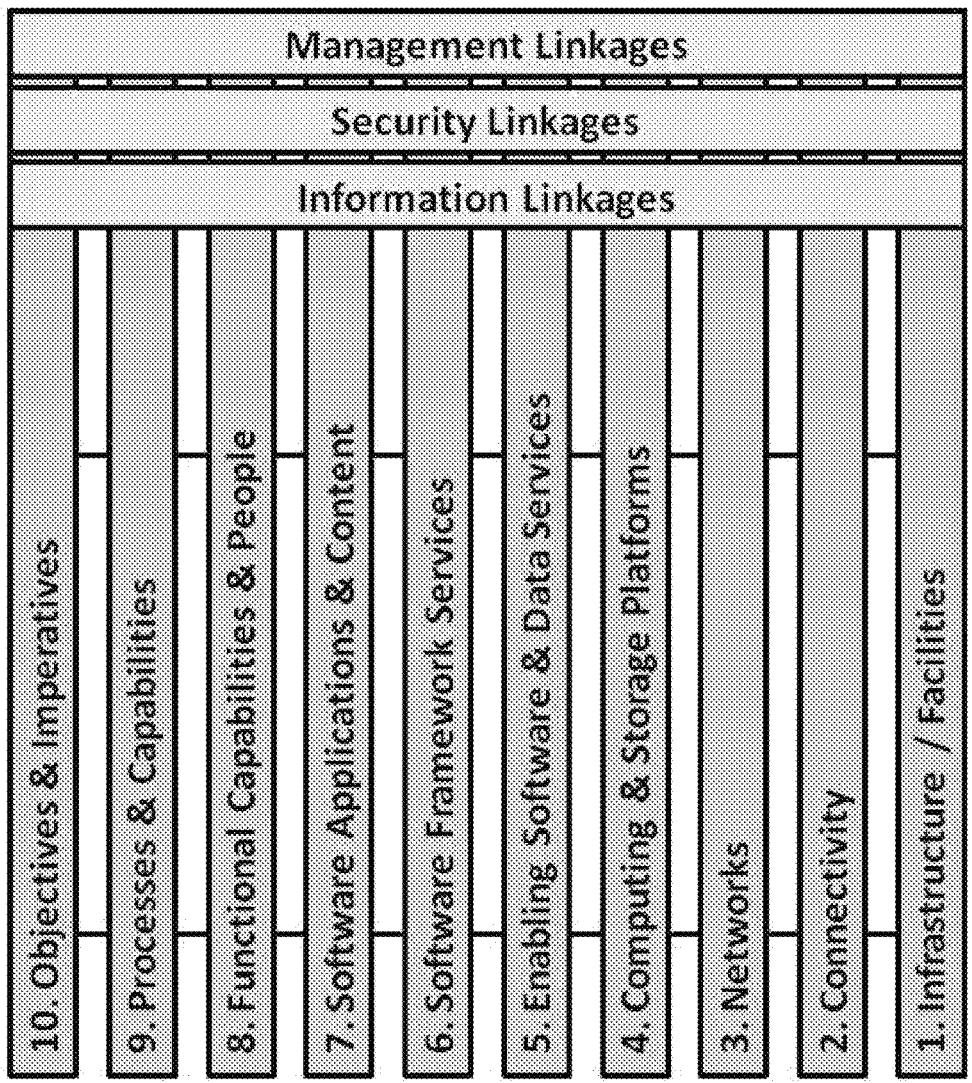
FIG. 5B shows an exemplary common reference model in a context for determining scope of visualization tool creation activities.

FIG. 5B shows an exemplary common reference model in a context for determining scope of visualization tool creation activities. A Ten Layer Joint Architecture Reference Model (JARM) relates operational objectives to the assets that make up the network. The exemplary JARM defines a standard framework for an SA visualization tool, allows for display of many states at once, and shows inter-dependencies between layers of an enterprise network. Selecting a common reference model allows the designer the ability to identify assets and data feeds/sources into a pre-defined framework.

FIG. 5C shows additional exemplary aspects of determining scope associated with mapping data to CIRs associated with developing visualization tools. Once a framework is established for capturing data-sets, those data sets must be mapped against a set of CIRs. Examples include: Any full regional communication outage within e.g., a geographic region or logical network; Leadership or CIO auto-trigger actions for events when demands exceeds 90% of capability; Leadership or CIO auto-trigger actions for events when 95% bandwidth utilization is exceeded for any single organization Internet access point. Some specific examples pertaining to a specific mission or capability e.g., emergency action (EA) conferencing: Premature ending of a secure call (dropped call)—either point-to-point or on a conference call; Reduced backbone capacity of >25% (or a relevant level that indicates significant voice quality impacts); Major security incident affecting any of the secure voice networks; Catastrophic effects on any of the infrastructure facilities (buildings, communications).

Figure 5D:
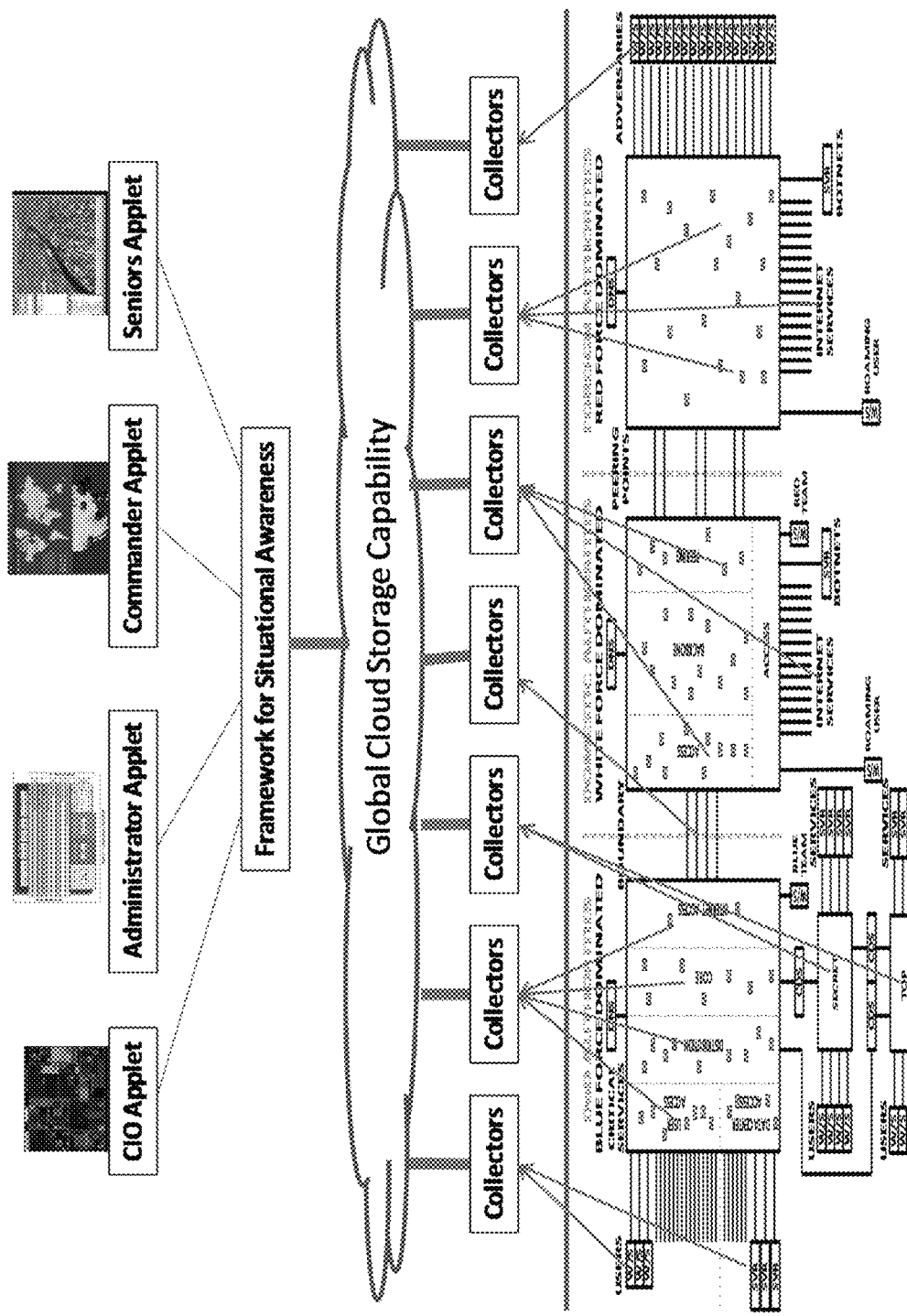
FIG. 5D shows additional exemplary aspects useful for determining scope associated with developing visualization tools.

FIG. 5D shows additional exemplary aspects useful for determining scope associated with developing visualization tools. FIG. 5D presents an exemplary simplified structure for how to develop and present situational awareness to a senior leader in response to their CIRs. This structure takes into account the scope of the network and the layers of detail presented in the 10 layer model section as well as the direction of several of the current efforts across an entity of interest, e.g., large organization leadership element, in this area.

Referring to FIG. 5D, the bottom of the diagram represents exemplary infrastructure of interest and even though it shows only the physical layers of the exemplary 10 layer model, it is meant to represent all of the layers. Some of the layers lend themselves better to monitoring and those would be implemented first, if they have not already been instrumented for monitoring. To truly complete the situational awareness picture, all layers would eventually need to be included in the structure.

Collectors of data are or need to be established for different parts of the infrastructure as well as the different layers. A subset of the collectors will be discussed here along with examples of organizations and systems that are performing this functions, albeit manually in some cases.

End device Collectors—Agents on end devices (layer 4 workstations and servers) collect both health and status of the device as well as the security posture for the device. Examples are HP® Openview Agents collecting performance metrics for the device and Host Based Security System (HBSS) agents collecting the security posture information. This is sent to a management system that compiles the information for use by systems managers as well as Computer and Network Defense (CND) analysts. This system would represent the collector for the situational awareness of the end devices. In the future, HBSS may provide both the security posture and the device health and status which would reduce the number of collectors.

Transport and Network Collectors—There are systems that collect transport (layer 2) and network (layer 3) health and status as well as network security posture (IDS, IPS, Netflow, Firewall, etc.). For exemplary infrastructure in our scope, one network management tool being used today includes variants of an Integrated Network Management System (INMS). This provides the health and status of the friendly or "blue force" network infrastructure. Collectors on the security side include tools that collect metrics from the various security devices and does some correlation at the event level.

Secure network monitoring collectors—Some of the infrastructure for the secure networks can be provided by a core communications capability and hence monitored by the same INMS that was mentioned above. However, end networks and end devices are not monitored by the same INMS. Several organizations have responsibility to monitor and/or maintain security of these. Health and Status monitoring of the end networks and end devices are the responsibility of various organizations, who have their own tools and techniques for performing various functions. Collection of that data may be more difficult.

Gateway collectors—an exemplary network operations center (NOC) can deploy sensors on the edges of an internet system that provide situational awareness of attempts and intrusions.

White Force collectors—Collectors of White Force or friendly data and information address several dimensions (layers) of the infrastructure and operations. The first is simply physical affects from the environment where the IT Infrastructure resides, which is provided in real time from services such as CNN. Status of transport capabilities (commercial satellite links, cables, fiber backbones, etc.) can be provided by the commercial vendors in the form of feeds from their network management systems. Network monitoring may also be provided by these carriers as well as Internet Service Providers (ISPs) and Internet performance monitoring sites such as Akamai. Network security services that monitor and report on network level security issues are available from vendors who also can provide vulnerability information on operating systems and software applications in general. Some vendors can also provide situational awareness of particular attack vectors that they are seeing on the domestic infrastructures. Finally, there are brute force ways to monitor internet services that are critical to the CIO's situational awareness simply by pinging them or accessing their sites on a minute by minute basis to assess if they are up or down. All of these sources may need to be collected in order to present a comprehensive situational awareness picture.

Foreign network collectors—Finally, in geographic regions where information collectors or business intelligence has little or no authority, intelligence community collectors need to be used to provide that piece of the situational awareness picture. This could be in the form of end device monitoring of cyber-attack offensive actions against the CIO's infrastructure, traffic monitoring of potential attacks being mounted against that infrastructure, or finished intelligence that reports on future activities by our adversaries against us.

Many collection systems are built for a particular purpose without the big picture in mind. Hence they are built and optimized as stovepiped capabilities. In the cases where these stovepipes are closely-coupled, it is difficult to extract the data from the collectors for the purposes of using the data for situational awareness. These are the systems that will require the most re-work to extract the data. In the cases where the collection capabilities were built as loosely-coupled systems with "standard" application program interface (API)s or data access arrangements, e.g. Structured Query Language (SQL), the data may be more easily accessed to use for situational awareness purposes. If there are any places where a collection system is not in place today and it is deemed important to provide for situational awareness, the monitoring system should be loosely-coupled for ease of integration. Frequently read-only access arrangements can be negotiated from a trusted-partner security perspective for source stovepipe databases.

Because these collectors are producing massive amounts of data and information and are globally distributed, the storage of the collected data and information needs to be distributed instead of trying to amass it all in one place to run the analytics on. It is possible to create a Global cloud storage capability. So even though an entity can have a globally distributed physical storage infrastructure to house the data and information, to the framework and applications it appears to be one logical storage capability. Once this global storage capability, e.g., cloud computing and storage, is established and the collectors are populating it in real time, analytics can be run against the entire data set for correlation, synthesis, and abstraction and fed to the user interface for visualization.

To take the best performance advantage of this global cloud and provide an agile environment for the evolution of the analytics and user interface aesthetics, a framework for situational awareness can be used. Some organizations are developing a framework for this that can be called the Global Network Operations Information Sharing Environment (GNOISE). A GNOISE framework can deliver network operations information sharing data services for events, assets, incidents, performance, and vulnerabilities. It can also provide an agile environment for faster delivery of network operations capabilities.

Finally, with a framework in place, applets or applications (APPs) can be built to address the CIRs and particular user-preferred screen presentations. With an agile environment, incremental versions can be created quickly to get user (as well as CIO) feedback and modify quickly as needed. When CIRs change due to changing world events or disasters (natural and otherwise), the applets for analytics and presentation can be modified quickly. FIG. 5D shows exemplar views for differing senior leadership that would be based on their particular critical information requirements as well as the screen layout, types of background (table vs. geographic), and color preferences.

FIG. 5E shows exemplary factors for determining correlation and abstractions used in developing visualization tools. One of the most difficult challenges in the process of providing situational awareness (SA) to senior leadership is the correlation of the massive amounts of data collected across multiple mission domains and network infrastructures. Some factors for consideration in correlation and abstraction are listed in FIG. 5E. A first factor is provisioning accuracy and details which includes: Identify the right assets and whether they are properly provisioned; Security restrictions impeding data collection; SME involvement for identification of injection points, prioritization and data models; and Establishment of provisioning processes for proper alerting A second factor includes pre-built algorithms for assessments which includes: Understand the system's anomalies, incidents, and problems and how to tell what is relevant; Identify mid-layer management capabilities to sift through relevant data; Use pre-defined metrics to support event/alert notifications by setting thresholds and weighting factors against data. A third factor for data correlation includes ease of adding/updating algorithms that include: Algorithms and business rules must be dynamic/modifiable; Security controls are imperative, but shouldn't inhibit simple health status updates for timely submission; and Changes in relationships and infrastructure should not affect visualization accuracy, processes must be identified (Config Mgmt). A fourth factor for performing data correlation includes correlation types and approaches that includes: Reactive correlation is likely the first step in establishing visualization; Predictive correlation can occur once the framework is established; Business rules can be tweaked/fine-tuned using temporal and historical info; and Over time algorithms can be tweaked for prediction of possible future events.

FIG. 5F shows an exemplary overview of SA elements which can be used in developing visualization tools. Situational Awareness (SA) has varying definitions depending on the level of detail a manager may want to see within the defined boundaries of the enterprise. A SA level can be anything from a high level indicator of the enterprise's ability to support a defined mission (strategic view) to the low-level output metric on a particular network node (tactical view). For the initial design of the visualization tool, the SA system design needs to provide the strategic view enterprise situational awareness in terms of mission as well as being able to drill down to a set of tactical views, as needed, to support specific queries into the cause of the change of status at the mission level. Therefore, an exemplary definition of SA can include "transforming enterprise IT information and meta-data into high level driver and outcome metrics presented through visualizations that help provide comprehension of the an enterprise and basic projection through user selectable and customizable visualizations." This exemplary focus of SA can allow for a strategic overview of the enterprise and something a manager (e.g., CIO) can refer to for a quick understanding of the enterprise's health. An examination of industry and government organizations has not yielded a clear answer to how situational awareness for large complex systems such as an enterprise could be addressed. SA can be unique to an individual or organization that needs it; it can be based on a scope that a leader or manager has authority over and specific CIRs. There are many different efforts currently on-going in the public sector that are attempting to address some or most of the pieces of situational awareness, but these individual efforts do not encompass the entire picture needed at the higher levels, particularly in large or extremely large organizations. The fact that there are so many efforts indicates that no one effort has proved to be an extensible capability that other organization can effectively use. Some existing efforts have focused on a process of developing an SA capability for an entity such as a network operations center, but this capability is at a more detailed level than necessary for a CIO level. Enterprise technical activities existing efforts also have been focused on developing a global network operations SA capability, but is focusing only on their systems of interest/responsibility and not on a comprehensive picture of cyberspace abstracted to a mission or capability level, which is needed for higher level leadership decision making. Information that is collected and displayed from disparate sources may allow an opportunity to incorporate that data into a SA tool to monitor a wider network domain for the CIO.

FIG. 5G shows an exemplary set of SA elements which can be used for developing visualization tools. Elements can include: Web-based environment; Support integration of massive, distributed data; Several application linked together; Provide higher level understanding; Drilldown into specific issues; Layered visualization; Easy association between affected asset and mission impacts; Multiple metrics displayed simultaneously; Dependencies are identifiable; and Enable roll-over for quick summary. Another element can include leveraging an existing or new common reference model such as the JARM model for visualization of organization networks, tying infrastructure and system outages to mission impact indicators.

Figure 5H:
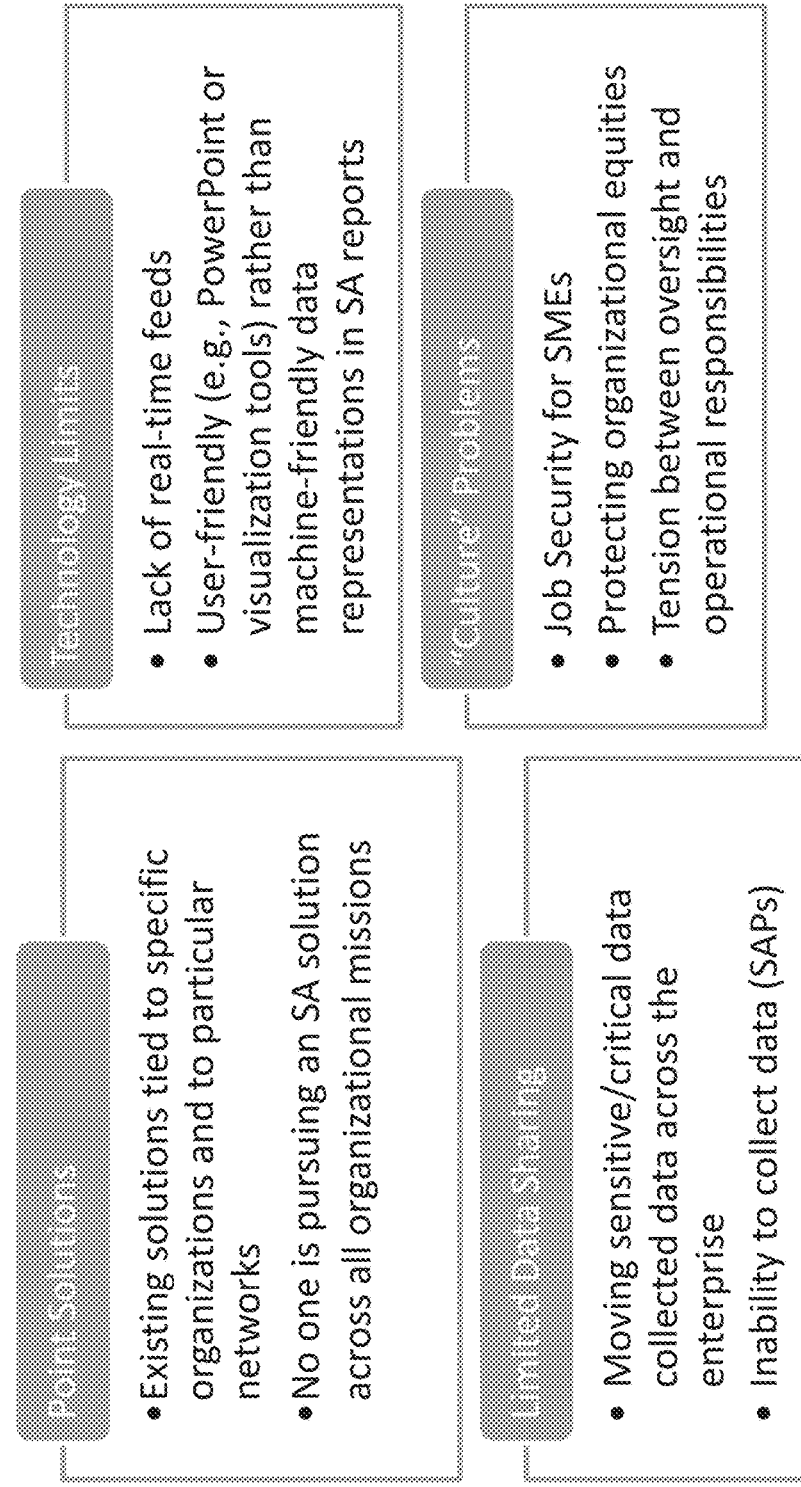
FIG. 5H shows some potential findings and inhibitors relative to development of visualization tools.

FIG. 5H shows some potential findings and inhibitors relative to development of visualization tools. One inhibitor is point solutions which include existing solutions tied to specific organizations/particular networks and a lack of entities pursuing SA solutions across all organizational missions. Another inhibitor can include technology limits arising from a lack of real-time feeds; user friendly rather than machine friendly data representations. Another potential inhibitor is limited data sharing that includes moving sensitive/critical data and inability to collect data. Another inhibitor can include culture problems such as job security for subject matter experts (SME), protecting organizational equities, and tensions between oversight and operational responsibilities.

FIG. 6A shows some exemplary metrics that can be used for driving actions and decision making relative to layers of a common reference model (e.g., e.g., Joint Architecture Reference Model (JARM)) that support capture and identification of CIRs). Within each layer of the JARM reference model, metrics must be collected that support the capture and identification of CIRs which ultimately drives actions and critical decision making. Some metric elements can include infrastructure, connectivity, networks, platforms, enabling software, service and frameworks, applications/content, functional capabilities and people, processes and capabilities, and missions and objectives.

FIG. 6B shows some exemplary metrics that can be used for driving actions and decision making relative to layers of a common reference model (e.g. JARM) that support capture and identification of CIRs. FIG. 6B discusses major entities in the JARM layers 1-5. Major entities associated with assets/services/concepts, information, security, management, and measurements associated with layers 1-5 are shown.

FIG. 6C shows some exemplary metrics that can be used for driving actions and decision making relative to layers of a common reference model (e.g., JARM) that support capture and identification of CIRs. Major entities associated with assets/services/concepts, information, security, management, and measurements associated with layers 6-10 are shown.

FIG. 7 shows exemplary data correlation considerations and key characteristics which can be used in development of visualization tools. Data correlation—Correlation of the massive amounts of data collected across multiple mission domains and network infrastructures. One data correlation consideration includes cross-system data—normalize data across organizations/systems and different data formats and associate with thresholds/metrics for current status levels of the network. Another data correlation consideration includes importance of mission data—focus on critical systems as tied to mission needs and indicators of attack/issues. Another data correlation consideration includes dependencies—understanding the threads of an entity, its successor and predecessor dependencies, is one key to creating effective visualizations. Another data correlation consideration includes audience—understand that the user cannot be expected to be an expert in certain domains. Another data correlation consideration includes providing human context—a visualization must provide a context in which to interpret the data. In very small and non-complex infrastructures supporting single missions, a situational awareness visualization tool can be very simplistic. However, when infrastructures are global, extremely complex, multi-layered, and mission critical for a large set of missions, another step in the process is required before the visualization. This step utilizes "raw" information from the metrics step described above, correlates these according to pre-established relationships of the assets, and abstracts that information to a higher form of knowledge in order to portray the CIRs in terms of their mission impact. This assumes that the organization's missions and operational capabilities have been sufficiently decomposed to show what combinations of assets and operating conditions constitute a "working" mission/capability. An incident or event, defined in the CIRs, that crosses a metric threshold for an asset or combination of assets, would indicate a degradation of mission capability and be brought to the attention of the CIO.

Figure 8:
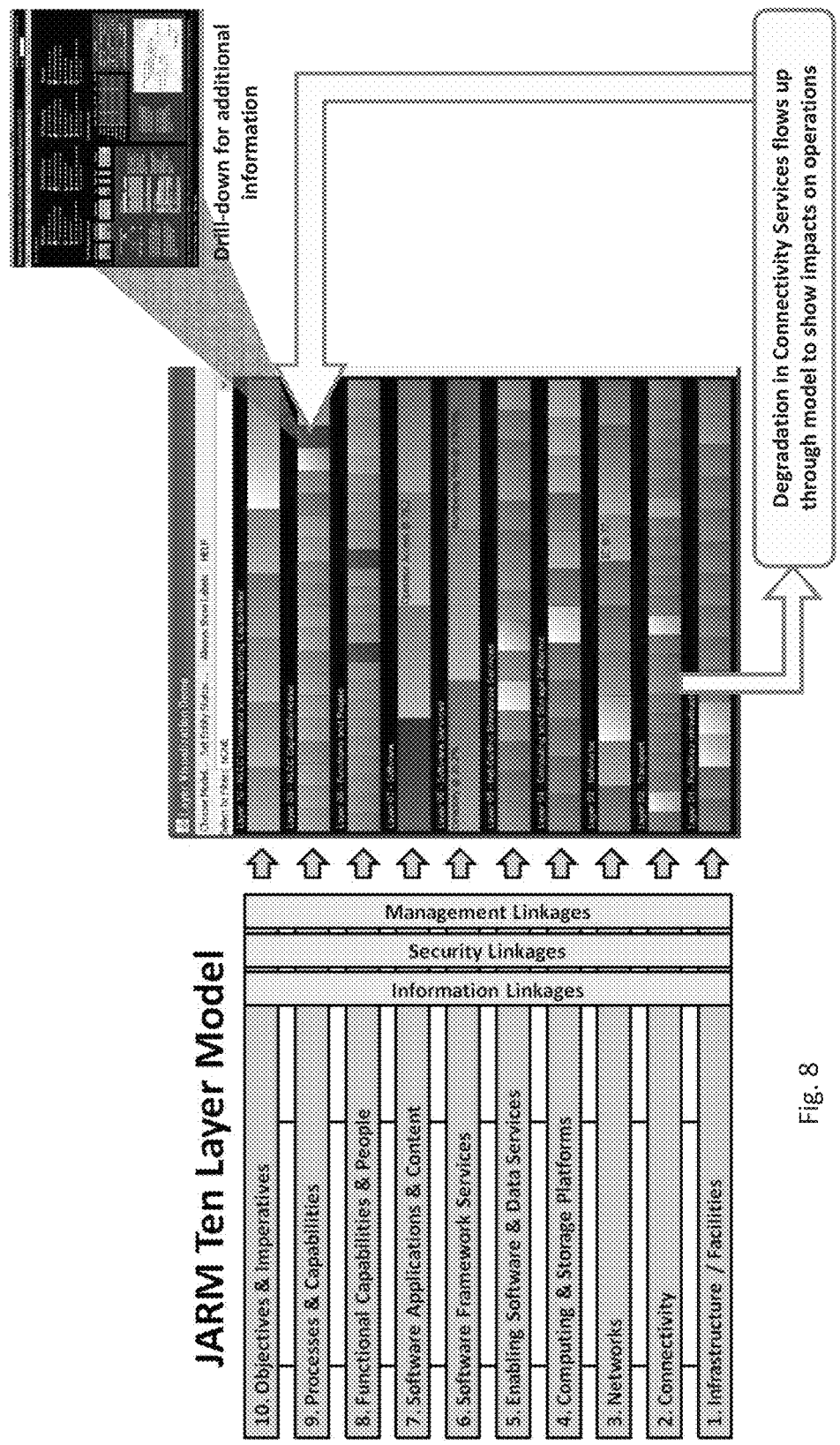
FIG. 8 shows an exemplary rendering of information into visualization leveraging an exemplary common reference model (e.g., JARM)

FIG. 8 shows an exemplary rendering of information into visualization leveraging an exemplary common reference model (e.g., JARM). Various considerations are called for with regard to providing a high level leader-level perspective, machine-to-machine interfaces for timeliness of information flow, link infrastructure and system outages to mission impacts, web-enabled views available to select community without additional log-in, summary information at top level; and drill down for details which are mapped to visualization user interface views and navigation capabilities. For example, an event such as degradation to connectivity services in layer 2 of the JARM model can have a separate impact due to dependencies are shown in visualization for layer 9 (processes and capabilities) which triggers a change in color coding for a specific element of the layer 9 visualization to yellow red; a user can then use a graphical user interface hyperlink to a drill down user interface detail page associated with an asset or capability in a higher level interface page.

Figure 9:
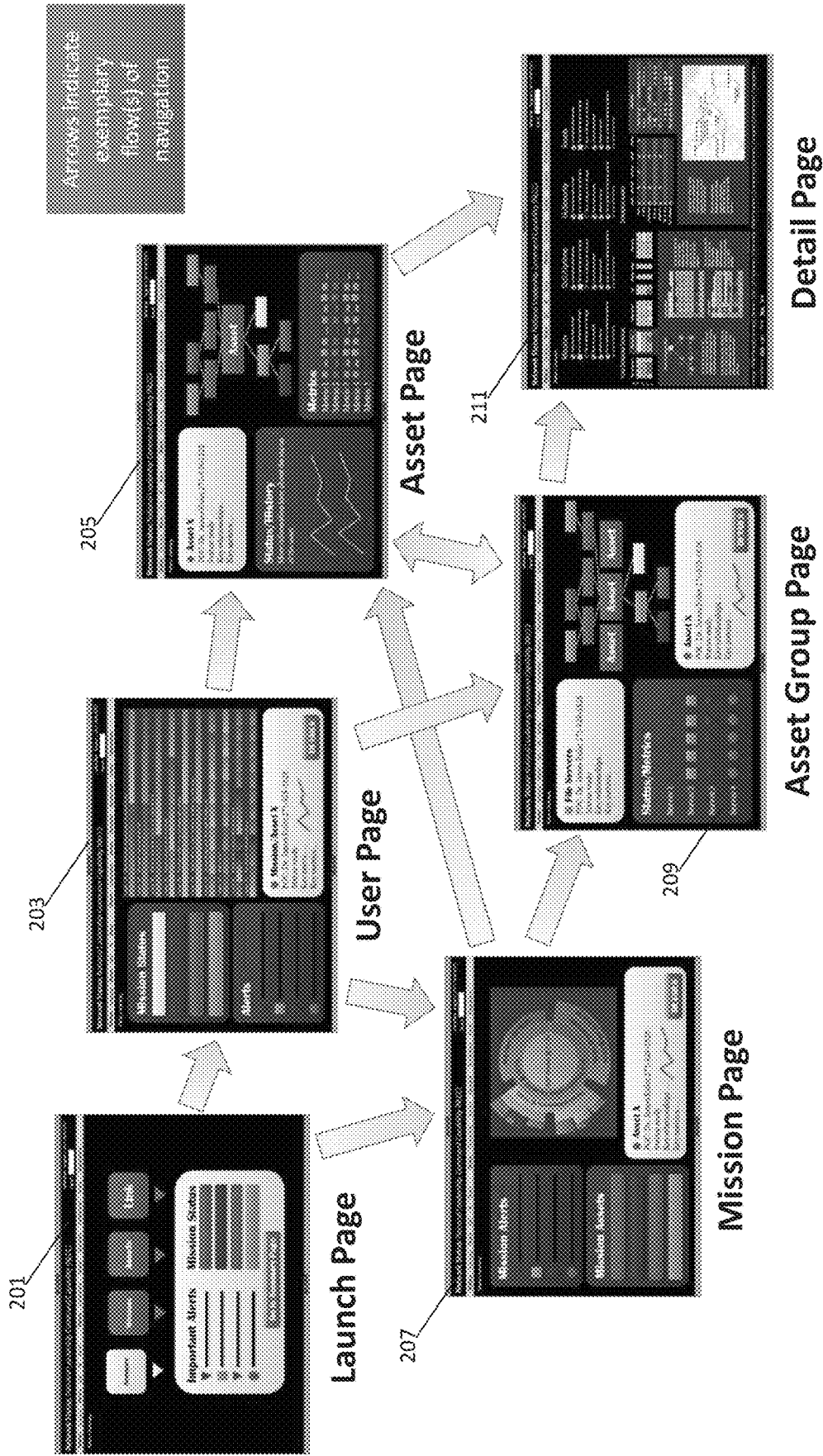
FIG. 9 shows an exemplary collection of information visualizations for embodiments of the invention with a progression or navigation sequence from a launch page 201 to user page 203 to asset page 205 to mission page 207 to asset group page 209 to asset detail page 211.

FIG. 9 shows an exemplary collection of information visualizations for embodiments of the invention with a progression or navigation sequence from a launch page 201 to user page 203 to asset page 205 to mission page 207 to asset group page 209 to asset detail page 211. Arrows are shown showing some possible navigation relationships between the displayed pages.

Figure 10:
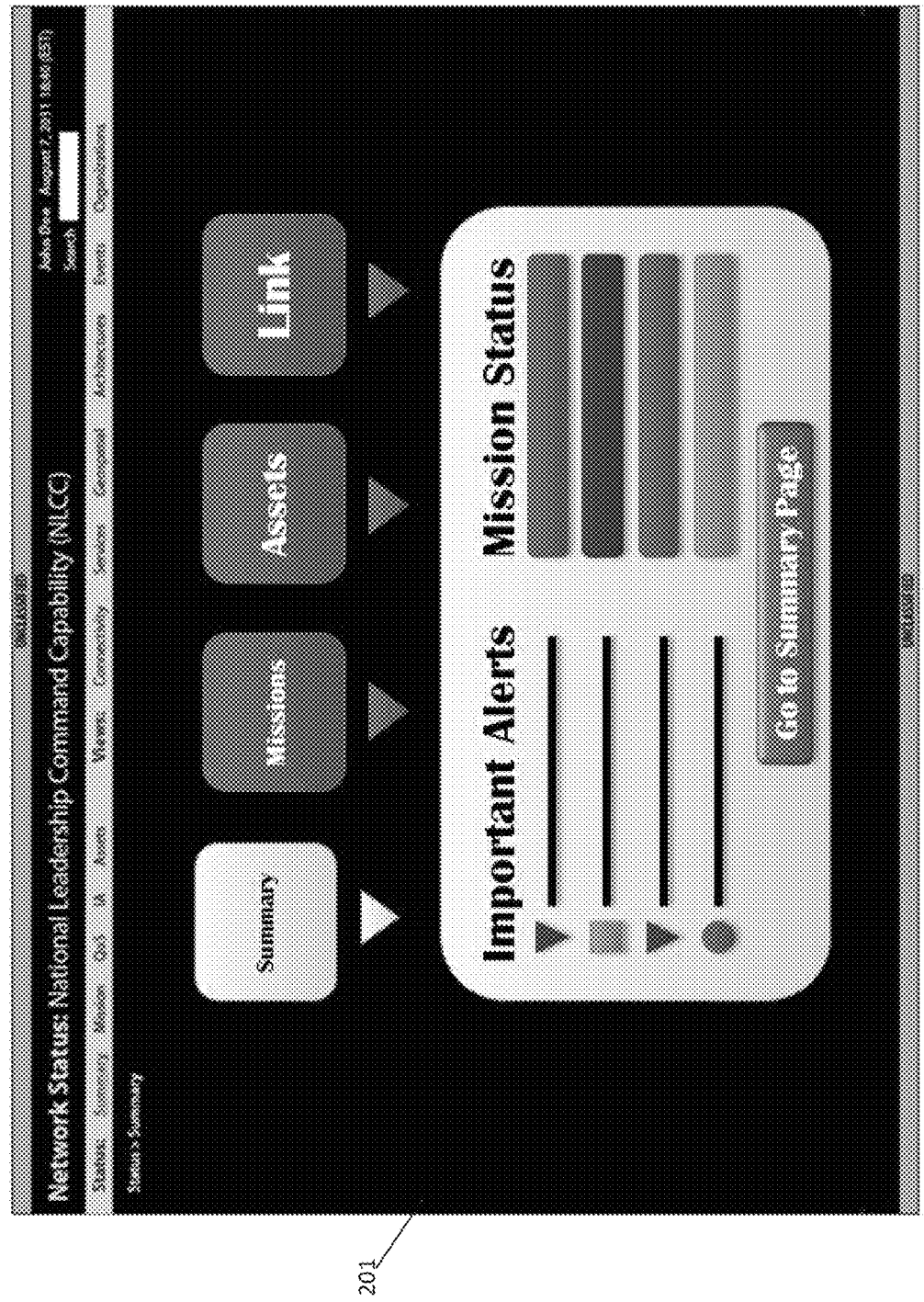
FIG. 10 shows an exemplary network awareness application launch page 210 with a summary, missions, assets, or link navigation icons along with a tool bar of other user interface link elements in a tool bar format.

FIG. 10 shows an exemplary network awareness application launch page 201 with a summary, missions, assets, or link navigation icons along with a tool bar of other user interface link elements in a tool bar format. Important alerts and mission status Apps are shown which can be configured to display CIRs, metrics, asset information, mission status etc. along with links to summary, missions, assets and links pages. Selection of items in the important alerts or mission status page permits a CIO or leader to go directly to relevant information associated with the alerts or mission status. Important alerts can display shapes which have colors and shapes tied to status or criticality of the alerts. Mission status will display a mission name and a color associated with the status of the mission (e.g., green, red, yellow, etc.). These visualizations can also support alternate launch pages which change sizes of the alerts or mission status icons or visualizations relative to criticality or CIR importance, among other things.

Figure 11:
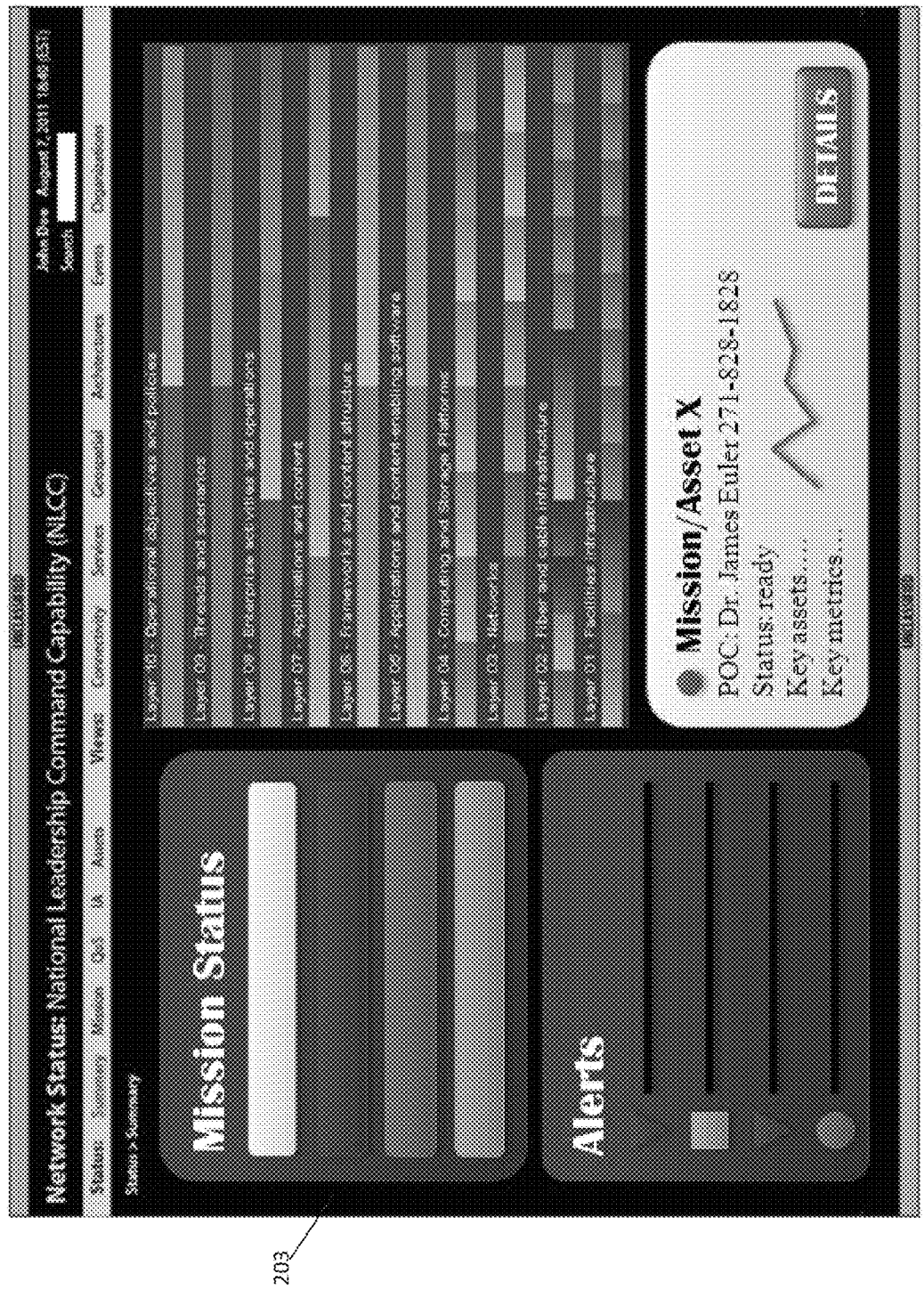
FIG. 11 shows another network awareness application user summary page 203 associated with a designated entity, and a common framework (e.g., JARM ten layer model)

FIG. 11 shows another network awareness application user summary page 203 associated with a designated entity, e.g., and a common framework (e.g., JARM ten layer model). Mission status and alerts associated with user summary visualizations are also provided which can be the same as shown on the launch page or further customized based on a particular network, particular mission, etc. An information window is shown in a lower right hand side showing a mission/asset X relationship that is shown by passing a mouse or user interface selection tool over an element in the FIG. 11 visualization which generates/populates the information window. The information window shows point of contact (POC), status of selected mission/asset (e.g., green/ready), key assets/key metrics window showing a graph along with a link to an asset/mission details page.

Figure 12A:
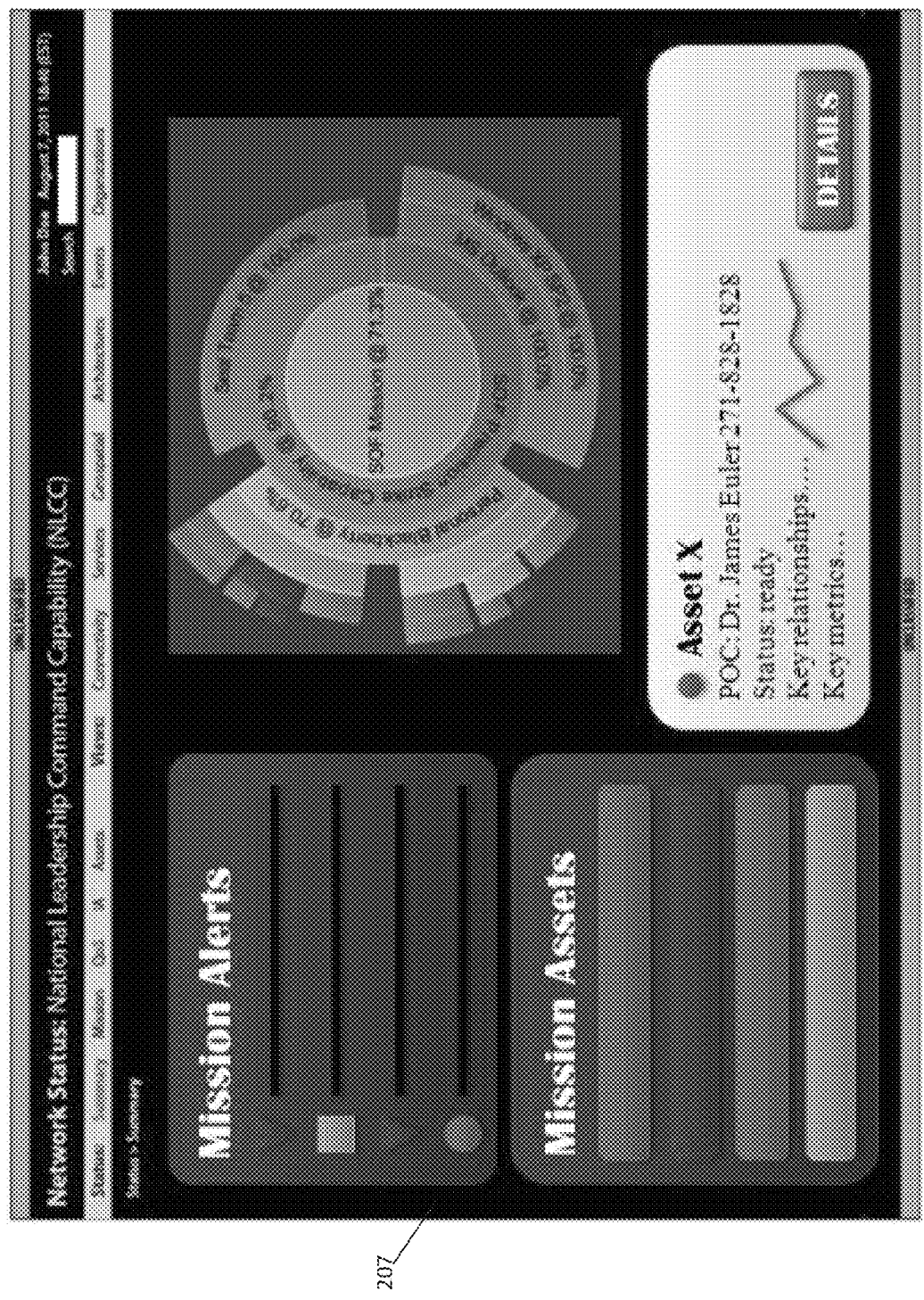
FIGS. 12A, 12B and 12C show another network application (mission page) 207 with a sunburst and tree map visualization showing current infrastructure status and related dependencies relative to a mission.

FIG. 12A shows another network application with a sunburst and tree map visualization showing current infrastructure status and related dependencies relative to a mission 207. Mission alerts, mission status, sunburst map, and an information window are shown. As mentioned in the above sections, the data visualized has multiple kinds of relationships, key of which are (hierarchical) organizational position, and layer dependencies. While tree maps and sunbursts both provide hierarchical visualization, they can be less effective at conveying dependencies. Accordingly, a system can use a layered visualization for particular network entities, as in FIG. 11. A visualization model for a senior leader will have different visualizations as opposed to a technician for its ease of use and simplified "first glance" capabilities.

A FIG. 12A 207 hierarchy of dependencies can have a form of a core of a tree with leaf elements surrounding the core in a circular manner (some of whose leaves fanning out from the core/tree may represent the same object). Since this data is principally organized in a tree (rather than a hierarchy with potentially greater numbers of dependencies), then a sunburst or tree map structure may be more suitable.

With regard to sunburst views, the 10 Layer model could be represented well using a sunburst model if the user were interested in a mission-centric higher-level breakdown. For instance, a senior leader may be interested in mission X. If Mission X were clicked on (perhaps from the overarching layer model), a sunburst model would appear with the Mission X's Layer 10 in the center. Layers 8 and 9 would be represented along the outer petals of the inner circle. It would be easy for the user to determine which aspects of the Layers were directly related to Mission X's current state. Depending on the user, the Sunburst may display more or less detail (in terms of the minimum Layer displayed within the visualization).

Sunburst visualizations provide an at-a-glance perspective on the number of children a component has, as well as the overall status. One disadvantage is that, if the dependencies are not a strict tree, then components must be duplicated to convey that information. Sunbursts also have a natural hierarchical navigation: the user may click on any component to re-center the view on that component.

Tree map visualizations have many of the same benefits as sunbursts for displaying hierarchical information. One drawback is that it is often difficult to perceive the parent/child relationship. A key difference (from the sunburst) is that in a tree map, each level occupies roughly the same screen space. In contrast, sunburst visualization divides its screen space roughly evenly across the levels.

Figure 12B:
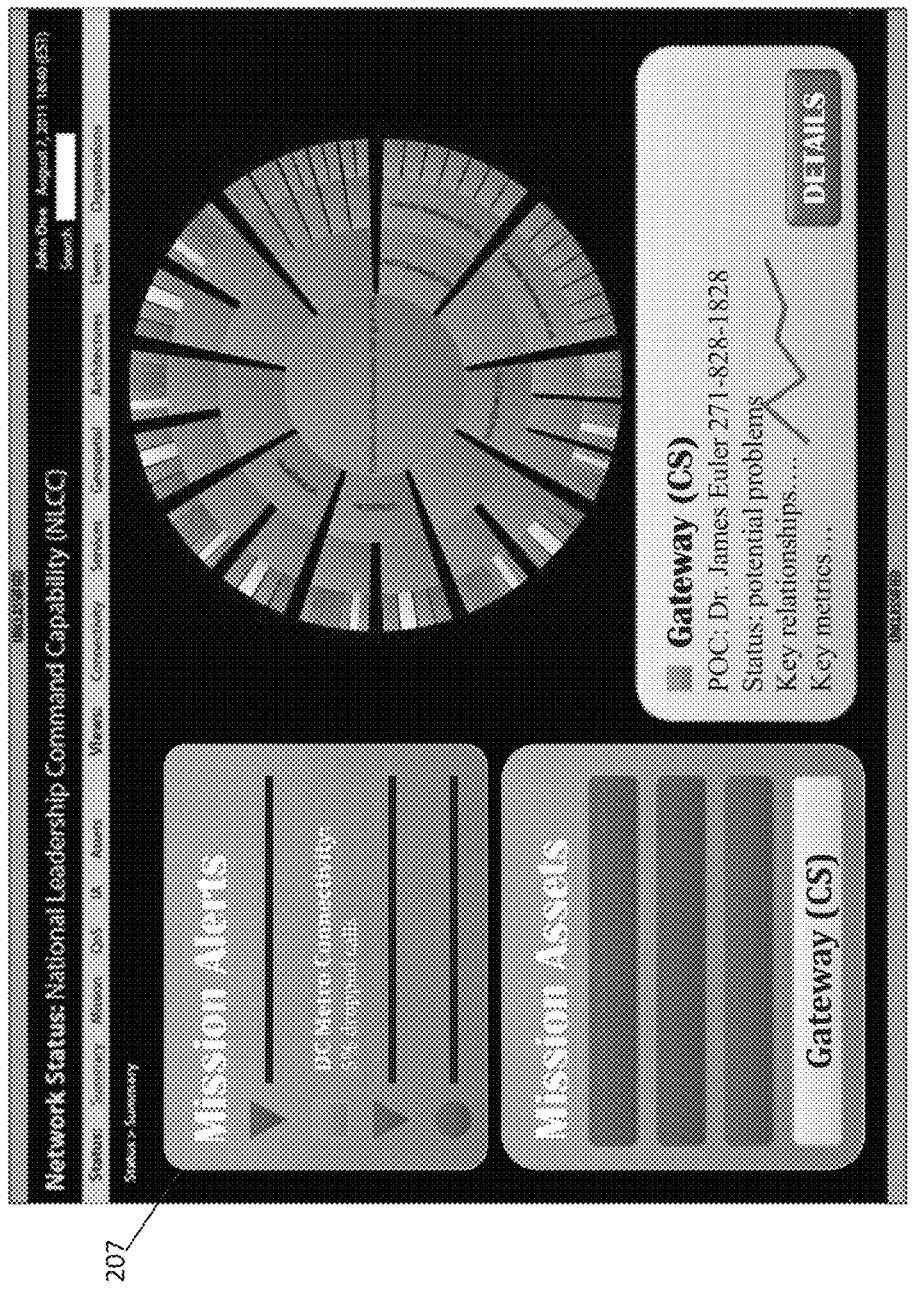

FIG. 12B 207 shows another network application with a sunburst and tree map visualization showing current infrastructure status and related dependencies relative to a mission. Purpose: track status and risk for a single mission; See alerts related to the mission, key assets; Sunburst visualizations provides visual perspective on dependencies for the mission, and potential issues. In this example, a user can click a particular alert/asset to see summary info for that asset (bottom right panel), or navigate to the asset page. In this example, mission alerts include a Metro Connectivity status (e.g. 5% dropped calls) and a mission alert for a Gateway (CS) along with an information page showing POC, status (potential problems), key relationships, key metrics information for the Gateway. The sunburst map shows leave elements with green and yellow elements providing insight relative to the mission of establishing an EA conference call with a metric of 87% capability. Leaf elements have various elements such as calendar applications used for scheduling various leaders or elements across organizations, various division operators who establish conference calls, selected tier users (e.g., Tier 2), CEO EA related elements, executive elements for divisions that should or can participate in EA activities, etc.

Figure 12C:
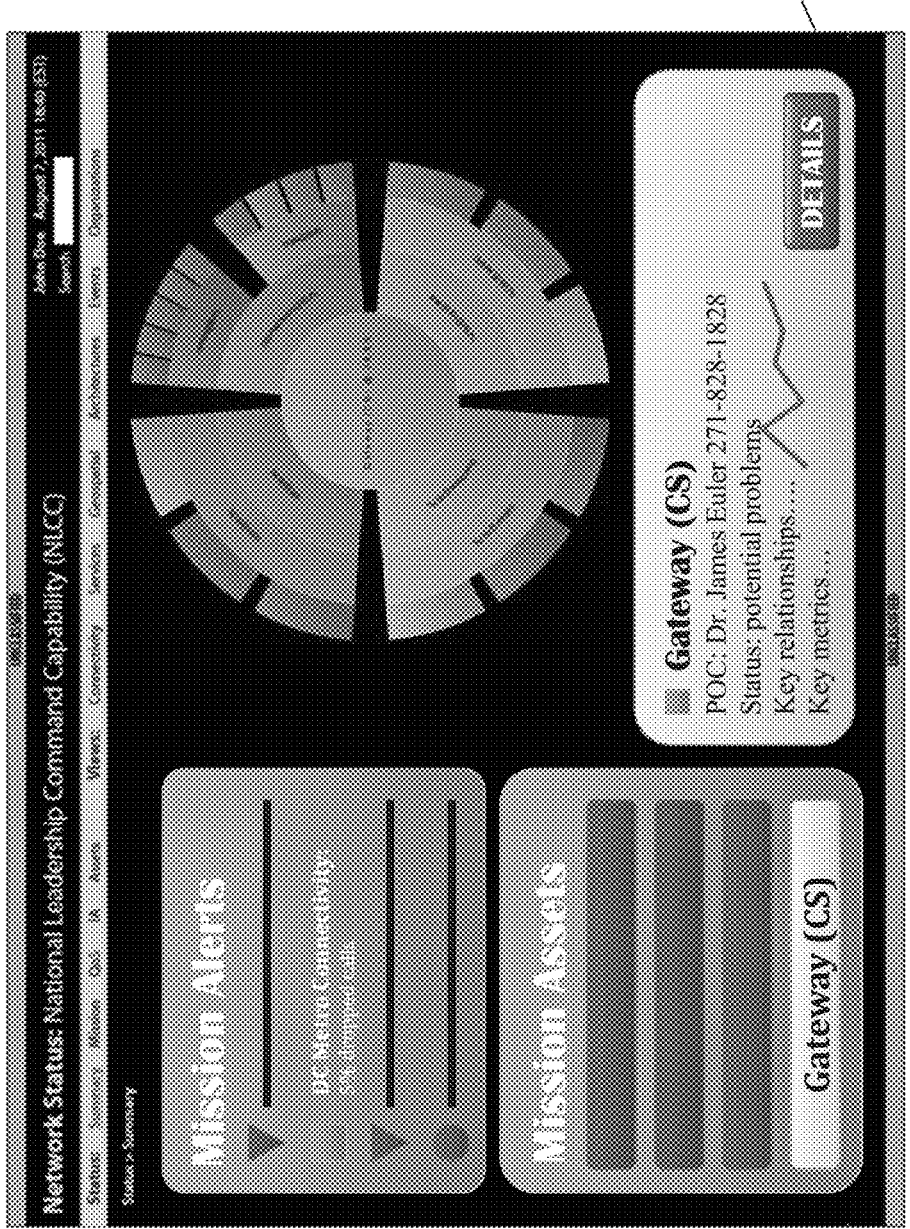

FIG. 12C shows another network application mission page 207 with a sunburst and tree map visualization showing current infrastructure status and related dependencies relative to a mission. In this example, a different element has been selected (e.g., Gateway (CS) which is showing a yellow status along with a percentage (e.g., 78.8%) along with different leaf elements surrounding a selected center element (e.g., Gateway) associated with the selected element such as particular communication infrastructures which collectively or in part can or have to be used with regard to a particular Mission Assets (e.g., Gateway).

Figure 13A:
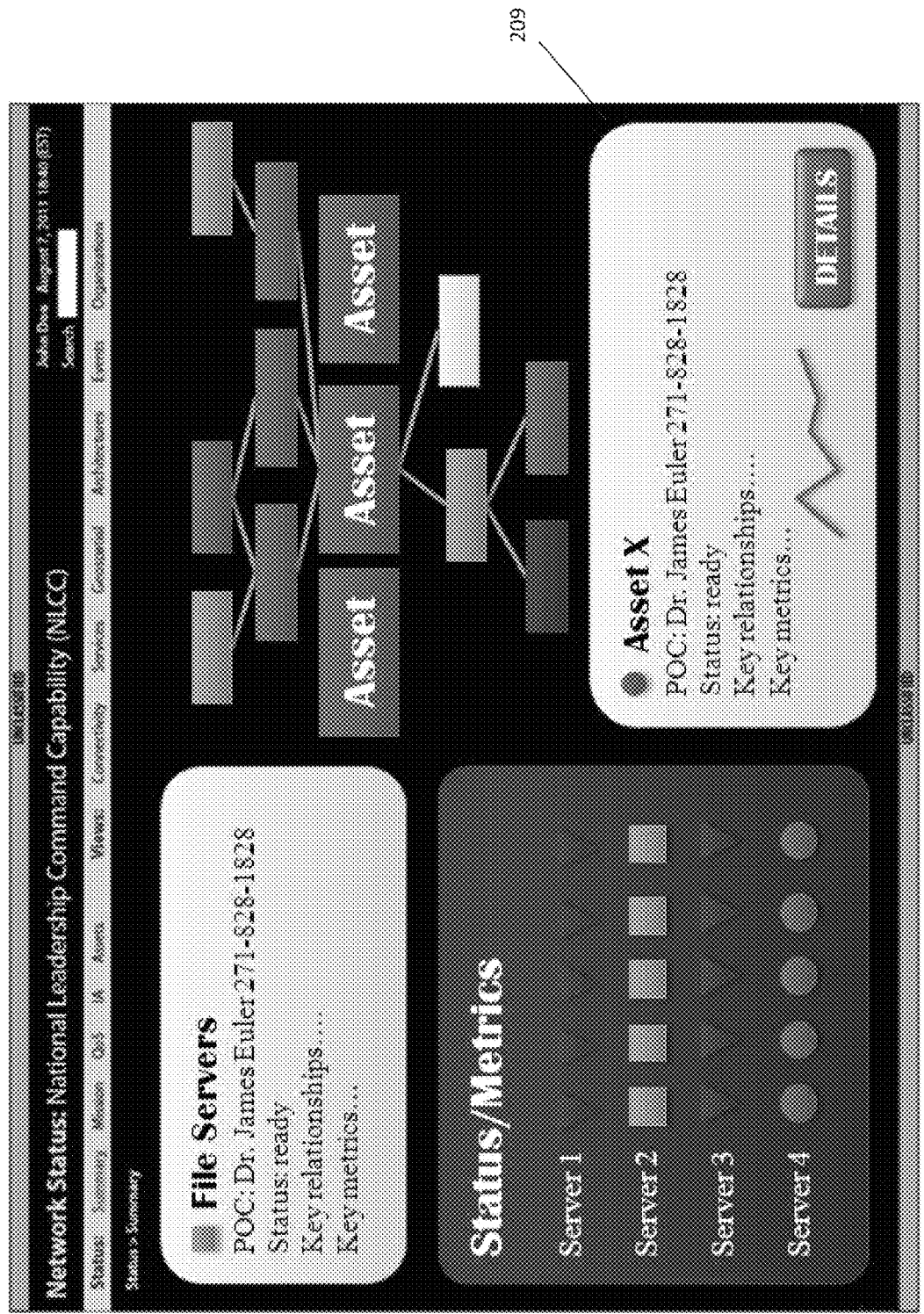
FIGS. 13A and 13B show an exemplary network awareness application visualization (asset group page) 209 for an asset group which can provide hierarchical navigational and visualization functions.
Figure 13B:
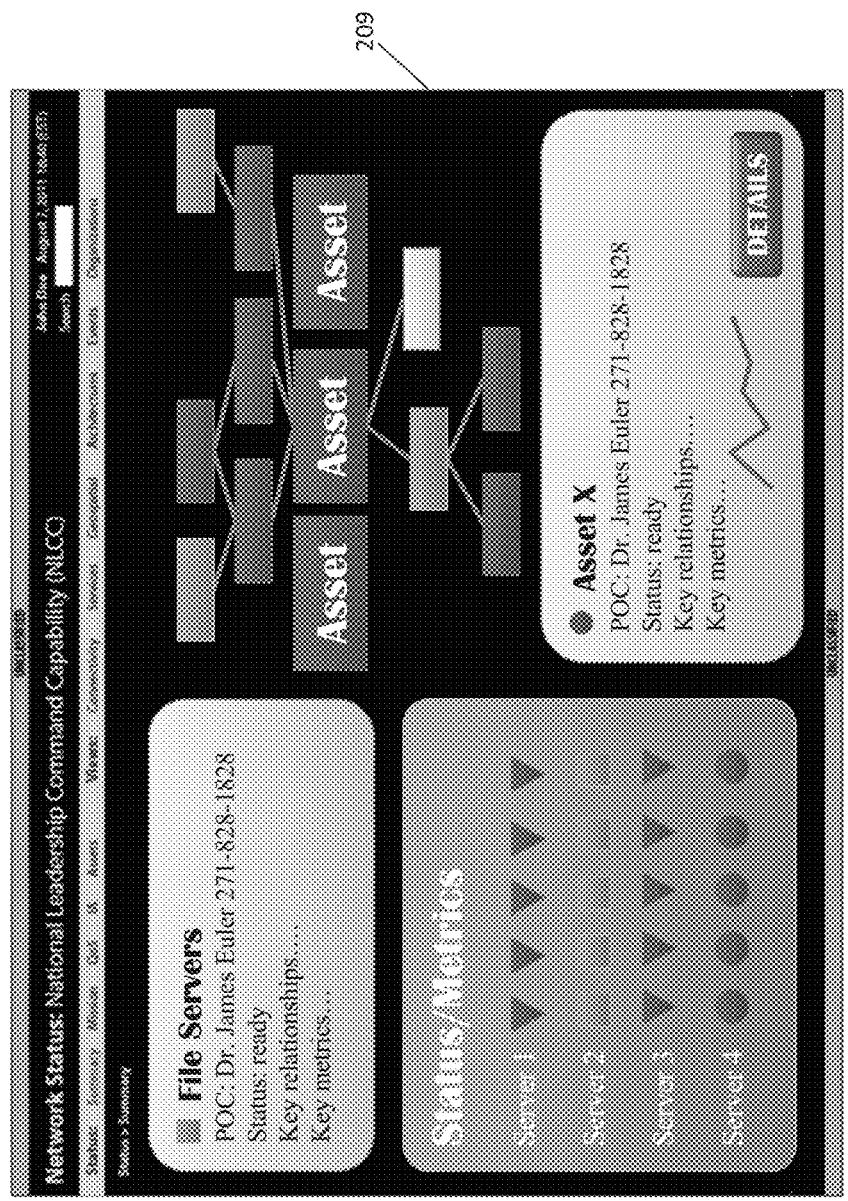

FIG. 13A shows an exemplary network awareness application visualization 209 for an asset group which can provide hierarchical navigational and visualization functions. Asset group visualizations allows a leader or CIO to further investigate potential issues for a group of assets comprising, e.g., file servers. One purpose of the asset group page 209 is to track a group of assets of a common type. Asset group visualizations can provide a dependency visualization that shows what is depending on the asset, and what it depends on (might also use other visualizations, e.g. geographic display). Also shown is a metric table shows a heat map (e.g. colors associated with status) of several metrics for several entities. The status/metrics section for the servers is shown with different symbols (e.g., red triangles, orange boxes, green circles) for e.g., server 1, server 2, server 3, etc. An information window is shown for a selected asset with POC, status, key relationships, metrics etc. A hierarchical depiction of selected assets (e.g., file servers) along with higher level and lower level element relationships which are also color coded (e.g., green, yellow, red, and white) along with relationship lines showing hierarchical connections. FIG. 13B shows another exemplary network awareness application visualization for an asset group 209 which can provide hierarchical navigational and visualization functions.

Figure 14:
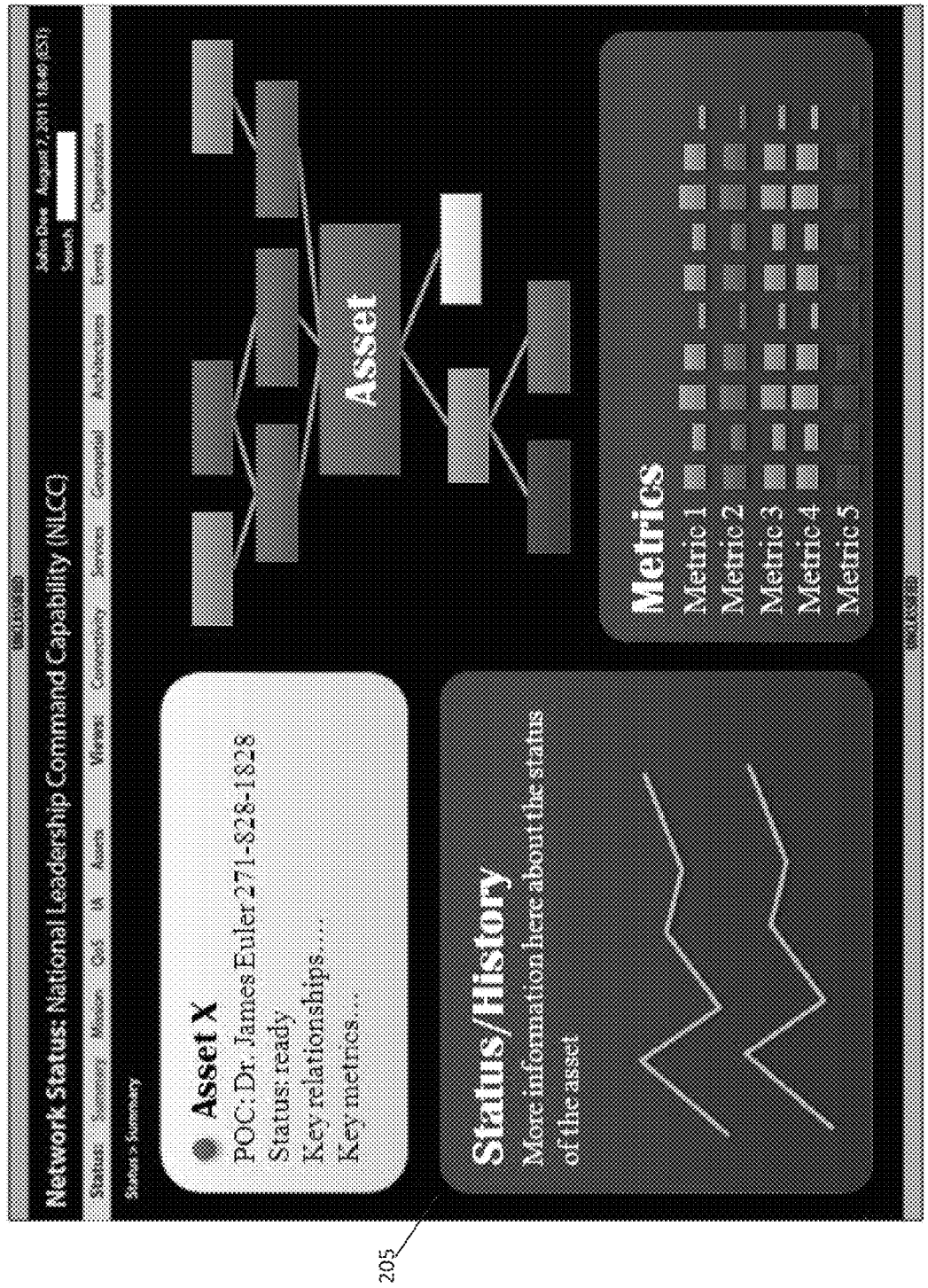
FIG. 14 shows an exemplary network awareness application visualization (asset page) 205 for a single asset where an exemplary embodiment can be operable to permit selection from the asset group visualization or other user interfaces.

FIG. 14 shows an exemplary network awareness application visualization for a single asset where an exemplary embodiment can be operable to permit selection from the asset group visualization or other user interfaces. The asset page 205 shows specific status/history and metrics associated with a single asset. A hierarchy map shows the asset and its relationship with other assets in a higher and lower level along with relationships between then.

Figure 15:
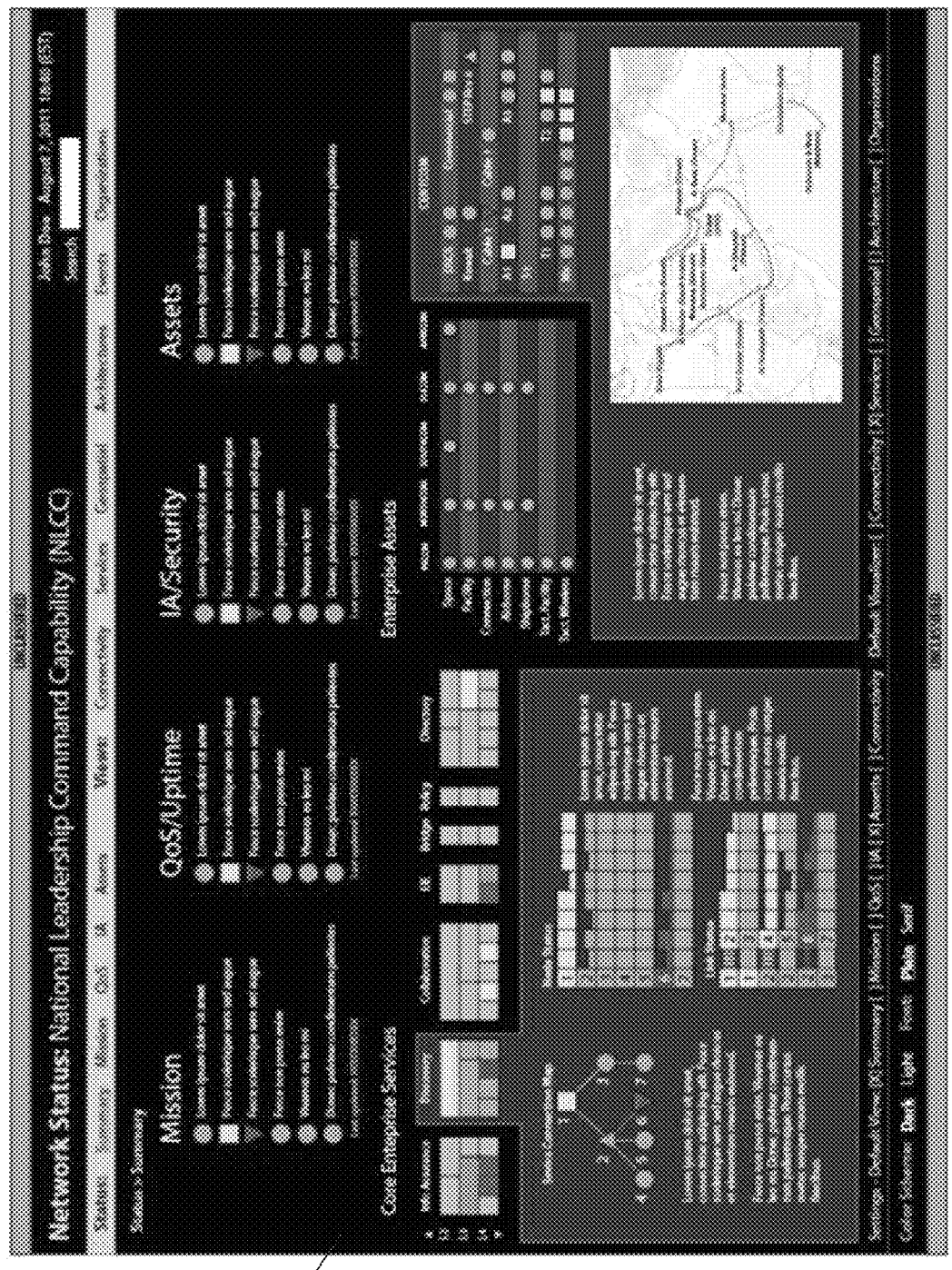
FIG. 15 shows an exemplary network awareness application (asset detail page) 211 in a detail visualization for a single asset showing detailed information on a selected asset.

FIG. 15 shows an exemplary network awareness application in a detail visualization for a single asset showing detailed information on a selected asset. Various elements on an exemplary detail page 211 can include mission, quality of service (QoS)/uptime, information assurance (IA)/security, and assets that all have symbology/color (e.g., green circle, yellow box, red triangle) under each. Other elements of an exemplary detail page include Core Enterprise Services with sub-element windows showing greater details of information assurance, discovery, collaborative, bridge, policy, directory, etc. For example, the discovery tab can display a service connection map, node status, link status along with some details on each node/link, color coding such as yellow, red, yellow, dashed lines, etc. Settings on this page include a default view with selections of summary, mission, QoS, IA, Assets, Connectivity, etc. Another default setting re Visualizer includes connectivity, services, geospatial, architecture, and organizations. Another element of this visualization includes an enterprise asset section which has specific organizational or geographic elements such as, aviation division, headquarters, land vehicle division, consumer products division, R&D division, etc. with specific sub elements such as space assets (e.g., satellite), facilities, connections, airborne, shipborne, specific facilities, specific area selections. A user can select one of the enterprise assets on a left side of the enterprise asset visualization section which then populates an asset detail window which shows specific aspects or assets associated with the enterprise element such as GE® Aviation Division with a list of specific locations, specific critical communication assets (e.g., communication cables 1, 2, 3) with status symbols/colors, and other factors like weather (severe vs not severe), etc. A map is also shown for the selected enterprise asset where the assets are shown on a particular terrain or a cyberspace topology (not shown). Last update sections are also shown for various elements of this visualization.

Figure 16:
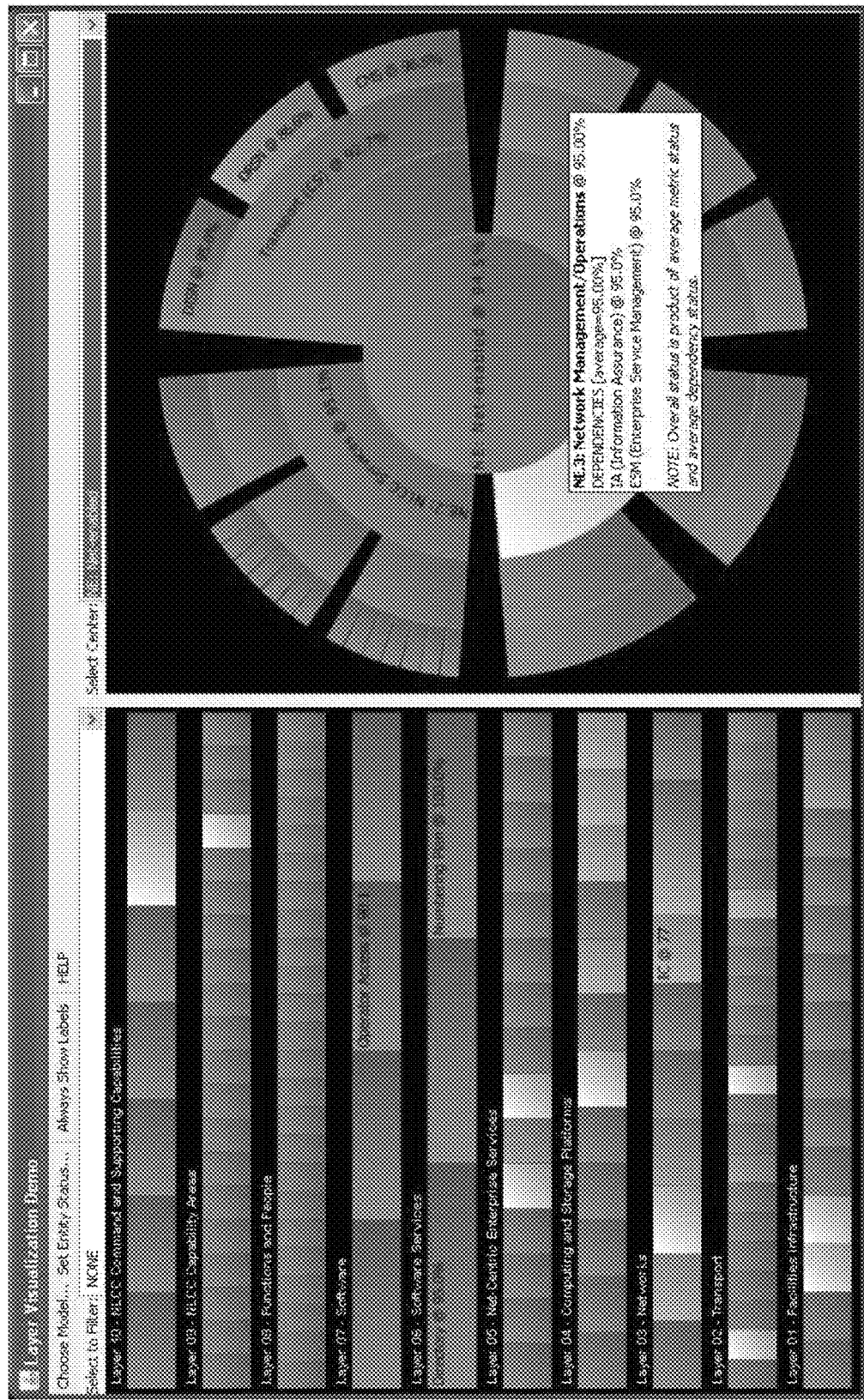
FIG. 16 shows an exemplary user summary and mission visualizations 203 with layer visualization and color coding associated with different common framework layers/status as well as a sunburst visualization associated with selected elements of one layer, e.g., network management and operations with hierarchical dependencies and color referenced status.

FIG. 16 shows an exemplary user summary and mission visualizations with layer visualization and color coding associated with different common framework layers/status as well as a sunburst visualization associated with selected elements of one layer, e.g., network management and operations with hierarchical dependencies and color referenced status 203.

Figure 17:
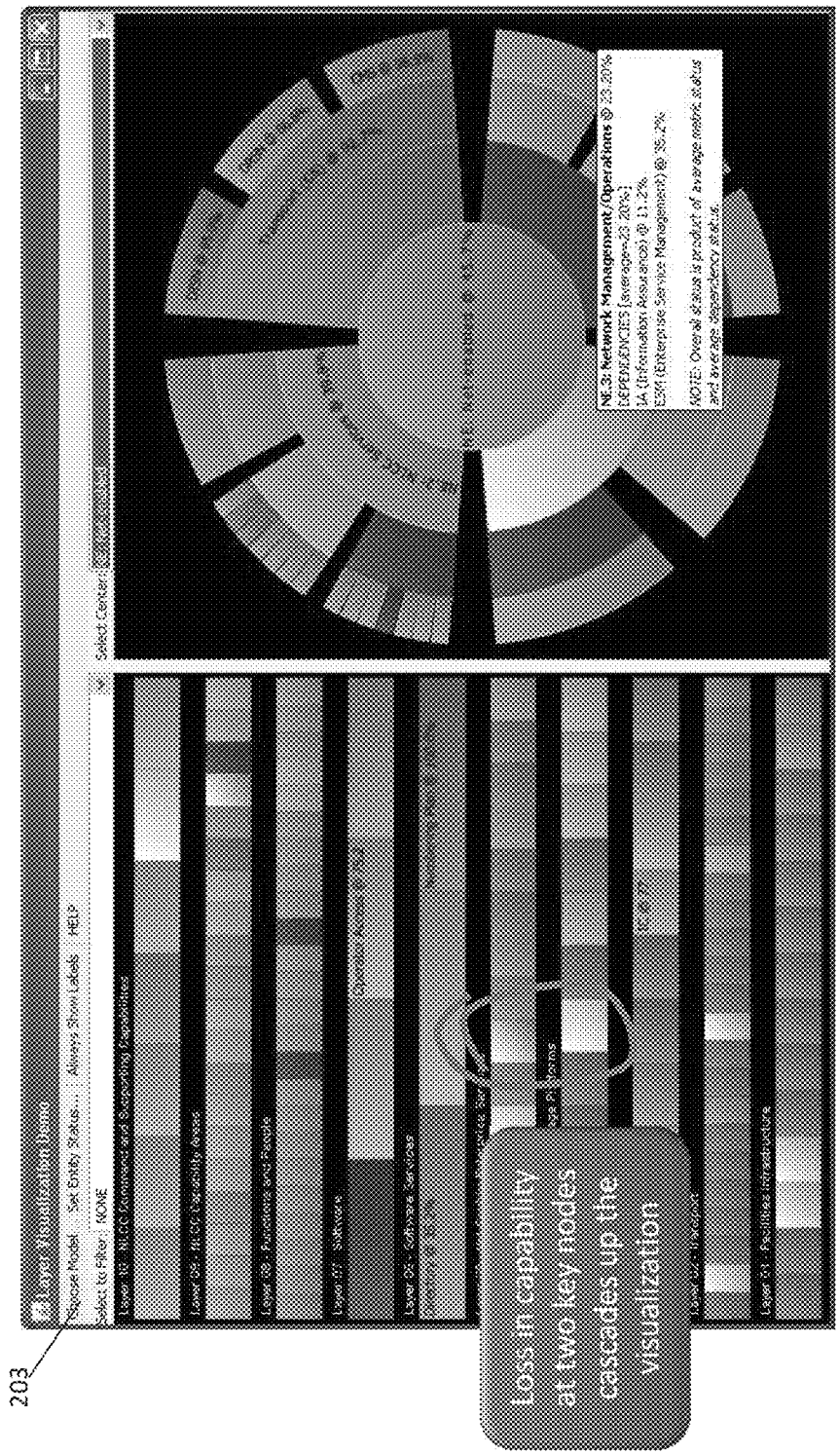
FIG. 17 shows an exemplary user summary and mission visualizations 203 depicting a scenario e.g., loss in capability at two key nodes along with a sunburst visualization showing selected elements of one layer, e.g., network management/operations.

FIG. 17 shows an exemplary user summary and mission visualizations with a sunburst showing color coding for both 203. The FIG. 17 visualization shows a scenario e.g., loss in capability at two key nodes along with a sunburst visualization showing selected elements of one layer (e.g., network management/operations). A specific information window is shown which gives contact information for a selected asset that pops up and gives additional details for a selected segment of the visualization.

FIG. 18 shows a method associated with determining and selecting information which is then used to render information into visualizations in accordance with various embodiments of the invention. Step 801: Determine information needs, e.g., critical information needs, for one or more echelons of decision or leadership elements. Step 803: Determine inhibitors or problems to meet critical information needs including point solutions or local optimizations, limited data sharing rules or culture, technology limitations, and other culture problems. Step 805: Evaluate data visualization relative to decision making that represent the most relevant or critical information to a particular user or set of users. Step 807: Determine scope of visualization e.g., mapping data to critical information requirements (e.g., once a framework is established for capturing data-sets, those data must be mapped against a set of CIRs (e.g., full regional communication outage within a region of interest, cyber or information system related auto-trigger actions for events when demands exceeds, e.g., 90% of capability, information system auto-trigger actions for events when, e.g., 95%, bandwidth utilization is exceeded for any single Internet access point, premature ending of a secure call (dropped call)—either point-to-point or on a conference call, reduced backbone capacity of, e.g., >25% (or a relevant level that indicates significant voice quality impacts), major security incident affecting any of the secure voice networks, catastrophic effects on any of the infrastructure facilities (buildings, communications), etc. Step 809: Defining Metrics—Metrics That Drive Actions and Decision Making—e.g., Within each layer of the JARM reference model, metrics must be collected that support the capture and identification of CIRs . . . which ultimately drives actions and critical decision making. Step 811: Determining Data correlation—Correlation of the massive amounts of data collected across multiple mission domains and network infrastructures e.g., Cross-system data—normalize data across organizations/systems and different data formats and associate with thresholds/metrics for current status levels of the network; Importance of mission data—focus on critical systems as tied to mission needs and indicators of risk or vulnerability/issues; dependencies—understanding the threads of an entity, its successor and predecessor dependencies, can be key to visualization; Audience—understand that the user cannot be expected to be an expert in certain domains; Provide human context—a visualization must provide a context in which to interpret the data. Step 813: Rendering of Information into Visualization: Elements of an SA Visualization—Web-based environment (e.g., Support integration of massive, distributed data; Several application linked together; Provide higher level understanding; Drilldown into specific issues; Layered visualization; Easy association between affected asset and mission impacts; Multiple metrics displayed simultaneously; Dependencies are identifiable; Enable rollover for quick summary; Leverage JARM Model for Visualization of DoD Networks, Tying Infrastructure and System Outages to Mission Impact Indicators).

FIG. 19A shows a segment of another exemplary method of determining and selecting information which is then rendered into visualizations in accordance with various embodiments of the invention. Step 901: Determine assets to be visualized, associated configurations of the assets as a baseline. Step 903: Once an accurate set of assets and associated configurations are base lined, a metrics step is established to measure the health and status as well as security posture of each of the assets or in some cases a set of assets. Actual measurements and metrics that are required for each asset is dependent upon and driven by the critical information requirements (CIR). A CIR may be defined as what needs to be measured on a particular asset or set of assets in order to determine if a threshold was crossed that would cause a health and/or status alert to occur. In some cases, this may just be a "system up" or "system down" indication. In other cases, asset performance is critical and measurements of bandwidth, CPU or disk utilization, etc. are needed. Step 905: Determine rules for rule base or software to identify and aggregate data/save data from a low to high level which impacts various hierarchical tiers of visualizations from a subsystems to systems relationship based on determined dependencies. Three different types of rules which roll up data from low level to high level ((1 Default—average to roll things up; 2) Awareness status computation—grey boxes—grey means—lack of information box; plus red, green and yellow. How are missing information addressed. Rolling up awareness on how much a system knowledge about individual CIRs, assets, or relationships. 3) weighted value—changes weights for dependencies.) Step 907: Execution initiated. Step 909: Load and execute daggerapp.java (see Code Attachment) Step 911: Initialize, startup, and ready. Step 913: Initialize function— starts up the data feeds to COLLECTORS—data sources— goes out to the sources vs sources coming to the tool. Step 915: Startup function—constructs and shows graphical user interfaces (GUI). Step 917: Execute ready function—more GUI or visualization setup. Step 919: execute Daggerview- .java (see code attachment) comprising steps 921 to 931). Step 921: Initialize GUI—generates the various GUIs comprising Layer view, Sun Burst View, Item Detail Views, Favorite Entities View, etc. Step 923: Layer view—two categories—infrastructure/services (layers 1-7) and organization/entity (e.g., layer 8) e.g., national command entities plus entity (e.g., org) capabilities plus supporting capabilities (layers 9 and 10). Step 925: Sun burst view—mission/ capabilities.

FIG. 19B shows a continuation of the FIG. 19A method. Step 927: Item (aka entity or object) details view—click on item—display what goes with the tool set/item—e.g., see power point presentation NVizArch-Design—e.g., emergency action conference call panel with asset info. Step 929: Generate favorite entities view—short list of things that matter (mission assets view in power point presentation— like the favorites view. Step 931: Generate alerts view—not implemented—on side—side panel (shown as mission alerts). Step 933: Load a model—user can load explicitly or system can be configured to load a particular model based on various configuration settings—e.g., load model command in this embodiment is in DaggerApp—"Lmodelimpl.java" can be provided as a name of a class—method returns this class and makes it available for the GUIs and computation functions. A model here can be a set of layers, a set of objects/entities in each layer; objects/entities have dependencies that depend on other objects, a set of properties, a set of metrics, a set of status data as well as a name/identifiers etc. In a web application, model is pre-configured or loaded prior to the GUI kicking off. Launch page is where model selection occurs (not shown). For example, a leadership or command/control model is shown in at least some figures herein. Where a Java application is used, then the model can be loaded from a command page or a launch page. Views correlate to models layers and objects. GUIs can include layers which correlate to the model layers and the layer views showing objects/entities within the layers correlate to the model objects/entities. (note the code uses "entities"). An object/entity in the model—is a box that shows up in a view—name, identifier, list of properties, list of metrics, and list of dependencies. The list of dependencies are a list of other entities which have some relationship to the entity in question such as a supplier or receiver relationship. Showing impact of degradation or loss with respect to other entities. Step 935: Execute computation (computed metrics) and also Daggerview then feed loaded model with data. Where a boundary of a model determines what goes into a given model versus what is outside the model. Once model and GUIs are loaded, then data feeds operate and gather data from sources, then data is a list of indicators—the system will map the indicators to the items. E.g., network connectivity is up or down—current CPU percentage etc. Data feed maps to properties or metrics in object/entities in the model. One of parameters in the view that can be switched is what computation that the user is using. What determines the color in effect. Metrics that come from data feeds and metrics that are computed based on initial or data feed metrics. Data feed supplies data for properties and metrics. This acts as a trigger for computation. There is no notion of history in this exemplary embodiment so it overwrites e.g. network connectivity. Metric for network connectivity is up or down (zero or one). When data feed comes in, then computation module will update the network connectivity for system X metric data—as e.g., zero—which in turn triggers a change in metrics for other systems/entities/ objects that are listed in updated object/entity's dependency list. Every time a data feed is received, then the system re-computes all entity/object data metrics which in turn updates other metric elements in other entity/objects which in turn changes or does not change the GUI element colors.

FIG. 19C shows a continuation of the FIGS. 19A and 19B method. Step 937: Execute filtering capabilities—filter layers or objects/entities. User actions are defined in either Daggerapp or Daggerview in this embodiment. All user actions have an annotation next to the method which e.g., is "@" symbol followed by the word action. "@ action . . . ." This modifies an appearance or elements/presentation/organization of a GUI. Permits a user to look at elements of particular interest. Could have all be stuck in daggerview. Step 939: What if capability—Modeling and simulation capability—Additional user defined action. E.g., alter computed metrics which in turn updates the model. For example, positioning a mouse cursor over a layer or a layer entity will alter computed metrics associated with that layer or entity which then triggers a re-computation of metrics associated with entities listed in a dependency list associated with the use selected layer or entity. E.g., a GUI can have an entity selection function which displays a list of all entities—a user can select an entity—then a slider bar or input field is provided which permits the user to adjust metrics associated with the selected entity e.g., overseas connectivity for DISA—where the slider changes a metric from zero to 100% connectivity—which in turn alters the color of various elements of the Layer GUI e.g., User summary showing all layers and high level elements of each layer on one side and Mission page (sun burst view).

Figure 20:
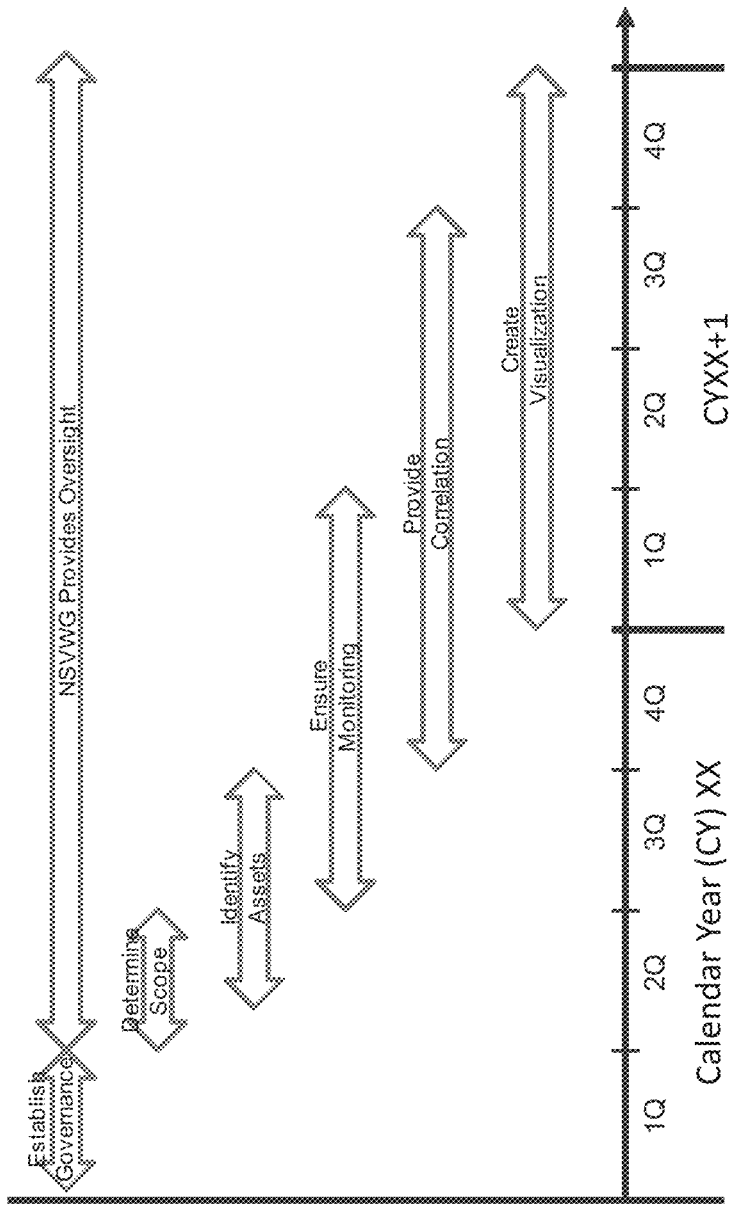
FIG. 20 shows an exemplary programmatic approach for creating visualization tools.

FIG. 20 shows an exemplary programmatic approach for creating visualization tools. With a selected common reference framework and correlation engines and business rules built, applets can be designed to address CIRs and in particular user-preferred screen presentations. Several things must be considered as the below timeline is followed for implementation: End goal is for Visualization to serve as a service delivered through the core network; Protection of sensitive data needs to be determined; Understanding of how special access network should be handled; and Access Control schemas should be implemented. A first set of tasks include establishing governance and providing continuing WG oversight throughout development tasks. A next step is determining scope. A next step is identification of assets. A next step is ensuring monitoring aspects are determined. A next step is performing correlation of data. A next step is to take the previously obtained information and creating visualization activities.

FIGS. 21A and 21B show overviews of an exemplary software architecture or file overview including basic package list in a Java language format (e.g., Implementation Package (edu.jhuapl.dagger)) that can provide standard implementations of the tool or Dagger API classes. Exemplary files can include AwarenessStatusComputation.Java, DefaultStatusComputation.Java, LEntityIMPL.Java, LFeedManager.Java, LMetricFeedSupport.Java, LmodelImpl.Java, LModelPersistenceDelegable.Java, LModelReader.Java, LModelUtils.Java, Weighted Status Computation.Java as discussed in FIGS. 21A-21B. These code packages provide a basic implementation of the exemplary tool or Dagger package elements.

FIG. 22A shows an exemplary software architecture or file set overview including an API file set overview as described in FIG. 22A. API Package (e.g., edu.jhuapl.dagger.api) defines an exemplary core API for the exemplary tool Dagger, including a description of a Dagger model and the mechanisms for mapping data to the model. Implementations of the classes in this package provide the actual behavior. The exemplary core model class is LModel, which defines a collection of entities together with (acyclic) dependencies among those entities. The entities LEntity are grouped into layers and groups, allowing for additional organization. Entities also have properties and metrics. An entity may have several status metrics, each of which has a particular key. This is useful, e.g. if the model provides multiple interpretations of the status of entities (one might be the overall status, another might be the uncertainty, etc.) These metrics are represented in code as LMetrics, which may be either static (such as those provided by sources outside the model) or dynamic (such as those based on the computed values of other metrics). The computations of dynamic metrics are described in an exemplary LComputedMetric. A LMetricFeed is able to retrieve an "updated" set of metrics and maintain a feed status indicating whether the feed is operating properly.

At FIG. 22B, exemplary files include Lcomputed Metric.Java, Ldescribable.Java, LEntity.Java, Lmetric.Java, and Lmodel.Java as described in FIG. 22B. This exemplary package contains elements of exemplary API for a DAGGER package, which defines a data model together with several views that utilize the model. An exemplary core model class can be {@link dagger.api.LModel}, which defines a collection of entities together with (acyclic) dependencies among those entities. Exemplary entities {@link dagger.api.LEntity} can be grouped into layers and groups, allowing for additional organization. Entities also have properties and metrics. Exemplary entity metrics implement {@link dagger.api.LMetric}, and an entity may have an arbitrary number of metrics. Some of these metrics are external to the model, and others ({link dagger.api.LComputedMetric}) depend upon the values of other metrics, usually those of entities that the metric's entity depend on. An entity may have several status metrics, each of which has a particular key. This is useful, e.g. if the model provides multiple interpretations of the status of entities (one might be the overall status, another might be the uncertainty, etc.).

FIG. 23 shows an exemplary software architecture or file set overview including an APP file set overview. In particular, FIG. 23 shows an exemplary App Package (edu.jhuapl.dagger.app) that provides an entry-point into the Dagger application (DaggerApp), exemplary functionality for managing data feeds, and some of the user interface elements for the application. In this example, remaining user interface elements, such as those displaying the model, are defined in the edu.jhuapl.dagger.views package. Files can include DaggerAboutBox.java, DaggerApp.Java, DaggerView.Java, LDirectorModel.Java, DaggerAboutBox.Form, DaggerView.Form, and Resources (e.g., Collection of Properties Files and Sample) as discussed in this Figure.

FIG. 24 shows an exemplary software architecture or file set overview including a feeds file set overview. In this example, FIG. 24 shows a Feeds Package (edu.jhuapl.dagger.feeds) that provides examples of data feeds that can be used to import metrics into Dagger. Files can include FileFeed.Java, FileFeed.FileLookup, ITSDFeed.Java, and NIAECSensorFeed.Java as described in this Figure.

FIG. 25 shows an exemplary software or file set overview including a view file set overview. In this example, FIG. 25 shows a Views Package (e.g., edu.jhuapl.dagger.views) that provides the user interface components for visualizing Dagger models, entities, and entity details. Files can include EditEntityPanel.Java, EditEntityPanel.Form, LEntityJList.Java, LEntityPanel.Form, LEntityPanel.Java, LEntityStyleDelegate.Java, LEntityTipDelegate.Java, LFeedPanel.Java, LModelCombo.Java, LModelLayerView.Java, LModelSuburstView.Java, LModelWhatIfPanel.Form, and LModelWhatIfPanel.Java as described in FIG. 25.

Figure 26:
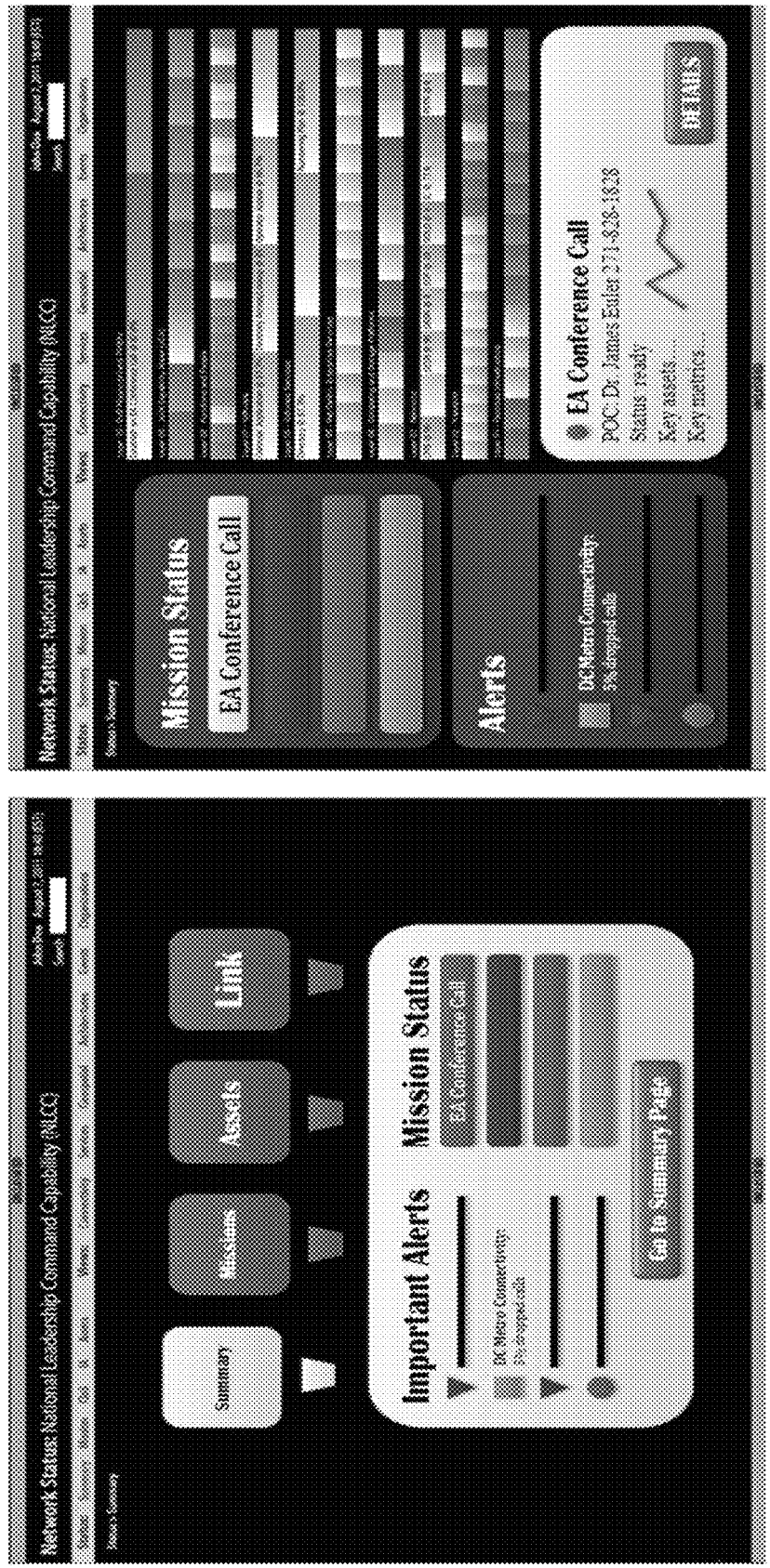
FIG. 26 shows an exemplary view of visualizations associated with a CEO/CIO scenario who can be evaluating a mission or capability using the displayed visualizations such as emergency action (EA) conference call capability.

Referring to FIG. 26, a user (e.g., herein may be referred to as a CEO/CIO) scenario can be evaluating a mission or capability using a visualization tool such as EA conference call capability. One of a CIO's ongoing routines includes maintaining awareness of any issues that may impact the EA Conference Call capability. The CIO browses to the Launch Page (See also FIG. 10), where the CIO sees the current status of the EA Conference capability, as well as other high-priority mission activities. The CIO has also configured an App on the launch page to track the status of HQ local area switching metro connectivity, since it was identified as the source of a dropped call during a conference call the previous week.

Based on a review of the configured App on the launch page (under important alerts), Metro Connectivity appears to be unchanged, although it is still improved from last week, and there appear to be no current problems with establishing an EA conference call. Since nothing demands immediate attention, CIO clicks "Go to Summary Page" and proceeds to the Summary Page (FIG. 26 right), which provides a more detailed perspective on relevant current infrastructure status. The visualization provides an overview of the primary missions and activities of interest to the CIO, and links these activities using an underlying model to network and infrastructure assets.

CIO moves a user interface mouse over an "EA Conference Call" button under the "Mission Status" section. The visualization highlights all assets and activities that support this mission, and below the visualization a box appears with key contact information, status, and supporting assets and metrics. Some of the assets supporting the mission have generated alerts, indicated by the yellow status.

Figure 27:
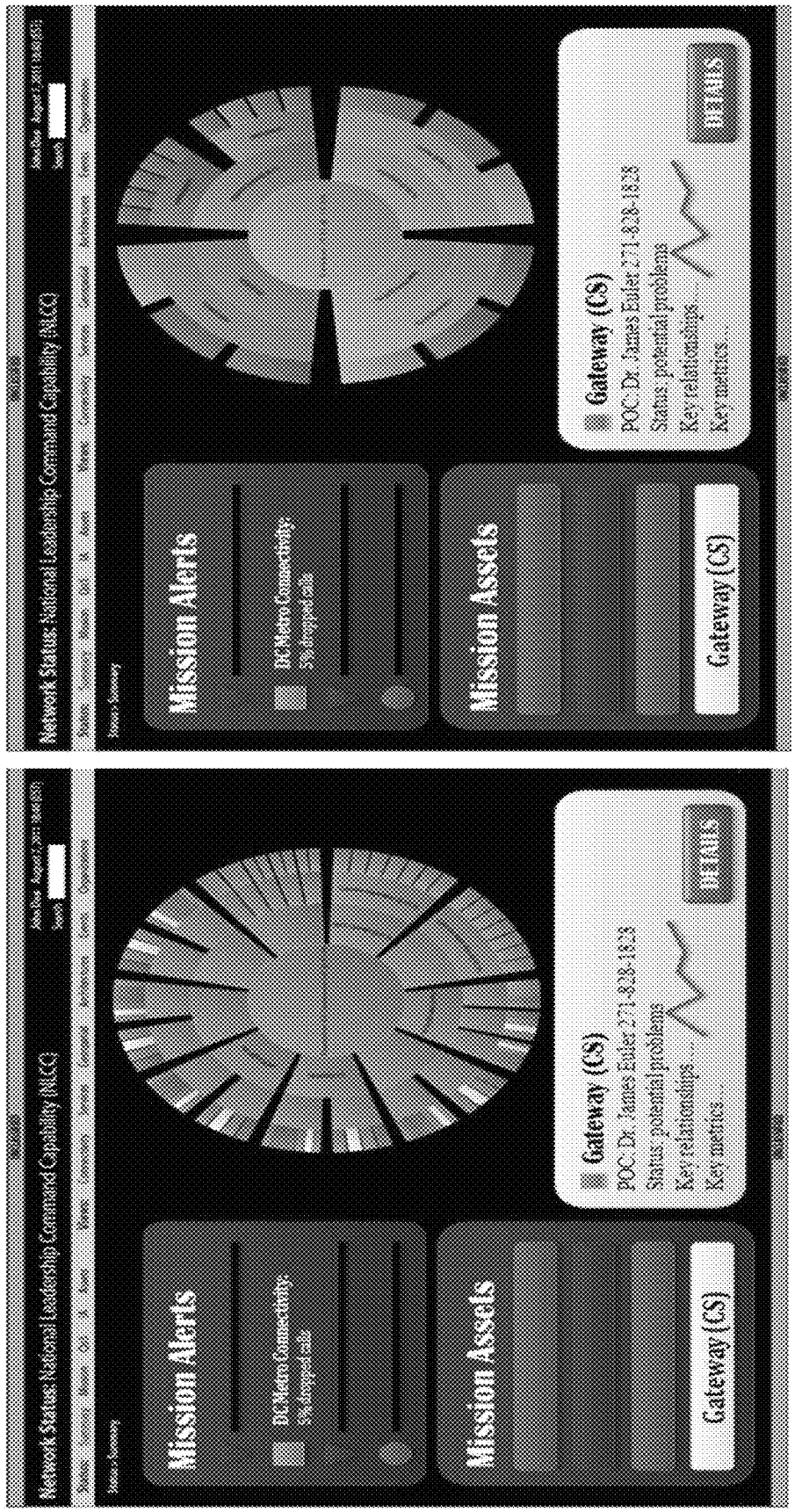
FIG. 27 shows another set of exemplary visualization associated with the FIG. 26 visualization and scenario.

CIO clicks the mission button, and then clicks the "Details" button that appears in the info box. This navigates to the Mission Page (FIG. 27—left), showing just the assets and activities that support the EA Conference Call. The Sunburst visualization depicts the assets supporting the mission. One of these, "Gateway (CS)", appears in yellow indicating potential problems. CIO double-clicks on this asset to re-center the visualization around this asset (FIG. 27—right), making it clear that a root cause is problems with the cellular network. However, the problems are not severe enough to jeopardize the EA mission.

Figure 28:
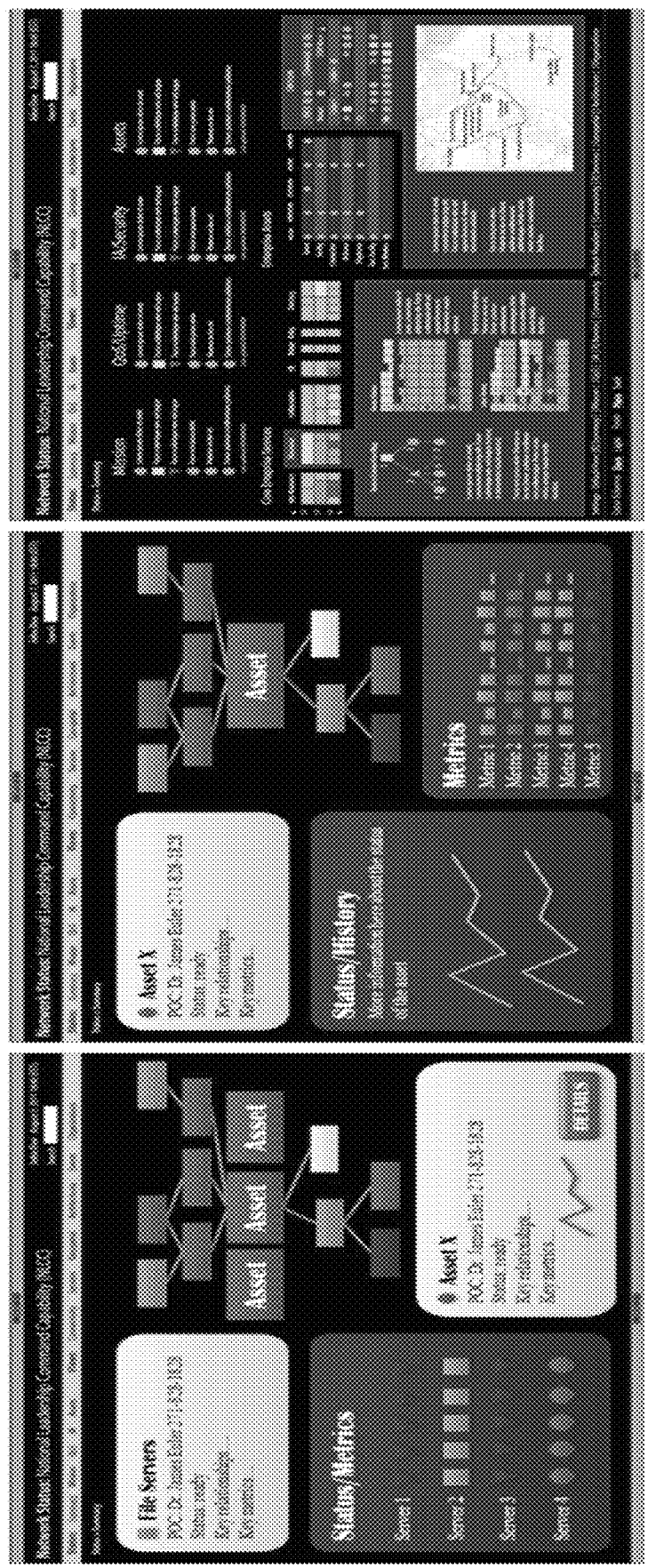
FIG. 28 shows an exemplary Asset Group Page 209 (FIG. 28—left), a related Asset Page 205 (FIG. 28—center) that can be used if one particular entity is causing a problem, and a related Details Page 211 (FIG. 28—right)

CIO clicks on the "Details" button to navigate to the Asset Group Page (FIG. 28—left). This page allows her to further investigate potential issues for the group of assets comprising the cellular network. A similar Asset Page (FIG. 28—center) can be used if one particular entity is causing the problem.

Figure 29:
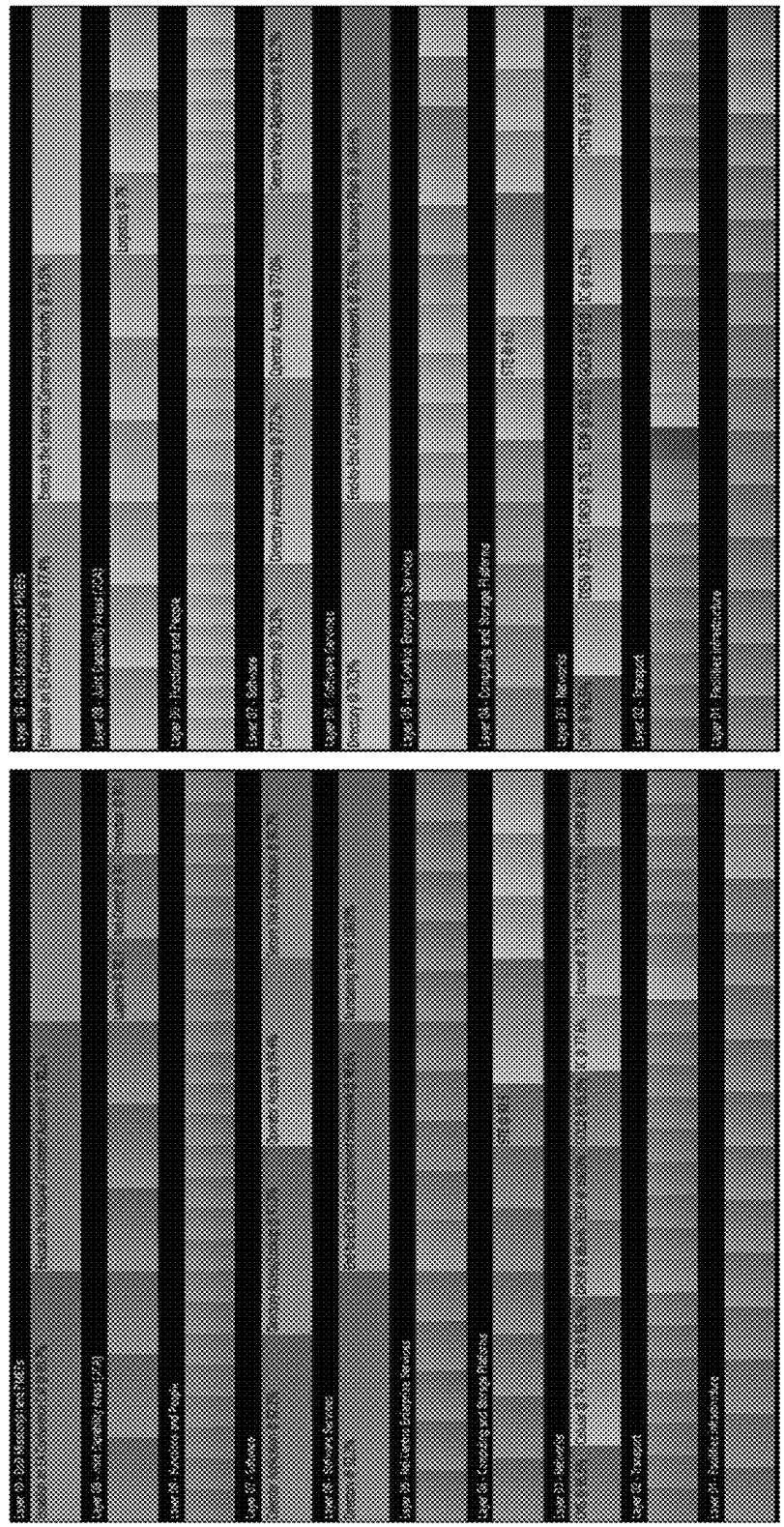
FIG. 29 shows an exemplary Summary Page 203 where a user can see in a layer visualization how a broken cable filters up through the 10-Layer model to activities of interest; where the left side of FIG. 29 shows a visualization with the cable in place/operating and the right side shows a situation after a break.

A second scenario (scenario 2) can be a loss of an overseas cable. One benefit of the Summary Page is the potential to see how existing problems impact activities at a higher level. If an undersea cable broke, for example, the resulting loss in connectivity would be generated as an alert that the user would see on the Launch Page. This page would also reflect potential impact to mission capabilities via altered coloring. Navigating to the Summary Page, the user could see in the layer visualization how a broken cable filters up through the 10-Layer model to activities of interest, as shown in FIG. 29. The left side of FIG. 29 shows a visualization with the cable in place/operating, and the right depicts the situation after a break. On the second level (from the bottom), one sees the most immediate impact is on overseas connectivity. However, assets, capabilities, and activities on other layers are also impacted.

Figure 30:
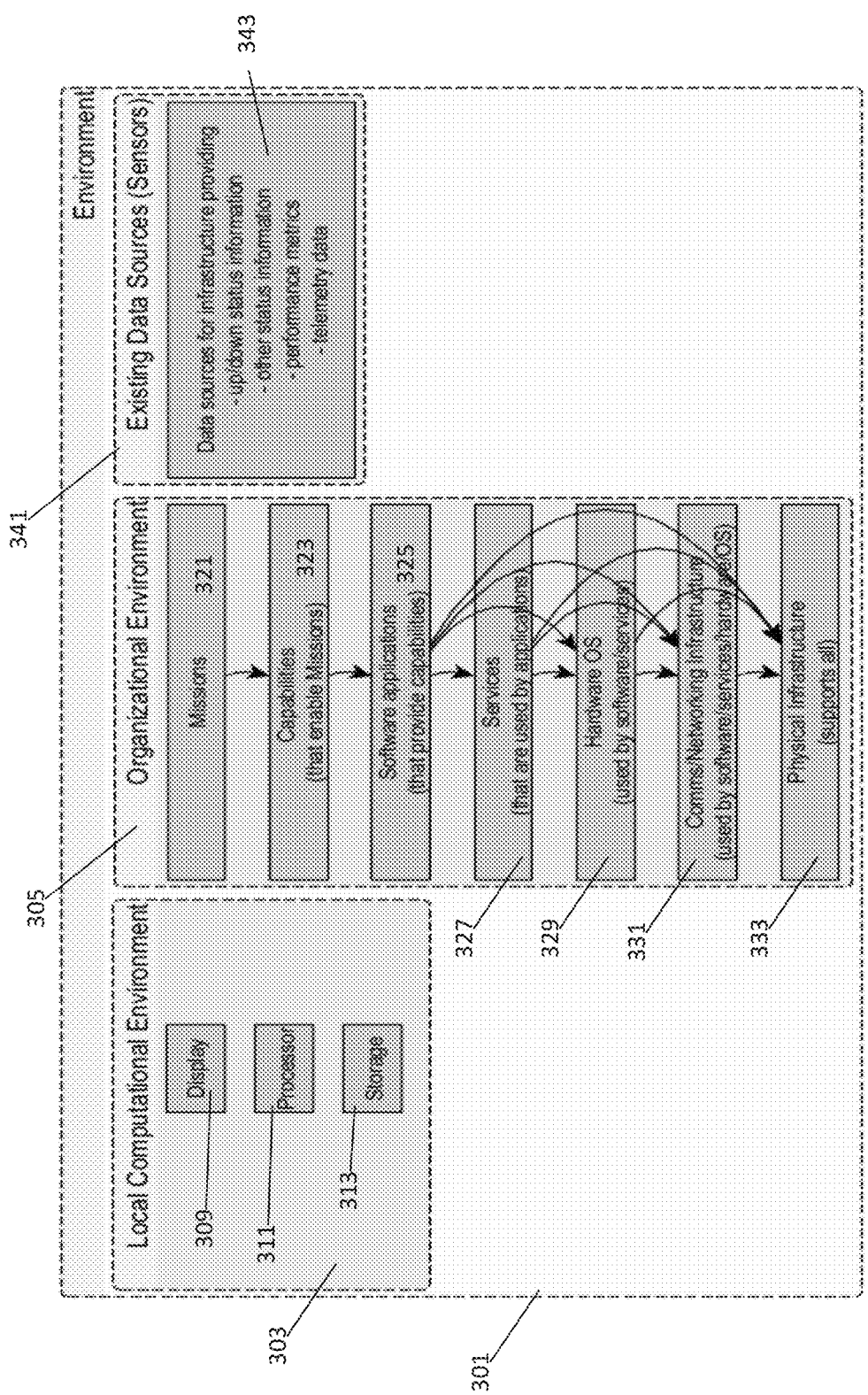
FIG. 30 shows an exemplary simplified environment for an embodiment of the invention including a local computational environment, an organizational environment, and existing data sources (sensors) environment in accordance with one embodiment of the invention.

FIG. 30 shows an exemplary simplified environment for an embodiment of the invention including a local computational environment 303, an organizational environment 305, and existing data sources (sensors) environment 341 in accordance with one embodiment of the invention. In particular, the exemplary local computational environment includes a local machine executing an exemplary embodiment of the invention or application that provides visualization and real-time situational awareness. The exemplary organizational environment includes an organization of interest, e.g., what an intended user wants to understand or maintain situational awareness about. The exemplary data sources (e.g., sensors) can include existing data sources (e.g., data feeds or sensors) that can provide information about assets in the organizational environment, to include up/down status information, other forms of status information, performance metrics, telemetry data, etc.

Figure 31:
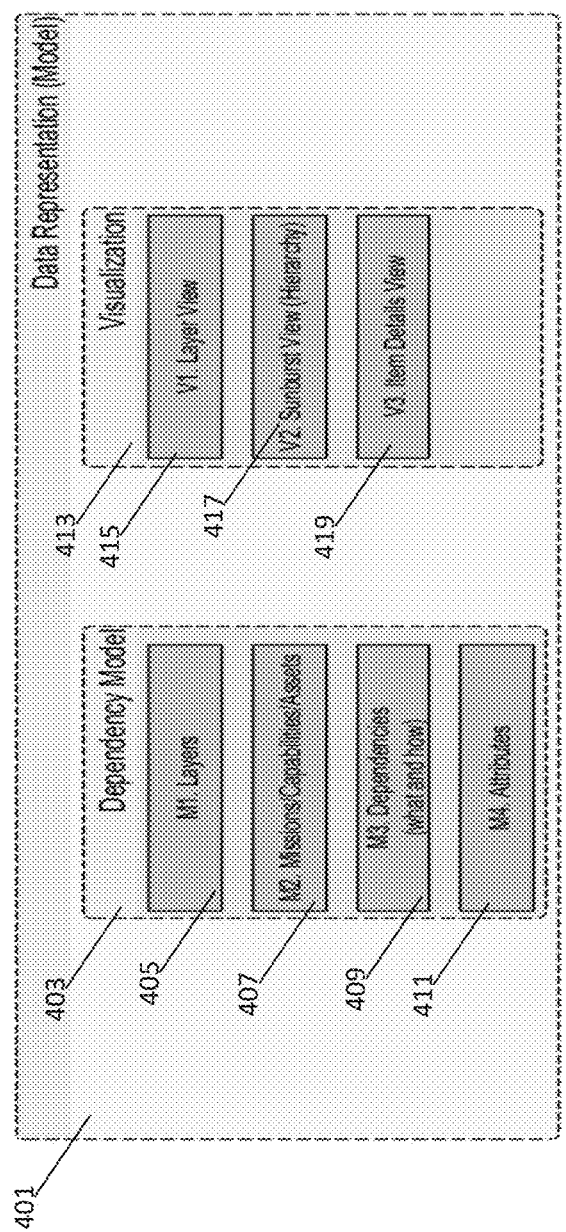
FIG. 31 shows an exemplary data representation model with a dependency mode or structure and a visualization mode or sets of views or visualizations.

FIG. 31 shows one exemplary data representation model with a dependency mode or structure 403 and a visualization mode 413 or sets of views or visualizations in accordance with one embodiment of the invention. M1 Layers 405 can represent a partitioning of the missions, assets, and capabilities 407, and provide a way to group items in visualization (V1). The exemplary M1 layers correspond to the types of assets available in the organizational environments, along with the conceptual layers of capabilities and missions.

M2 Missions/Capabilities/Assets 407 comprises a set of items that are partitioned into layers. These M2 items can be core "items" that a user interacts with, and that data sources are associated with. Types of assets that can be represented correspond to the layers (M1).

M3 Dependencies 409. Each item in the model may depend on other items. A particular dependency within this exemplary model describes both an existence of the dependency (what depends on what) and a nature of the dependency (how the dependency works). For the latter in one embodiment, "how" is characterized as a function that computes an items status based on (a) the attributes (or indicators) associated with the item and (b) the status of items it depends on.

M4 Attribute Indicators 411. Missions, capabilities, and assets may have characteristics that are included with the model. These values can be used as defaults during the merge step of computation (C3), and are visualized in the item details view (V3).

Visualization 413. V1 Layer View 415. The V1 Layer View can show missions, capabilities, and assets organized by layer (M1). This exemplary dependency structure is shown when requested by the user (e.g. dependencies related to an item shown when the user hovers over an item). Each exemplary element of the V1 Layer View is colored based on the currently computed status (C4).

V2 Sunburst/Hierarchy View 417. The exemplary V2 sunburst/hierarchy view shows a central item and what that item depends on (or what it supports). This exemplary hierarchy can be determined by a dependency structure within the model. Each element of the view is colored based on currently computed status (C4).

V3 Item Details View 419. The exemplary item details view can show detailed information about a status of an item and its associated indicators (C3).

Figure 32:
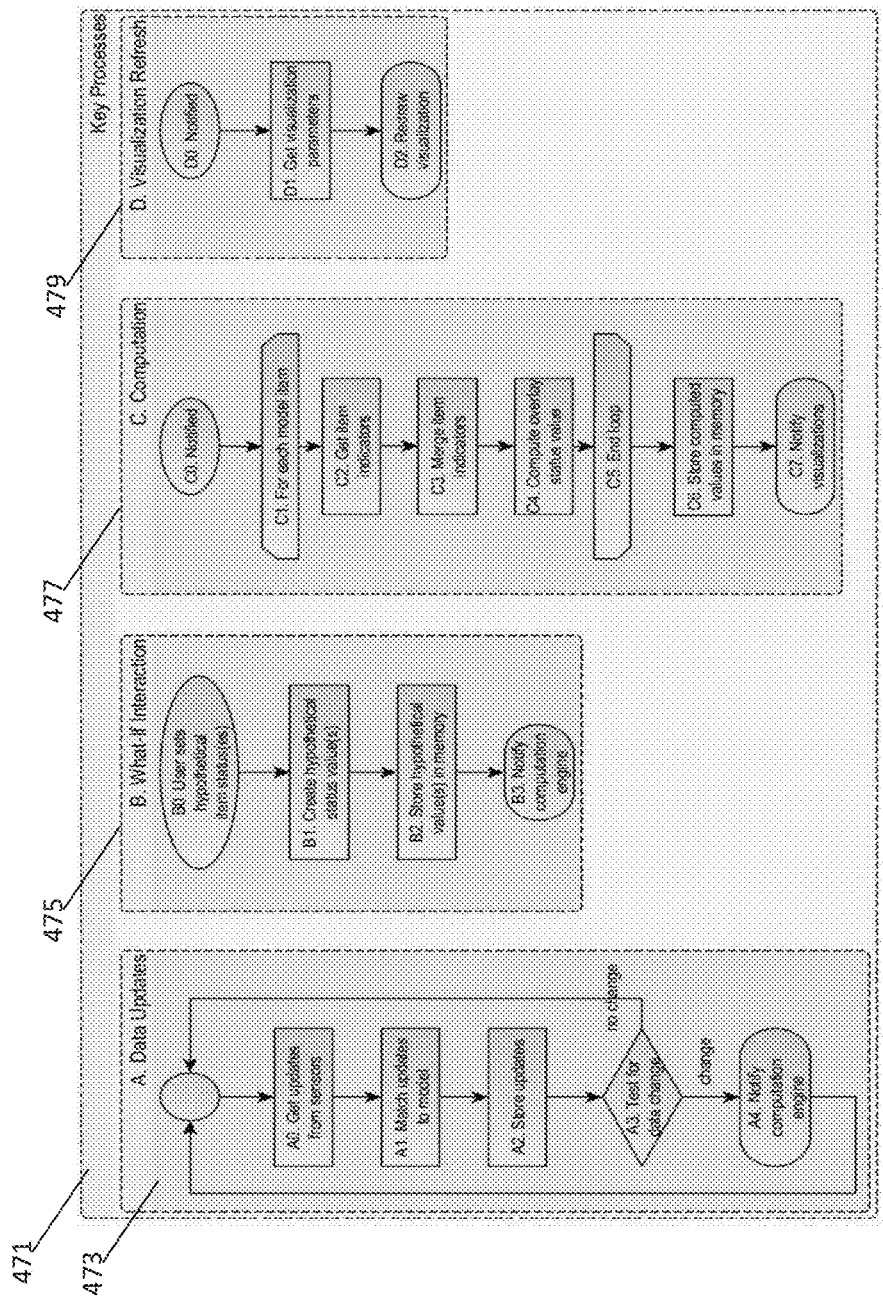
FIG. 32 shows exemplary key processes or software modules in accordance with some exemplary embodiments of the invention.

Referring to FIG. 32, a variety of exemplary processes implemented by machine readable software instructions is shown 471. Processes for Data Updates 473 includes Step A0. Get updates from sensors. At scheduled intervals, the latest data source values are retrieved from the available data sources. Step A1. Match updates to model. The updates are matched to the corresponding item in the model. Step A2. Store updates. Updates are stored in a database or in memory. Step A3. Test for data change. A test for data change is made. The flow proceeds only if a value has changed since the last update. Step A4. Notify computation engine. The computation engine is notified that updated values are available (C0).

A next set of processes include "What-if Interaction" processes 475. At step B0. User sets hypothetical item status(es). The what-if interaction begins when the user wishes to test one or more hypothetical status value, and sets it explicitly (e.g. what happens if this server is offline?) At step B1. Create hypothetical status value(es). The system creates the hypothetical status update(s) based on the user's input. At step B2. Store hypothetical value(s) in memory. The hypothetical updates are stored in memory. At step B3. Notify computation engine. The computation engine is notified that updated values are available (C0). In addition to these steps, the user may also "disable" hypothetical statuses, which clears the hypothetical values from memory, and notifies the computation engine.

Exemplary simplified computation processes 477 can include: At step C0. Notified. The computation process begins when a notification is received that the inputs to the computation have changed. This occurs when either an update is received from a data source relevant to the model (A3), or when the user begins a "what-if analysis" interaction (B3). At step C1. For each model item. Order items based on the directed, acyclic dependency structure, such that an item is always positioned after any item it depends on. At step C2. Get item indicators. Retrieve item indicators from three locations: (a) indicators stored with the model; (b) the latest values provided by data updates (A2); and (c) hypothetical values, which are stored in memory (B2). At step C3. Merge item indicators. The results of C2 are merged by combining the three lists of indicators into a single list.

If there are conflicts, the latest value update overrides a value from the model, and a hypothetical value overrides both model values and data update values. At step C4. Compute overlay status value. An item's overlay status depends on (a) the indicators associated with the item; and (b) the computed status of items it depends on. The formula used to compute status is specified as part of the dependency's representation within the model. At step C5. End loop. At step C6. Store results in memory. At step C7. Notify visualizations. Visualizations are notified that new computation results and related data are available for display and update (D0).

Exemplary simplified visualization refresh 479 processes can include: At step D0. Notified. The visualization refresh is triggered when the computation is updated (C7), or when any other visualization parameter changes. At step D1. Get visualization parameters. Exemplary parameters can include (a) a current or selected model (M1-M4), (b) computed overlay status values (C4), and (c) configuration parameters for the specific visualization (V1-V3). At step D2. Redraw visualization. Use the parameters to update the display. The way this is done depends on the visualization type and its parameters.

Referring to FIGS. 33-36, an exemplary call hierarchy is shown for exemplary key methods or subroutines discussed herein. At FIG. 34, an exemplary initialization and shutdown sequence is discussed. At FIG. 34, an exemplary method or function call sequence is shown for activating an exemplary data feed updates (e.g. see FIG. 32 (473)). At FIG. 35A and FIG. 35B, an exemplary sequence for executing periodically retrieved data feed updates (e.g., see FIG. 32(473)) is shown. In this example, feeds are checked on a periodic basis, and will detect changes to an external system or data source when they are refreshed. At FIG. 36, an exemplary method for activating a "What-If" interaction machine operation (e.g., see FIG. 32(475)) where a user selects a what-if functionality selection from a user interface menu option.

The attached appendices (DaggerApp and DaggerView) represent illustrative source code and form part of the present disclosure describing embodiments of the present invention.

While the invention has been described and illustrated with reference to specific exemplary embodiments, it should be understood that many modifications and substitutions can be made without departing from the spirit and scope of the invention. For example, although the invention is generally described with reference to a radio, the invention is not limited and can be applied to any transmitter/receiver/transceiver system. Accordingly, the invention is not to be considered as limited by the foregoing description but is only limited by the scope of the claims.

What is claimed as new and desired to be protected by Letters Patent of the United States is:

1. A multiple element information system and visualization system for organizational information system architectures comprising:
   a display section;
   a recording medium comprising a plurality of non-transitory machine readable instructions;
   a processor section configured to read said recording medium and execute said plurality of non-transitory machine readable instructions;
   a plurality of data sources;
   a plurality of assets associated with at least one organization comprising a plurality of sub-organizations, wherein each organization and plurality of sub-organizations each perform one or more pre-defined missions or provide one or more pre-defined capabilities;
   a network communication system coupled with the processor section adapted to communicate with the plurality of data sources and plurality of assets;
   a plurality of data source sensors or control systems in communication with or monitoring the plurality of data sources that output data source information comprising status information, performance metrics, and telemetry data for each data source or joint architecture reference model (JARM) layer elements, wherein said JARM layer elements comprise infrastructure and facilities, connectivity systems, computing system or communication networks, computing and storage systems, enabling software and data services systems, software framework services systems, software applications and content systems, organizational functional capabilities and personnel data, and organizational objectives and imperatives data;
   wherein said plurality of non-transitory machine readable instructions comprises:
      a first plurality of machine readable instructions operable to for sending and obtaining data requests for a first plurality of data feed information from said plurality of data sources and for receiving the data source information;
      a second plurality of non-transitory machine readable instructions that generate and store a dependency data representation model comprising a plurality of said JARM layer data structures, a plurality of mission, capability or asset entity data structures that include relationship data with respective said JARM layers, a plurality of dependencies data structures that define relationships between the mission, capability or asset entity data comprising supplier and corresponding receiver, and a plurality of attributes data structures defining a plurality of data attributes associated with at least the mission, capability, or asset entity data structures;
      a third plurality of non-transitory machine readable instructions that generates and stores a visualization data representation model;
      a fourth plurality of machine readable instructions configured to generate a plurality of visualizations on said display section associated with said assets for respective missions;
   wherein said JARM layers data structure stores a plurality of JARM layer entity data comprising:
      a mission layer data structure defining a plurality of missions associated with different organizational entities data,
      a joint capability layer data structure defining a plurality of general function capabilities that enable the missions including a logistics entity function data,
      a function and people layer data structure,
      a software application layer data structure defining software capabilities data,
      a software services layer data structure that define services that are used by the software applications,
      a net-centric enterprise services layer data structure that define enterprise services comprising services used by the software applications,
      a computing and storage platform layer data structure defining support including support used by software services and software applications, a network layer data structure defining support including support used by the network, a transport layer data structure, and a facilities infrastructure layer data structure defining physical support elements that support all layers;

wherein said plurality of visualizations are each associated with said organizational entity comprising at least a management or leadership level command and control function, wherein said plurality of visualizations comprise a first, second, third, fourth, fifth and sixth visualization that draws data from at least said visualization data representation model, said first visualization comprises a launch page, said second visualization comprises a user page, said third visualization comprises an asset page, said fourth visualization comprises a mission page, said fifth visualization comprises an asset group page, and said sixth visualization comprises a detail page;

wherein said launch page displays an overview of selectable visualization comprising at least said third visualization and said fifth visualization, an alert section, and a selected mission status section;

wherein said user page comprises mission status data, user defined alerts, a JARM layer display section comprising a plurality of said JARM layer elements, as well as a mission and asset user interface section that display a point of contact, status, key asset list, and key metrics section;

wherein said mission page comprises mission alerts associated with specified metrics, a mission asset section that displays different assets associated with a specified mission, a sunburst view of one or more JARM layer entities with JARM layer metrics superimposed on elements of the sunburst display;

wherein the asset group page comprises an asset identifier data, status or metrics data, a hierarchical display of assets with dependencies or relationships connecting the assets, and an asset details display comprising a point of contact data, status, key relationships summary and key metrics summary;

wherein said details page comprises an organization capability user interface comprising at least one said predefined capability associated with the organization or sub-organization, mission data, uptime data, security data and asset data in a first section, wherein the details page further comprise a core enterprises services section and an enterprise assets section, wherein said core enterprise section comprises a service connection map, node status and link status section, wherein the enterprise assets section comprises a regional enterprise asset section that displays a plurality of regional enterprise assets comprising communication cables overlaid over a map of a selected region and a status section for each asset shown in the regional map;

wherein said plurality of visualizations display different visualization elements based on status or metric data collected from the data sources sensors or control systems that match one or more said dependencies between at least said missions or assets and said JARM layers.

2. A method for generating situational awareness visualizations comprising:

providing a multiple element information system and visualization system for organizational information system architectures comprising:

a display section;

a recording medium comprising a plurality of non-transitory machine readable instructions;

a processor section configured to read said recording medium and execute said plurality of non-transitory machine readable instructions;

a plurality of data sources;

a network communication system coupled with the processor section adapted to communicate with the plurality of data sources;

a plurality of data source sensors in communication with or monitoring the plurality of data sources that output data source information comprising status information, performance metrics, and telemetry data for each data source;

a plurality of assets associated with an organization comprising a plurality of sub-organizations;

wherein said plurality of non-transitory machine readable instructions comprises:

a first plurality of machine readable instructions operable to for sending and obtaining data requests for a first plurality of data feed information from said plurality of data sources and for receiving the data source information;

a second plurality of non-transitory machine readable instructions that generate and store a dependency data representation model comprising a plurality of JARM layer data structures, a plurality of mission, capability or asset entity data structures that include relationship data with respective said JARM layers, a plurality of dependencies data structures that define relationships between the mission, capability or asset entity data comprising supplier and corresponding receiver, and a plurality of attributes data structures defining a plurality of data attributes associated with at least the mission, capability, or asset entity data structures;

a third plurality of non-transitory machine readable instructions that generates and stores a visualization data representation model;

a fourth plurality of machine readable instructions configured to generate a plurality of visualizations on said display section associated with said assets for respective missions;

wherein said JARM layers data structure stores a plurality of JARM layer entity data comprising a mission layer data structure defining a plurality of missions associated with different organizational entities data, a joint capability layer data structure defining a plurality of general function capabilities that enable the missions including a logistics entity function data, a function and people layer data structure, a software application layer data structure defining software capabilities data, a software services layer data structure that define services that are used by the software applications, a net-centric enterprise services layer data structure that define enterprise services comprising services used by the software applications, a computing and storage platform layer data structure defining support including support used by software services and software applications, a network layer data structure defining support including support used by the network, a transport layer data structure, and a facilities infrastructure layer data structure defining physical support elements that support all layers;

wherein said plurality of visualizations are each associated with a specified organizational entity comprising at least a management or leadership level command and control function, wherein said plurality of visualizations comprise a first, second, third, fourth, fifth and sixth visualization that draws data from at least said visualization data representation model, said first visualization comprises a launch page, said second visualization comprises a user page, said third visualization comprises an asset page, said fourth visualization comprises a mission page, said fifth visualization comprises an asset group page, and said sixth visualization comprises a detail page;

wherein said launch page displays an overview of selectable visualization comprising at least said third visualization and said fifth visualization, an alert section, and a selected mission status section;

wherein said user page comprises mission status data, user defined alerts, a JARM layer display section comprising a plurality of said JARM layer elements, as well as a mission and asset user interface section that display a point of contact, status, key asset list, and key metrics section;

wherein said mission page comprises mission alerts associated with specified metrics, a mission asset section that displays different assets associated with a specified mission, a sunburst view of one or more JARM layer entities with JARM layer metrics superimposed on elements of the sunburst display;

wherein the asset group page comprises an asset identifier data, status or metrics data, a hierarchical display of assets with dependencies or relationships connecting the assets, and an asset details display comprising a point of contact data, status, key relationships summary and key metrics summary;

wherein said details page comprises an entity capability user interface comprising mission data, uptime data, security data and asset data in a first section, wherein the details page further comprise a core enterprises services section and an enterprise assets section, wherein said core enterprise section comprises a service connection map, node status and link status section, wherein the enterprise assets section comprises a regional enterprise asset section that displays a plurality of regional enterprise assets comprising communication cables overlaid over a map of a selected region and a status section for each asset shown in the regional map;

operating said system to obtain said data source information from said data sources associated with at least said assets associated with one or more said missions;

operating a fifth plurality of machine readable instructions that comprise a plurality of situational awareness rules to said data source information and generating at least one of said visualizations to display situational awareness data feeds associated with at least said assets and said missions.

* * * * *